(12) United States Patent
Lee et al.

(10) Patent No.: US 11,068,074 B2
(45) Date of Patent: Jul. 20, 2021

(54) FLEXIBLE DEVICE AND INTERFACING METHOD THEREOF

(71) Applicant: SAMSUNG ELECTRONICS CO., LTD., Suwon-si (KR)

(72) Inventors: Ga-eun Lee, Suwon-si (KR); Dae-myung Kim, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 318 days.

(21) Appl. No.: 14/795,025

(22) Filed: Jul. 9, 2015

(65) Prior Publication Data
US 2016/0034047 A1 Feb. 4, 2016

(30) Foreign Application Priority Data

Jul. 31, 2014 (KR) .................. 10-2014-0098583
Jan. 27, 2015 (KR) .................. 10-2015-0012850

(51) Int. Cl.
*G06F 3/03* (2006.01)
*G06F 1/16* (2006.01)
(Continued)

(52) U.S. Cl.
CPC .............. *G06F 3/03* (2013.01); *G06F 1/1652* (2013.01); *G06F 3/013* (2013.01); *G06F 3/0482* (2013.01); *G06F 3/0484* (2013.01); *G09G 5/37* (2013.01); *G09G 5/373* (2013.01); *H04M 1/0214* (2013.01); *H04M 1/0243* (2013.01); *H04M 1/72427* (2021.01); *G09G 2340/04* (2013.01);
(Continued)

(58) Field of Classification Search
CPC ...... G09G 2354/00; G09G 5/37; G09G 5/373; G09G 2340/04; G09G 2380/02; G09G 2356/00; G09G 2340/14; G09G 2380/14; G06F 3/03; G06F 3/0484; G06F 3/013; G06F 3/0482; G06F 1/1652; H04M 1/72544; H04M 1/0214; H04M 1/0243; H04M 1/0268
See application file for complete search history.

(56) References Cited

U.S. PATENT DOCUMENTS 7,551,099 B2 6/2009 Huang et al.
8,271,047 B2 9/2012 Kim et al.
(Continued)

FOREIGN PATENT DOCUMENTS

CN 102193795 A 9/2011
CN 103472964 A 12/2013
(Continued)

OTHER PUBLICATIONS

Communication dated Jun. 8, 2016, issued by the Taiwanese Patent Office in counterpart Taiwanese application No. 104124613.
(Continued)

*Primary Examiner* — Jeff Piziali
(74) *Attorney, Agent, or Firm* — Sughrue Mion, PLLC

(57) ABSTRACT

A foldable device includes a sensor configured to sense an unfolding motion of the foldable device, a display configured to display a layout in which a representation of at least one object varies according to the sensed unfolding motion, and a controller configured to control the display of the layout so that the representation of the at least one object corresponds to the sensed unfolding motion.

11 Claims, 68 Drawing Sheets

(51) Int. Cl.
*H04M 1/02* (2006.01)
*G06F 3/0484* (2013.01)
*H04M 1/72427* (2021.01)
*G06F 3/01* (2006.01)
*G06F 3/0482* (2013.01)
*G09G 5/37* (2006.01)
*G09G 5/373* (2006.01)

(52) U.S. Cl.
CPC ..... *G09G 2354/00* (2013.01); *G09G 2380/02* (2013.01); *H04M 1/0268* (2013.01)

(56) References Cited

U.S. PATENT DOCUMENTS

| | | | |
|---|---|---|---|
| 8,694,897 B2 | 4/2014 | Kamiyama et al. | |
| 8,963,857 B2* | 2/2015 | Kim | G06F 3/0487 345/173 |
| 9,122,319 B2* | 9/2015 | Kwak | G06F 3/0487 |
| 9,142,162 B2* | 9/2015 | Kwack | G09G 3/3225 |
| 9,177,501 B2* | 11/2015 | Moriwaki | G09G 3/3208 |
| 9,250,851 B2 | 2/2016 | Lu et al. | |
| 9,423,995 B2* | 8/2016 | Arneson | G06F 3/011 |
| 9,448,660 B2* | 9/2016 | Seo | G06F 3/0487 |
| 9,639,177 B2* | 5/2017 | Kim | G06F 3/0346 |
| 9,684,342 B2 | 6/2017 | Kim et al. | |
| 2007/0075871 A1 | 4/2007 | Huang et al. | |
| 2008/0291225 A1 | 11/2008 | Arneson | |
| 2010/0056223 A1 | 3/2010 | Choi et al. | |
| 2010/0064244 A1 | 3/2010 | Kilpatrick, II et al. | |
| 2010/0182265 A1 | 7/2010 | Kim et al. | |
| 2011/0063192 A1 | 3/2011 | Miller et al. | |
| 2011/0134144 A1 | 6/2011 | Moriwaki | |
| 2011/0225522 A1 | 9/2011 | Kamiyama et al. | |
| 2012/0299813 A1* | 11/2012 | Kang | G06F 1/1641 345/156 |
| 2012/0306910 A1 | 12/2012 | Kim et al. | |
| 2013/0135182 A1* | 5/2013 | Jung | G09G 3/00 345/30 |
| 2013/0215041 A1 | 8/2013 | Kim et al. | |
| 2013/0222416 A1 | 8/2013 | Kim et al. | |
| 2013/0342439 A1 | 12/2013 | Kwack et al. | |
| 2013/0342509 A1 | 12/2013 | Kang et al. | |
| 2014/0009419 A1 | 1/2014 | Kim et al. | |
| 2014/0015743 A1 | 1/2014 | Seo et al. | |
| 2014/0028596 A1 | 1/2014 | Seo et al. | |
| 2014/0049464 A1* | 2/2014 | Kwak | G06F 3/0487 345/156 |
| 2014/0055429 A1 | 2/2014 | Kwon et al. | |
| 2014/0062856 A1 | 3/2014 | Lu et al. | |
| 2014/0071043 A1 | 3/2014 | Jung et al. | |
| 2014/0085230 A1 | 3/2014 | Sato et al. | |
| 2014/0137041 A1 | 5/2014 | Jeon et al. | |

FOREIGN PATENT DOCUMENTS

| | | |
|---|---|---|
| EP | 2597558 A1 | 5/2013 |
| JP | 2014-10597 A | 1/2014 |
| JP | 2014-68287 A | 4/2014 |
| KR | 20-0370890 Y1 | 12/2004 |
| KR | 100701968 B1 | 3/2007 |
| KR | 10-0867608 B1 | 11/2008 |
| KR | 10-2010-0082451 A | 7/2010 |
| KR | 1020120137629 A | 12/2012 |
| KR | 101292412 B1 | 8/2013 |
| KR | 1020140021847 A | 2/2014 |
| KR | 10-2014-0025931 A | 3/2014 |
| KR | 10-2014-0062280 A | 5/2014 |
| TW | I293434 B | 2/2008 |
| TW | 201411419 A | 3/2014 |
| WO | 2012/108715 A2 | 8/2012 |
| WO | 2014/030912 A1 | 2/2014 |
| WO | 2014/077530 A1 | 5/2014 |

OTHER PUBLICATIONS

Communication dated Jul. 27, 2016, issued by the Korean Intellectual Property Office in counterpart Korean application No. 10-2015-0012850.
Communication dated Feb. 24, 2017 by the Korean Intellectual Property Office in counterpart Korean Patent Application No. 10-2015-0012850.
Communication dated Sep. 23, 2015, issued by the International Searching Authority in counterpart International Application No. PCT/KR2015/006877 (PCT/ISA/220, PCT/ISA/210, and PCT/ISA/237).
Communication dated Oct. 30, 2015, issued by the European Patent Office in counterpart European Application No. 15178859.3.
Communication dated Nov. 13, 2018, issued by the European Patent Office in counterpart European Patent Application No. 15178859.3.
Communication dated Jan. 9, 2019, issued by the State Intellectual Property Office of the People's Republic of China in counerpart Chinese Patent Application No. 201510463520.0.
Communication dated Dec. 22, 2017, issued by the Australian Patent Office in counterpart Australian Patent Application No. 2015297281.
Communication dated Jul. 2, 2018, issued by the State Intellectual Property Office of People's Republic of China in counterpart Chinese Application No. 201510463520.0.
Communication dated Sep. 8, 2017, issued by the Australian Patent Office in counterpart Australian Application No. 2015297281.
Communication dated Nov. 1, 2017, from the State Intellectual Property Office of People's Republic of China in counterpart Chinese Application No. 201510463520.0.
Communication dated Mar. 22, 2018, issued by the Australian Patent Office in counterpart Australian application No. 2015297281.
Communication dated Sep. 30, 2019, issued by the Vietnamese Patent Office in counterpart Vietnamese Application No. 1-2017-00671.
Communication dated Apr. 16, 2019, issued by the Taiwan Patent Office in counterpart Taiwanese Application No. 105137038.
Communication dated Jun. 2, 2020, issued by the Taiwan Intellectual Property Office in Taiwanese Application No. 108130262.
Communication dated Jun. 29, 2020, from the State Intellectual Property Office of P.R. China in Chinese Application No. 201510463520.0.
Communication dated Jan. 31, 2020, issued by the Korean Intellectual Property Office in counterpart Korean Application No. 10-2018-0051665.
Communication dated Mar. 25, 2020, from the State Intellectual Property Office of People's Republic of China in counterpart Chinese Application No. 201510463520.0.
Communication dated Apr. 6, 2020, from the European Patent Office in counterpart European Application No. 20161052.4.
Communication dated Oct. 30, 2020 issued by the Korean Intellectual Property Office in Korean Application No. 10-2018-0051665.
Communication dated Jan. 12, 2021 by Intellectual Property India in Indian Patent Application No. 2795/MUM/2015.
Communication dated Mar. 29, 2021 issued by the European Intellectual Property Office in counterpart European Application No. 20 161 052.4.
Communication dated Apr. 8, 2021 issued by the Korean Intellectual Property Office in counterpart Korean Application No. Oct. 2018-0051665 English Translation.

* cited by examiner

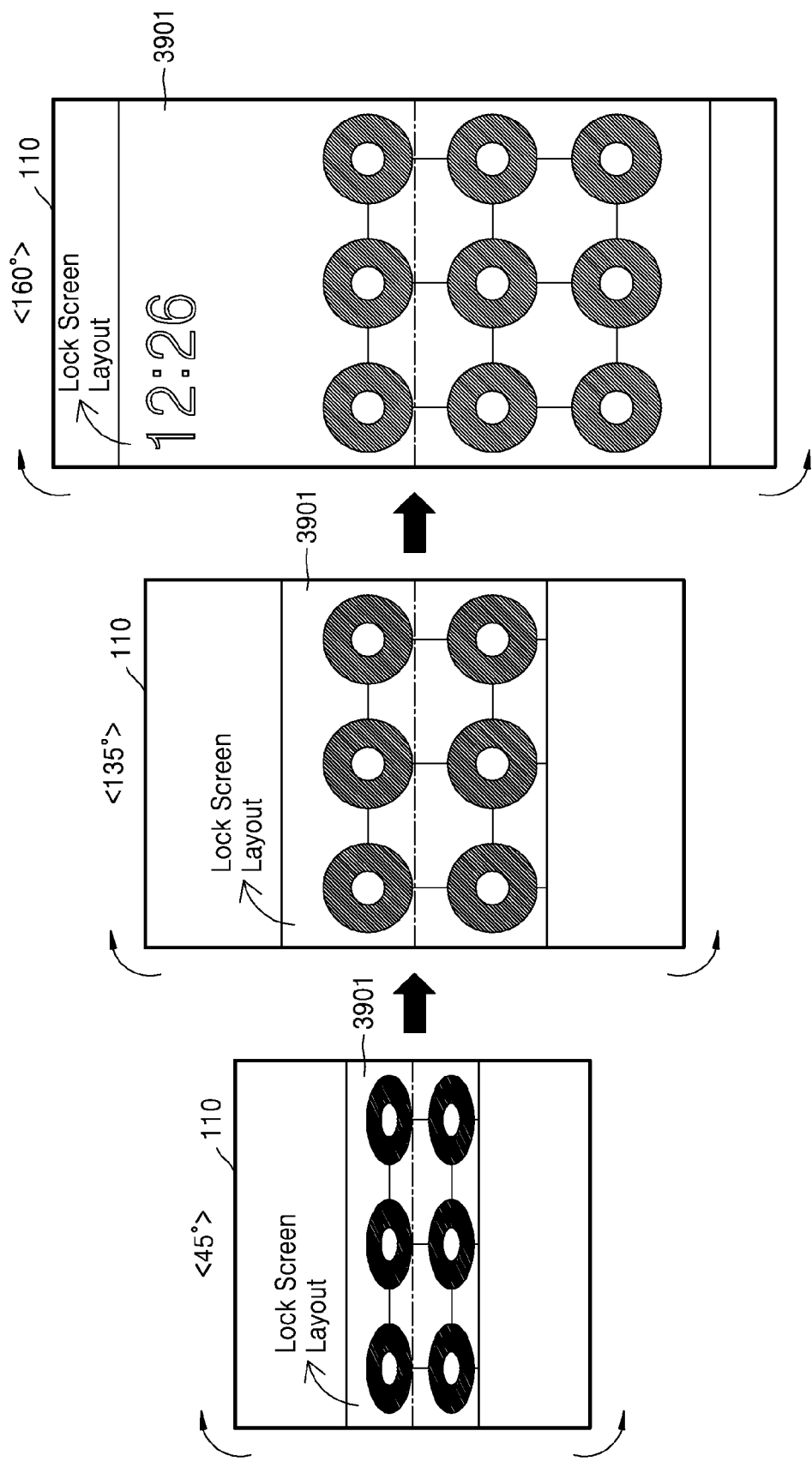

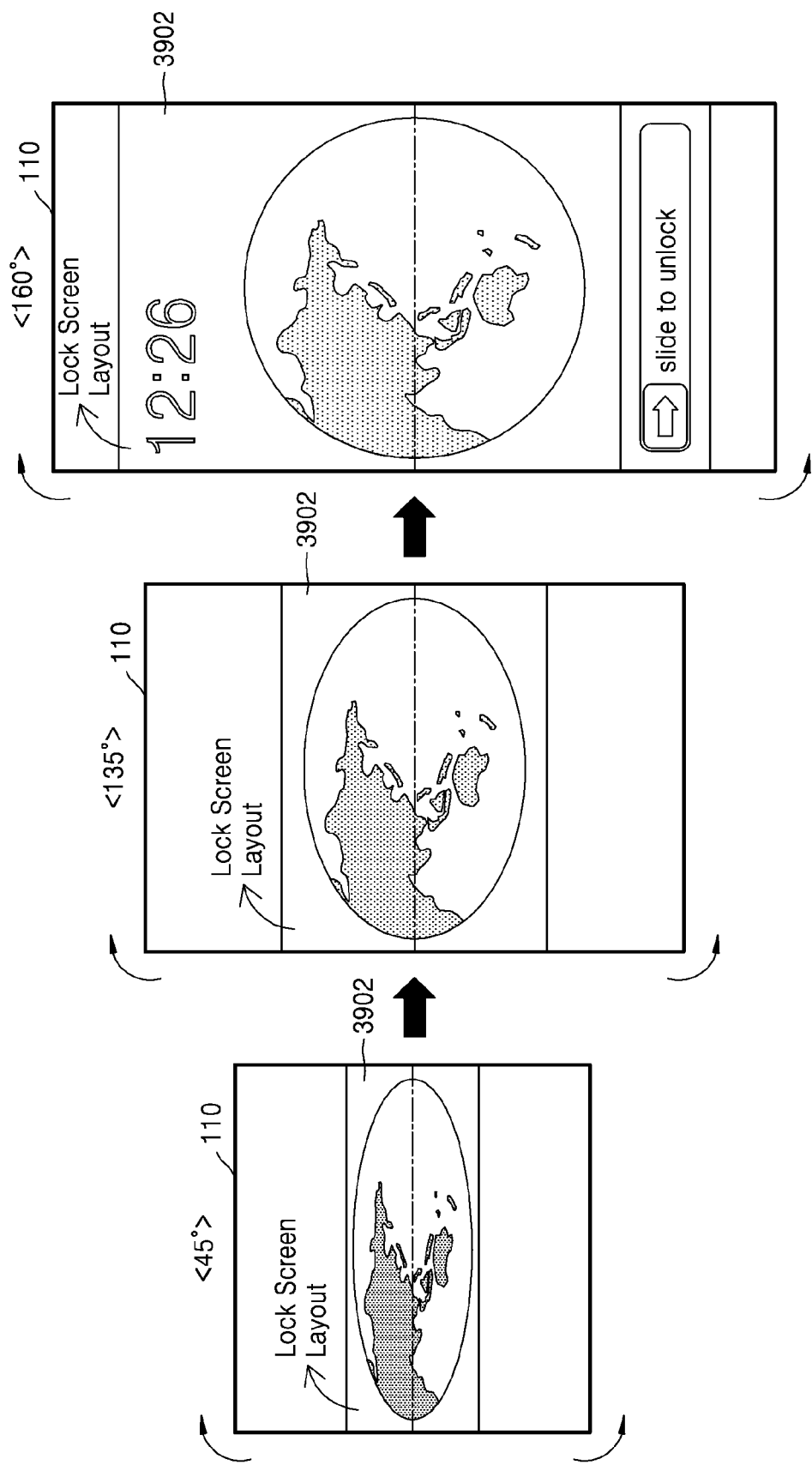

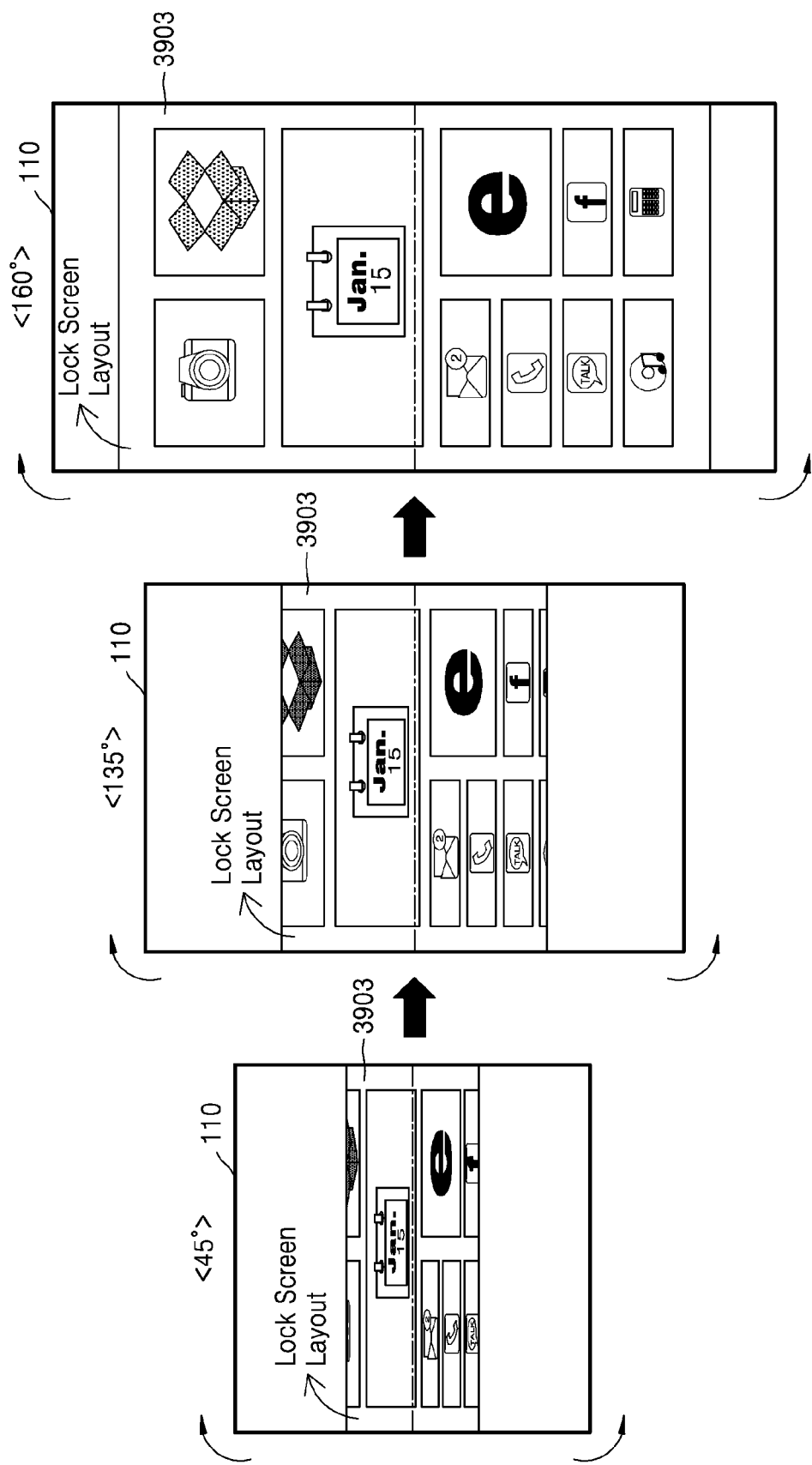

FIG. 51
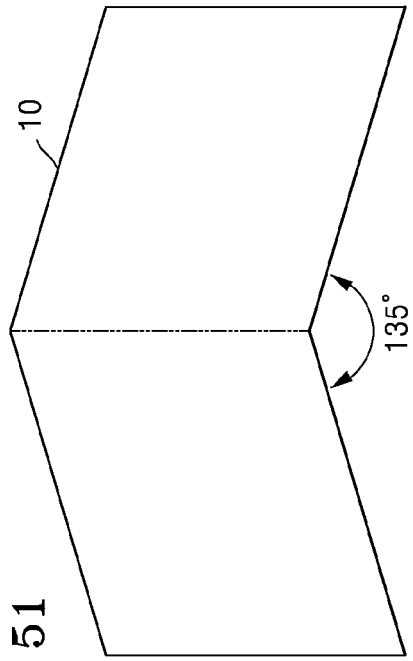
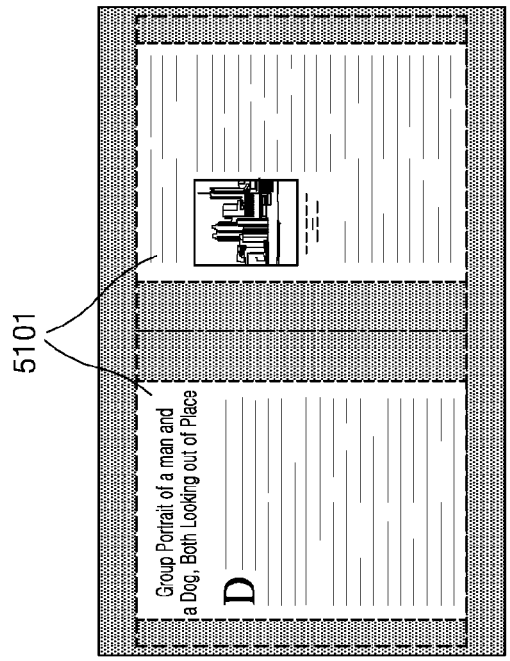
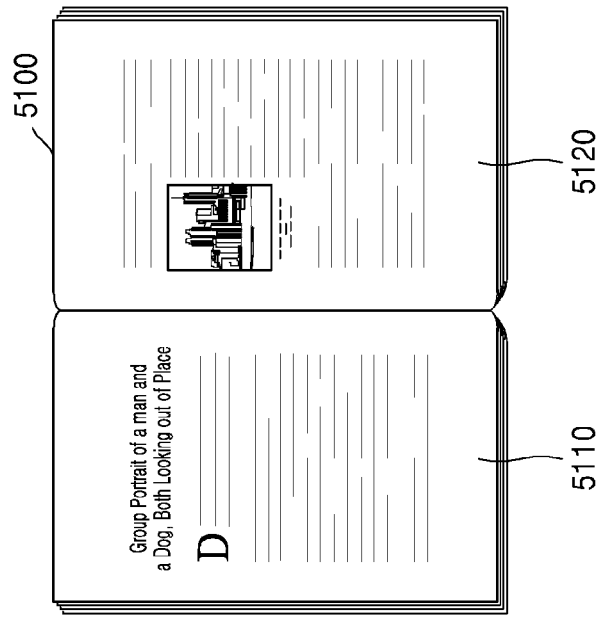

FIG. 55A
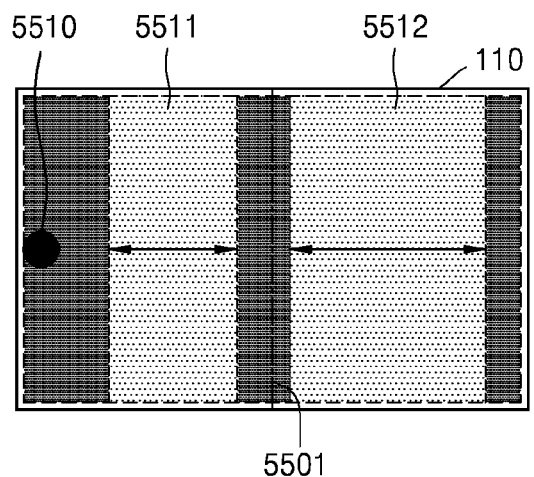
FIG. 55B
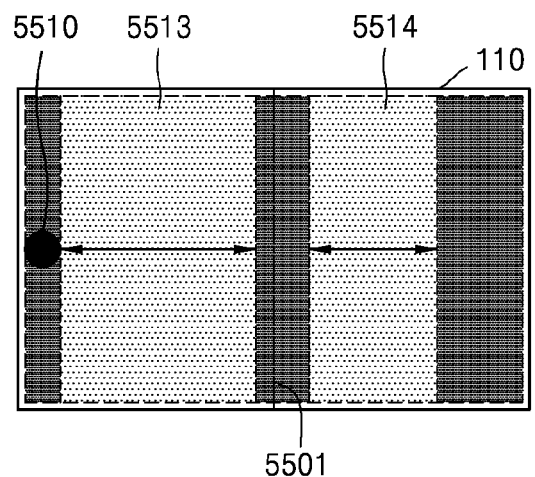
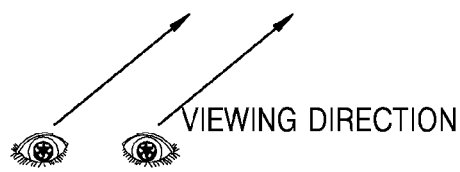
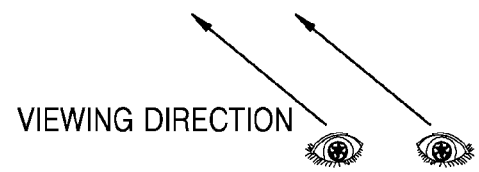

FIG. 58A
FIG. 58B
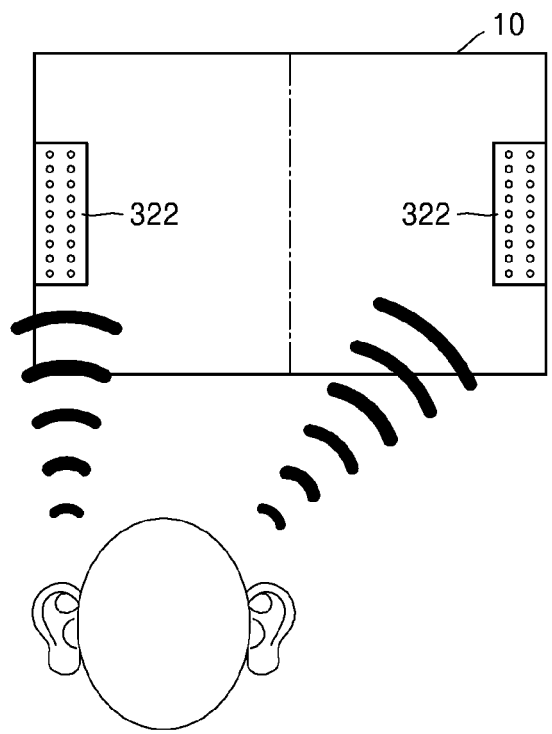
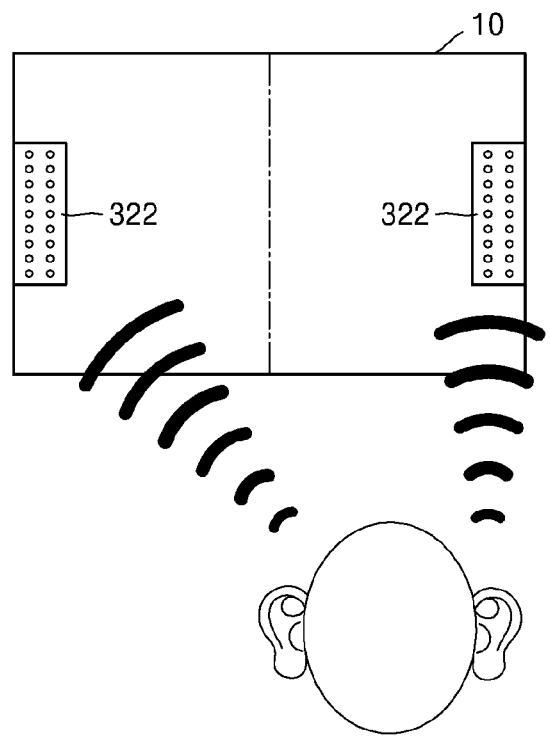

| DEFORMATION DEGREE (ex. UNFOLDING ANGLE, ...) | FIRST OFFSET 6201 |
|---|---|
| ... | ... |
| 45° | $a_{45}$ |
| ... | ... |
| 90° | $a_{90}$ |
| ... | ... |
| 135° | $a_{135}$ |
| ... | ... |

| | INCLINATION | SECOND OFFSET |
|---|---|---|
| VERTICAL DIRECTION | ... | ... |
| | 45° | $b_{V45}$ |
| | ... | ... |
| | 90° | $b_{V90}$ |
| | ... | ... |
| | 135° | $b_{V135}$ |
| | ... | ... |
| HORIZONTAL DIRECTION | ... | ... |
| | 45° | $b_{H45}$ |
| | ... | ... |
| | 90° | $b_{H90}$ |
| | ... | ... |
| | 135° | $b_{H135}$ |
| | ... | ... |

6301

FLEXIBLE DEVICE AND INTERFACING METHOD THEREOF

CROSS-REFERENCE TO RELATED APPLICATIONS

This application claims priority from Korean Patent Application No. 10-2014-0098583, filed on Jul. 31, 2014, in the Korean Intellectual Property Office, and Korean Patent Application No. 10-2015-0012850, filed on Jan. 27, 2015, in the Korean Intellectual Property Office, the disclosures of which are incorporated herein by reference in their entireties.

BACKGROUND

1. Field

Apparatuses and methods consistent with exemplary embodiments relate to a method of input and output (I/O) interfacing of a flexible device having a flexible display.

2. Description of Related Art

Due to the increasing use of display-related technologies, flexible displays, transparent display panels, or the like are being developed. A flexible display is a display device that can bend.

The flexible display may be formed by replacing a glass substrate with a plastic film, wherein the glass substrate generally surrounds liquid crystals in a liquid crystal display (LCD) and an organic light-emitting display. The flexible display may have flexibility so that it may be folded and unfolded. Because the flexible display is formed by using a plastic substrate, a low-temperature manufacturing method, rather than a glass substrate manufacturing method, may be used to prevent a substrate from being damaged.

The flexible display may be thin, light weight, and shock-resistant. Also, the flexible display may be curved or bent and may be manufactured in various forms. In particular, the flexible display may be applied to industrial fields to which conventional glass-substrate displays can be applied in limited ways or cannot be applied at all.

For example, the flexible display may be applied to electronic books that may replace publications including magazines, textbooks, comic books, or the like, and new portable information technology (IT) products that include an ultra-small personal computer (PC) that may be carried while its display is folded or rolled, a smart card allowing real-time information confirmation, or the like. Because the flexible display is formed of a flexible plastic substrate, the applicable fields of the flexible display may be expanded to many other industries, including fashionable clothing and medical diagnosis.

Due to commercialization of flexible displays, new interfacing methods of the flexible display are being researched based on bendable or foldable properties.

SUMMARY

Exemplary embodiments overcome the above disadvantages and other disadvantages not described above. Also, an exemplary embodiment is not required to overcome the disadvantages described above, and an exemplary embodiment may not overcome any of the problems described above.

One or more exemplary embodiments provide a method of input and output interfacing of a device having a flexible display. Also, the exemplary embodiments provide a computer-readable medium having recorded thereon a program, which when executed by a computer, performs the method. The technical problem to be solved by the exemplary embodiments is not limited to the above technical problems and thus other technical problems may be inferred from the following exemplary embodiments.

Additional aspects will be set forth in part in the description which follows and, in part, will be apparent from the description, or may be learned by practice of the exemplary embodiments.

According to an aspect of an exemplary embodiment, there is provided a foldable device including a sensor configured to sense an unfolding motion of the foldable device; a foldable display configured to display a layout in which a representation of at least one object varies according to the sensed unfolding motion; and a controller configured to control the display of the layout so that the representation of the at least one object corresponds to the sensed unfolding motion.

The sensor may be configured to sense the unfolding motion by sensing an unfolding angle of the foldable device or by sensing an unfolding curvature of the foldable device.

The controller may be further configured to determine a variable component of the representation of the layout corresponding to the sensed unfolding angle or the sensed unfolding curvature, and control the display to display the layout in which the representation varies according to the determined variable component.

The controller may be further configured to generate the layout in which image distortion is corrected by adjusting an arrangement of pixels allotted to an activation area corresponding to the sensed unfolding angle or the sensed unfolding curvature, and control the display to display the generated layout in the activation area.

The controller may be further configured to generate the layout corresponding to each of the unfolding angles or each of the unfolding curvatures of the foldable device, and control the display to sequentially display the layout corresponding to each of the unfolding angles that are less than or equal to the sensed unfolding angle, or each of the unfolding curvatures that are less than or equal to the sensed unfolding curvature.

The controller may be further configured to control the display to start displaying the at least one object in at least one of a folding axis of a screen of the display, an edge of the screen of the display, and a predetermined position on the screen of the display.

The at least one object may correspond to a shortcut to execute at least one of an application installed on the foldable device, content stored in the foldable device, and a menu of the application, each of which are assigned by a user as favorite items.

The controller may be further configured to control the display to display the layout in which at least one of an arrangement of the at least one object, an appearance of the at least one object, and a number of the at least one object, dynamically varies corresponding to the sensed unfolding motion.

The controller may be further configured to, in response to the layout including a plurality of objects, control the display of the layout such that at least one of an arrangement of the plurality of objects, an appearance of the plurality of objects, and a number of the plurality of objects, varies for each of a plurality of unfolding angles sensed by the sensor or for each of a plurality of unfolding curvatures sensed by the sensor.

The controller may be further configured to, in response to the layout including one object, control the display of the layout such that the appearance of the object varies for each of a plurality of unfolding angles sensed by the sensor or for each of a plurality of unfolding curvatures sensed by the sensor.

According to an aspect of another exemplary embodiment, there is provided a method of providing a graphical user interface in a foldable device, the method including sensing an unfolding motion of the foldable device; displaying a layout in which a representation of at least one object varies according to the sensed unfolding motion; and controlling the display of the layout such that the representation of the at least one object corresponds to the sensed unfolding motion.

The unfolding motion may be sensed by sensing an unfolding angle of the foldable device or an unfolding curvature of the foldable device.

The controlling the display of the layout may further include determining a variable component of the representation of the layout corresponding to the sensed unfolding angle or the sensed unfolding curvature, and controlling the display of the layout such that the representation varies according to the determined variable component.

The controlling the display of the layout may further include generating the layout corresponding to each of the unfolding angles or each of the unfolding curvatures of the foldable device, and controlling the display of the layout to be sequentially displayed, the layout corresponding to each of the unfolding angles that are less than or equal to the sensed unfolding angle or each of the unfolding curvatures that are less than or equal to the sensed unfolding curvature.

The at least one object may correspond to a shortcut to execute at least one of an application installed on the foldable device, content stored in the foldable device, and a menu of the application, each of which are assigned by a user as favorite items.

Displaying the layout may include dynamically varying at least one of an arrangement of the at least one object, an appearance of the at least one object, and a number of the at least one object according to the sensed unfolding motion.

In response to the layout including a plurality of objects, controlling the display of the layout such that at least one of an arrangement of the plurality of objects, an appearance of the plurality of objects, and a number of the plurality of objects, varies for each of a plurality of unfolding angles sensed by a sensor or for each of a plurality of unfolding curvatures sensed by the sensor.

In response to the layout including one object, controlling the display of the layout such that the appearance of the object varies for each of a plurality of unfolding angles sensed by a sensor or for each of a plurality of unfolding curvatures sensed by the sensor.

Sensing the unfolding motion may include sensing a change from a folding state of the foldable device to an unfolding state of the foldable device.

According to an aspect of another exemplary embodiment, there is provided a non-transitory computer-readable medium configured to store a program, which when executed by a computer, performs the method.

According to an aspect of another exemplary embodiment, there is provided a foldable device including a sensor configured to sense an unfolding motion of the foldable device; a display configured to display at least one object while the unfolding motion is sensed; and a controller configured to control the displaying of at least one object so that a representation of the at least one object varies corresponding to the sensed unfolding motion.

The unfolding motion may be sensed in a plurality of folding axes.

According to an aspect of another exemplary embodiment, there is provided a flexible display device including a sensor configured to sense a degree of deformation of the flexible display device; a flexible display screen configured to display at least one object; a controller configured to generate a layout on the flexible display screen by varying a representation of the at least one object that is displayed on the flexible display screen according to the degree of deformation of the flexible display device.

The varying the representation of the at least one object may include varying at least one of a number of the at least one object, a type of the at least one object, and a size of the at least one object.

The flexible display device may further include an eye tracker configured to detect a viewing direction of a user, wherein the controller is further configured to determine an activation area of the flexible display screen based on the viewing direction of the user.

The controller may be further configured to in response to the viewing direction being from a left side of the flexible display screen, control the activation area to be larger on a right side than a left side of the flexible display screen, and in response to the viewing direction being from a right side of the flexible display screen, control the activation area to be larger on the left side than the right side of the flexible display screen.

BRIEF DESCRIPTION OF THE DRAWINGS

These and/or other aspects will become apparent and more readily appreciated from the following description of the exemplary embodiments, taken in conjunction with the accompanying drawings in which:

FIGS. 39A to 39C are diagrams illustrating that layouts of a lock screen dynamically vary in the interaction with deformation of a flexible display according to an exemplary embodiment;

FIG. 51 is a diagram illustrating displaying an electronic book (e-book) in an activation area of a flexible display according to an exemplary embodiment;

FIGS. 55A and 55B are diagrams illustrating a method of determining an activation area of a flexible display depending on a user's viewing direction according to an exemplary embodiment;

FIGS. 58A and 58B are diagrams illustrating that the sound output direction of a flexible device dynamically varies according to a user's viewing direction according to an exemplary embodiment;

DETAILED DESCRIPTION

Figure 1:
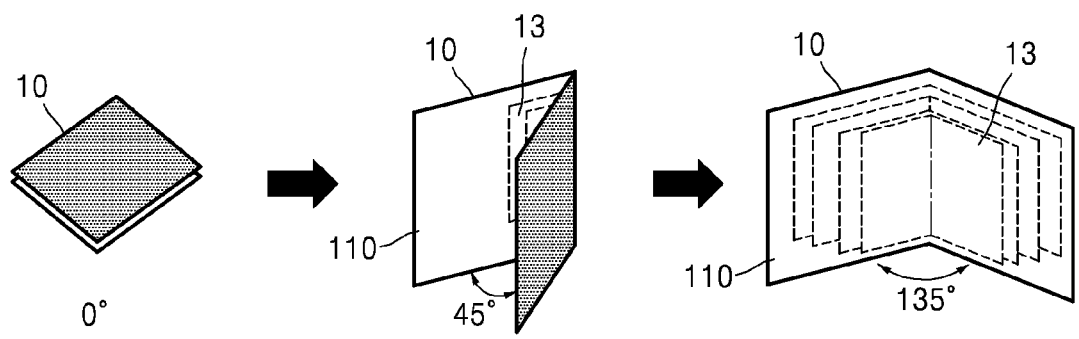
FIG. 1 is a diagram illustrating a flexible device employing a foldable display with a user interface screen, according to an exemplary embodiment.

Reference will now be made in detail to one or more exemplary embodiments, examples of which are illustrated in the accompanying drawings, wherein like reference numerals refer to like elements throughout. In this regard, the exemplary embodiments may have different forms and should not be construed as being limited to the descriptions set forth herein. Accordingly, the exemplary embodiments are merely described below, by referring to the figures, to explain aspects of the present disclosure. As used herein, the term "and/or" includes any and all combinations of one or more of the associated listed items. Expressions such as "at least one of," when preceding a list of elements, modify the entire list of elements and do not modify the individual elements of the list.

All terms including descriptive or technical terms which are used herein should be construed as having meanings that are understood by one of ordinary skill in the art. However, the terms may have different meanings according to an intention of one of ordinary skill in the art, precedent cases, or the appearance of new technologies. Also, some terms may be selected by the applicant, and in that case, the meaning of the selected terms will be described in detail in the detailed description. Thus, the terms used herein have to be defined based on the meaning of the terms together with the description throughout the specification.

Although terms including an ordinal number such as first, second, etc., can be used for describing various elements, the structural elements are not restricted by the terms. The terms are only used to distinguish one element from another element. For example, without departing from the scope of the present disclosure, a first structural element may be named a second structural element. Similarly, the second structural element also may be named the first structural element.

Also, when a part "includes" or "comprises" an element, unless there is a particular description contrary thereto, the part may further include other elements. In the following description, terms such as "unit" and "module" indicate a unit for processing at least one function or operation, wherein the unit and the block may be embodied as hardware or software or may be embodied by combining hardware and software.

Particularly, the term "unit" used in one or more exemplary embodiments indicates a component including software or hardware, such as a Field Programmable Gate Array (FPGA) or an Application-Specific Integrated Circuit (ASIC), and the " . . . unit" performs certain roles. However, the term "unit" is not limited to software or hardware. The term "unit" may be configured to be included in an addressable storage medium or to reproduce one or more processors. Therefore, for example, "unit" includes components, such as software components, object-oriented software components, class components, and task components, processes, functions, attributes, procedures, subroutines, segments of program code, drivers, firmware, microcode, circuits, data, a database, data structures, tables, arrays, and variables. A function provided inside components and "units" may be combined into a smaller number of components and "units," or further divided into additional components and "units".

The term "module" as used herein means, but is not limited to, a software or hardware component, such as an FPGA or ASIC, which performs certain tasks. A module may advantageously be configured to reside on an addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

Although terms used herein are generic terms which are currently widely used and are selected by taking into consideration functions thereof, the meanings of the terms may vary according to knowledge of persons skilled in the art, legal precedents, or the emergence of new technologies. Furthermore, some specific terms may be selected by the applicant, in which case, the meanings of the terms may be defined in the description of an exemplary embodiment. Thus, the terms should be based on the meanings thereof and the context of the description of an exemplary embodiment. As used herein, expressions such as "at least one of," when preceding a list of elements, modify the entire list of elements and do not modify the individual elements of the list.

It should be understood that the terms "includes," "comprises," "including," and/or "comprising," when used in this specification, specify the presence of stated elements and/or components, but do not preclude the presence or addition of one or more elements and/or components thereof. As used herein, the term "module" refers to a unit that can perform at least one function or operation and may be implemented utilizing any form of hardware, software, or a combination thereof.

In one or more exemplary embodiments, a "folding motion" or a "bending motion" signifies a motion that a flexible device or a flexible display is folded or bent. In contrast, in one or more exemplary embodiments, an "unfolding motion" or an "unbending motion" signifies a motion that a flexible device or a flexible display is unfolded or unbent.

In particular, in one or more exemplary embodiments, the term "deforming" signifies a state in which an outer shape of a flexible device changes, like "folding" or "bending". Accordingly, in one or more exemplary embodiments, the term "deforming" may be interpreted as "folding", "unfolding", "bending", or "unbending". In the following descriptions, one or more exemplary embodiments will be described in detail with reference to the attached drawings. One or more exemplary embodiments may, however, be embodied in many different forms and should not be construed as being limited to the exemplary embodiments set forth herein. Rather, one or more exemplary embodiments are provided so that the disclosure will be thorough and complete, and will fully convey the concept of exemplary embodiments to those of ordinary skill in the art. Like reference numerals in the drawings denote like elements.

Figure 11:
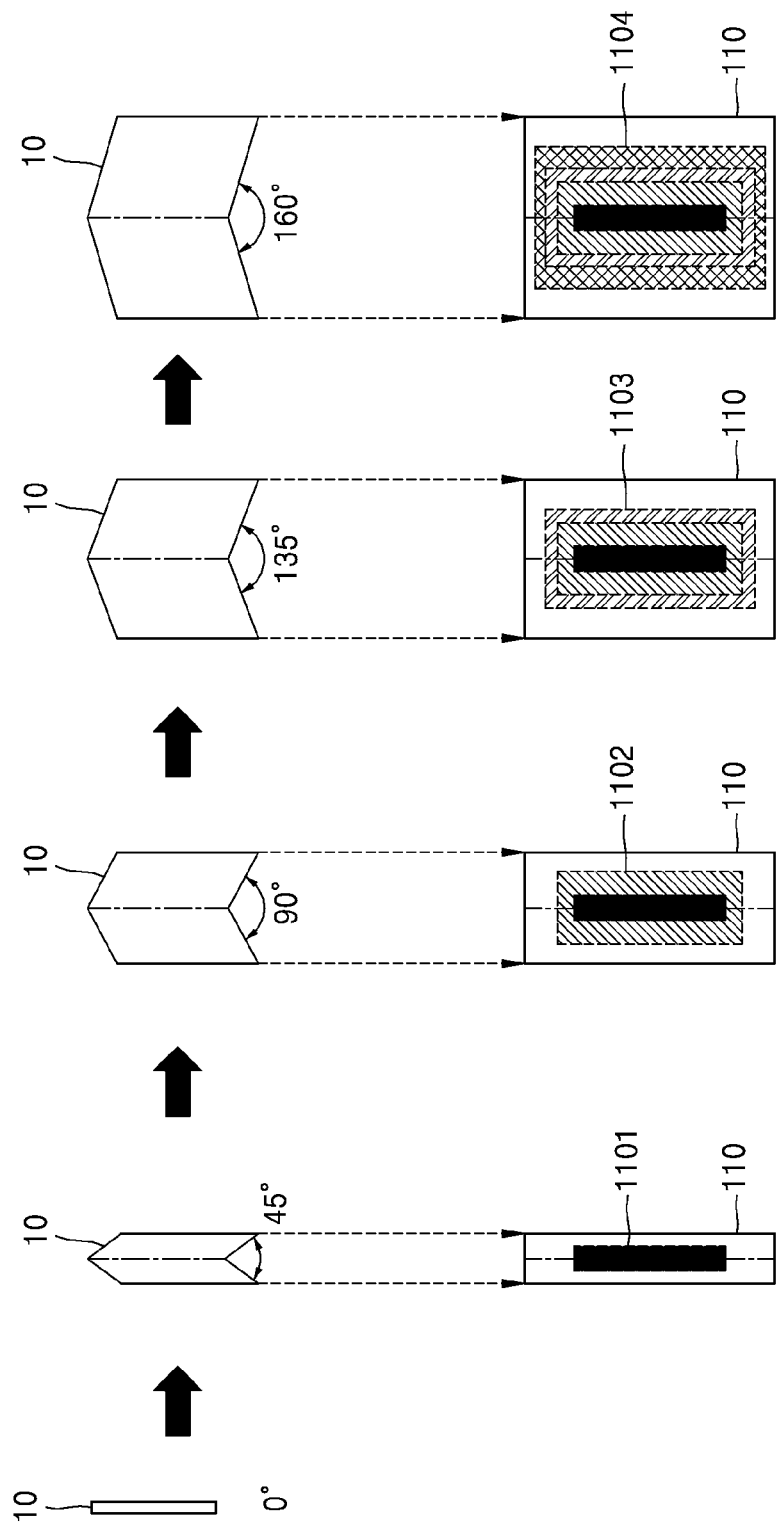
FIG. 11 is a diagram illustrating user interface screens to be displayed at the respective unfolding angles of a flexible device employing a flexible display according to an exemplary embodiment.
Figure 12:
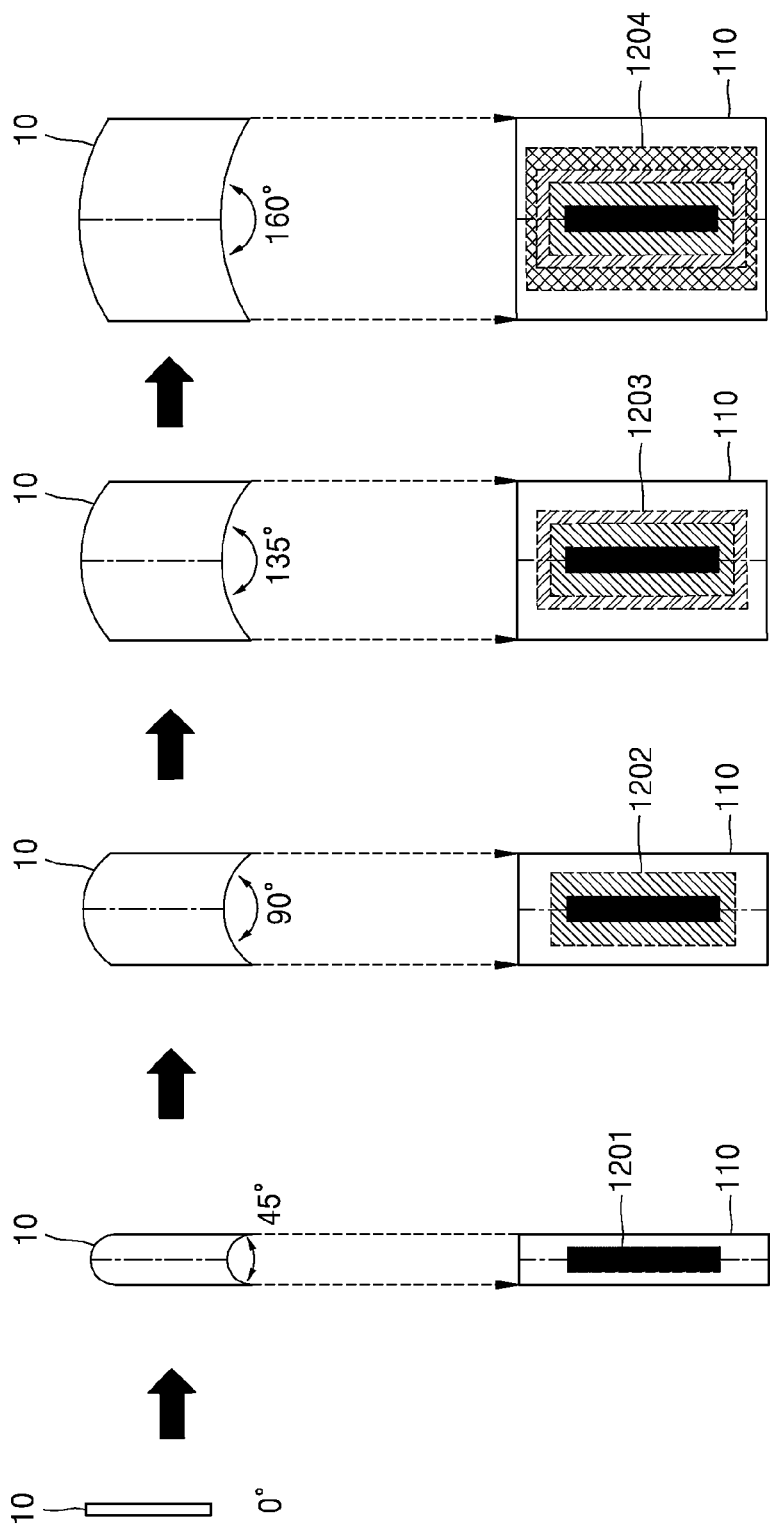
FIG. 12 is a diagram illustrating user interface screens to be displayed according to a bending curvature of a flexible device employing a flexible display according to an exemplary embodiment.

In one or more exemplary embodiments, the term "layout" signifies a user interface screen to be displayed at a particular degree of deformation, for example, a particular unfolding angle. In detail, the layout may include composition information about a user interface screen indicating information about a display shape, arrangement, or array of one or more objects to be displayed on a user interface screen at a particular degree of deformation. For example, a particular unfolding angle. For example, as illustrated in FIGS. 11, 12, and 32, a "45°" layout, a "90°" layout, and a "135°" layout may be different from one another. The "45°" layout, "90°" layout, and "135°" layout may denote areas occupied by objects, but exemplary embodiments are not limited thereto. Alternatively, changes in the display type, arrangement, and array of an object included in a layout are generally described with reference to FIGS. 11 to 45.

FIG. 1 is a diagram illustrating a flexible device 10 employing a foldable display with a user interface screen, according to an exemplary embodiment.

Referring to FIG. 1, the flexible device 10 may be embodied by devices having various purposes. For example, according to an exemplary embodiment, the flexible device 10 may be embodied by a mobile phone, a smartphone, a laptop computer, a tablet device, an electronic book device, a smart TV, a digital broadcast device, a personal digital assistant (PDA), a portable multimedia player (PMP), or a navigation device, etc.

The flexible device 10 employs a flexible display 110. The flexible display 110 may include various types that are deformable by an external force, for example, a foldable display that may be folded or unfolded at a particular angle or a particular curvature, a bendable display that may be bent or unbent at a particular curvature, or a rollable display that may be rolled in a cylindrical shape.

The flexible display 110 has a display interfacing function that provides a user interface screen with respect to information processed or to be processed in the flexible device 10, like an existing display such as a liquid crystal display (LCD) or a light emitting diode (LED) display. In other words, the flexible display 110 may display an application program execution screen, a lock screen, or a background screen, etc.

Also, the flexible display 110 may include an input interfacing function of a touch screen or touch pad. Accordingly, the flexible display 110 may sense a touch input by a user and the flexible device 10 may be controlled according to a sensed touch input.

For simplicity's sake, FIG. 1 will be described as if it corresponds to a foldable device employing a foldable display as one type of the flexible display 110. However, it is not limited to any particular type of flexible display. The flexible device 10 may correspond to a bendable device employing a bendable display, or a rollable device employing a rollable display, or many other types of flexible displays.

In the flexible device 10, a layout of a graphical user interface (GUI) provided by the flexible display 110 may dynamically vary as an unfolding angle of the flexible device 10 or the flexible display 110 changes.

When a user does not use the flexible device 10, the user may carry or keep the flexible device 10 in a state of being completely folded. That is, the unfolding angle is "0°". In this state, since the flexible device 10 is completely folded, that is, the unfolding angle is "0°", the flexible display 110 is not exposed to the outside, and thus, the flexible display 110 does not need to display a graphical user interface screen. In other words, when the flexible device 10 is completely folded, the flexible device 10 may be in a standby mode or a power saving mode in which the graphical user interface screen is not displayed, even if power of the flexible device 10 is on.

However, when the user desires to use the flexible device 10, the user opens the flexible device 10 and thus a screen of the flexible display 110 is gradually exposed to the outside. The opening of the flexible device 10 may be denoted as a motion of unfolding the flexible device 10.

In other words, in one or more exemplary embodiments, the "unfolding motion" denotes that the screen of the flexible display 110 is exposed to the outside such that an unfolding angle of the flexible device 10 or the flexible display 110 is between "0°" and "180°." For example, the unfolding motion may denote a motion in which the unfolding angle of the flexible device 10 or the flexible display 110 changes or increases from "0°" to "45°", or a motion in which the unfolding angle increases from "90°" to "135°". In other words, the start and end of the unfolding angle according to the unfolding motion may correspond to any angles between "0°" and "180°". Alternatively, a visible area of the flexible display 110 may extend according to the unfolding motion.

In contrast, the "folding motion" denotes a motion in which the unfolding angle of the flexible device 10 or the flexible display 110 gradually decreases. Accordingly, the visible area of the flexible display 110 may be reduced by the folding motion. For example, the folding motion may denote a motion in which the unfolding angle of the flexible device 10 or the flexible display 110 changes or decreases from "45°" to "0°", or a motion in which the unfolding angle decreases from "180°" to "135°". Similarly to the unfolding motion, the start and end of the unfolding angle according to the folding motion may correspond to any angles between "0°" and "180°".

Figure 4A:
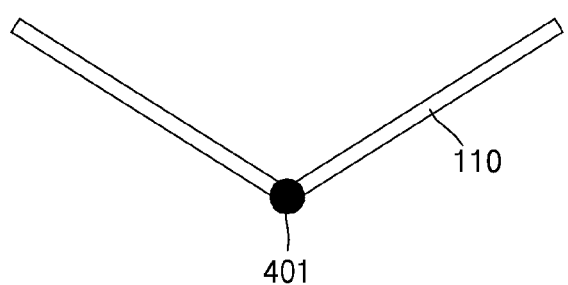
FIG. 4A is a diagram illustrating a method of sensing a folding motion in a sensor according to an exemplary embodiment.
Figure 4B:
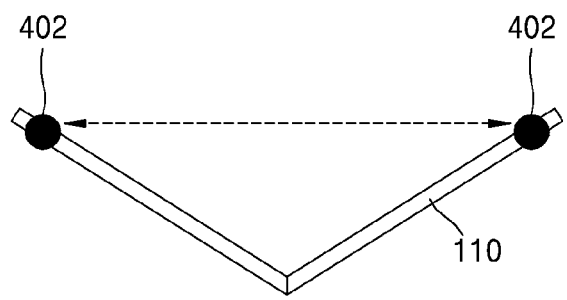
FIG. 4B is a diagram illustrating a method of sensing a folding motion in the sensor according to another exemplary embodiment.
Figure 5A:
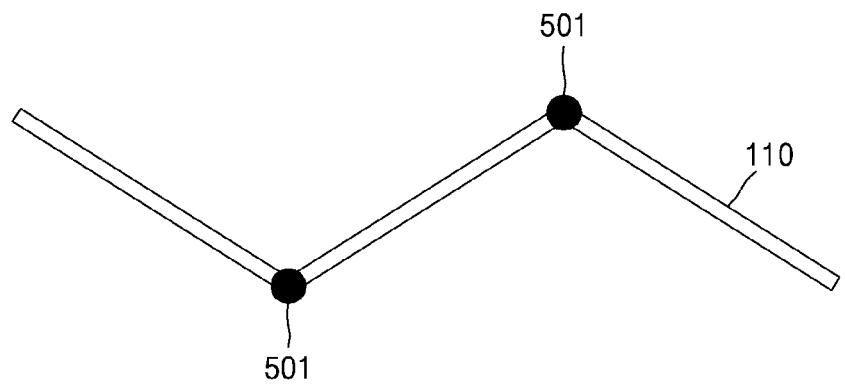
FIG. 5A is a diagram illustrating a method of sensing a folding motion in the sensor according to another exemplary embodiment.
Figure 5B:
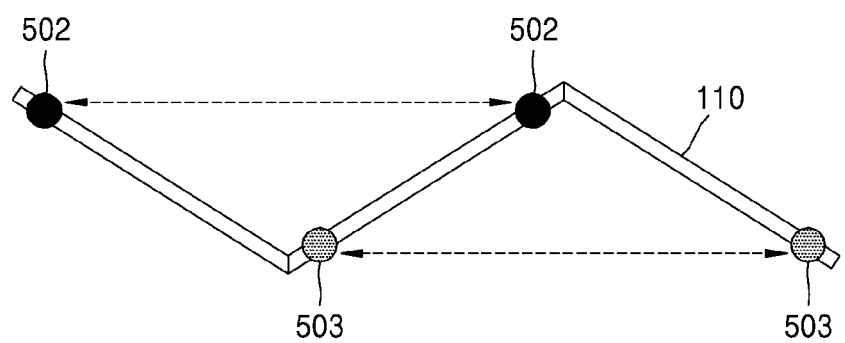
FIG. 5B is a diagram illustrating a method of sensing a folding motion in the sensor according to another exemplary embodiment.

The flexible display 110 may be folded around one folding axis as illustrated in FIGS. 4A and 4B. However, as illustrated in FIGS. 5A and 5B, the flexible display 110 may have two or more folding axes. The folding axis signifies a line along which the flexible display 110 is folded. The folding axis may be an axis around which the flexible display 110 is folded by means of, for example, a hinge provided in the flexible device 10. Alternatively, when the flexible device 10 is symmetrically folded, the folding axis may be a center line of the flexible display 110. However, when the flexible device 10 is asymmetrically folded, the folding axis may not be the center line of the flexible display 110.

A time when the flexible device 10 starts to be unfolded may correspond to a time when the graphical user interface screen starts to be displayed as the standby mode or power saving mode of the flexible device 10 is ended. However, an unfolding angle to define the time when the flexible device 10 starts to be unfolded is a value that may be manually set by a user or it may vary according to a type of the flexible device 10 or a type of an operating system (OS) installed in the flexible device 10, but exemplary embodiments are not limited thereto.

When the flexible device 10 or the flexible display 110 is unfolded at an angle of "45°", a layout 13 of objects is displayed on the flexible display 110. In FIG. 1, when the flexible display 110 is unfolded at an angle of "45°", the layout 13 with two objects are displayed at each side of the flexible display 110. Although described below in detail, the object may correspond to an icon of an application, a shortcut of an application, a lock screen, etc. Accordingly, when the user clicks the object of the layout 13, an application corresponding to the object may be executed or a content corresponding to the object may be reproduced.

When the flexible device 10 or the flexible display 110 is further unfolded at an angle of "135°", the screen of the flexible display 110 is more exposed to the outside than at an angle of "45°". Accordingly, the user may see a screen of the flexible display 110 that is larger than the screen at an angle of "45°". When the flexible display 110 is unfolded at an angle of "135°", the layout 13 of objects is displayed on the flexible display 110. In FIG. 1, compared to the unfolding angle of "45°", when the flexible display 110 is unfolded at an angle of "135°", the layout 13 with four objects is displayed at each side of the flexible display 110.

In other words, as the flexible device 10, according to an exemplary embodiment, is gradually unfolded at an angle from "0°" to "45°" and then to "135°", the layout 13 of the graphical user interface displayed on the screen of the flexible display 110 may dynamically vary. When the user sees the flexible device 10 from the front side thereof, the user may recognize a relatively larger area of the screen of the flexible display 110 as the unfolding angle increases. Accordingly, the flexible display 110 may provide the layout 13 that gradually displays more objects as the unfolding angle increases.

Alternatively, although FIG. 1 illustrates that more objects of the layout 13 are displayed as the unfolding angle increase from "0°" to "135°", an exemplary embodiment is not limited thereto. In other words, the dynamic varying of the graphical user interface to increase the number of objects, which is described in FIG. 1, is a mere example. The flexible display 110 according to an exemplary embodiment may dynamically vary not only the number of the objects included in the layout 13, but also various other display states such as the size or arrangement of the objects included in the layout 13 according to a change in the unfolding angle, which will be described below in detail with reference to the other accompanying drawings.

One or more exemplary embodiments are described in terms of display interfacing to provide a layout of graphics in an interaction with the deformation of the flexible device 10 (e.g., folding, bending, unfolding, unbending, etc.), with reference to FIG. 1 above and FIGS. 2 to 45 below. Also, exemplary embodiments are described below in terms of display interfacing to increase readability by reducing display distortion of a layout due to the deformation of the flexible device 10 with reference to FIGS. 46 to 58B. Furthermore, exemplary embodiments are described below in terms of input interfacing to reduce an error in a touch input of the flexible device 10 with reference to FIGS. 59 to 65.

Figure 2:
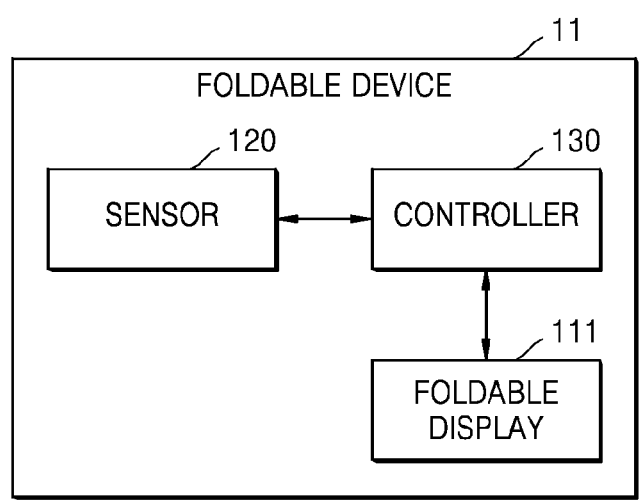
FIG. 2 is a block diagram of a hardware structure of a flexible device according to an exemplary embodiment.

FIG. 2 is a block diagram of a hardware structure of the foldable device 11 according to an exemplary embodiment.

Figure 3:
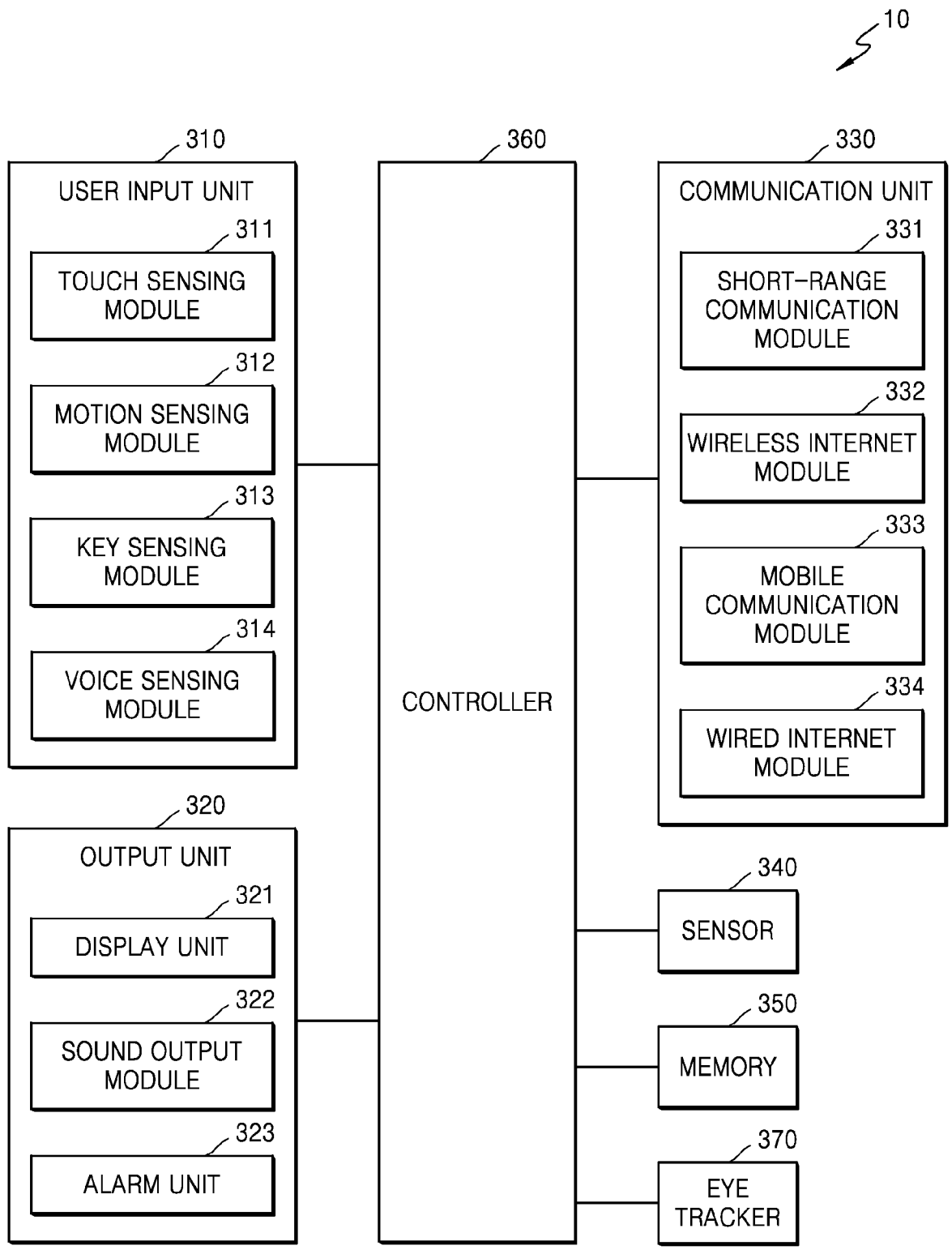
FIG. 3 is a block diagram of a hardware structure of a flexible device according to an exemplary embodiment.

Referring to FIG. 2, a foldable device 11 may include a foldable display 111, a sensor 120, and a controller 130. In FIG. 2, only hardware components related to an exemplary embodiment are described in order to focus on the characteristics of an exemplary embodiment. However, it is obvious that other common hardware components than the hardware components illustrated in FIG. 2 may be further included. In FIG. 2, the foldable device 11 that is a type of flexible device 10 of FIG. 1 or 3 is described. Accordingly, descriptions about the foldable device 11 of FIG. 2 may be applied to the flexible device 10 of FIG. 1 or 3. In other words, even when the flexible device 10 corresponds to other types of devices such as a bendable device or a rollable device, the hard components of the foldable device 11 of FIG. 2 may perform the same functions.

A foldable display 111 is a hardware structure for displaying information processed in the foldable device 11. The foldable device 11 may provide a user with a user interface screen through the foldable display 111. When the foldable device 11 is the flexible device 10 of a different type, the foldable display 111 according to an exemplary embodiment may be replaced by a different type of a display that may be deformed by an external force as described above, which may be, for example, a bendable display or a rollable display to be described later.

The sensor 120 senses a degree of deformation of the foldable device 11 or the foldable display 111. The sensor 120 may sense a range of deformation of the foldable device 11 or the foldable display 111 as the foldable device 11 or the foldable display 111 is deformed. Since the foldable display 111 is deformed in a shape conforming to the foldable device 11, the degree of deformation of the foldable device 11 may have the same meaning as the degree of deformation of the foldable display 111.

The sensor 120 may sense a shape change of the foldable device 11 or the foldable display 111 from a folding state to an unfolding state. The sensor 120 may sense an unfolding angle or an unfolding curvature of the foldable device 11 or the foldable display 111. In other words, the sensor 120 may sense an unfolding motion of the foldable device 11 or the foldable display 111. Likewise, the sensor 120 may sense a shape change of the foldable device 11 or the foldable display 111 from an unfolding state to a folding state. In other words, the sensor 120 may sense a folding motion of the foldable device 11 or the foldable display 111. Although in exemplary embodiments, only the unfolding angle is described for convenience of explanation, when an unfolding curvature is sensed by the sensor 120, like the unfolding angle, the unfolding curvature may be applied to exemplary embodiments.

When a bendable display is used instead of the foldable display 111, the sensor 120 may sense a bending curvature indicating a degree of bending of the bendable display. Also, when a rollable display is used instead of the foldable display 111, the sensor 120 may sense a degree of rolling of the rollable display. In other words, the sensor 120 may sense various deformation states corresponding to the type of the flexible display 110, according to the type of the flexible display 110.

The controller 130 is a hardware structure embodied by at least one processor such as a central processing unit (CPU) or an application processor (AP) and may perform a function of controlling an overall operation of the foldable device 11.

The controller 130 generates a layout to be displayed on the foldable display 111, in which a visual representation dynamically varies according to the degree of deformation sensed by the sensor 120. In other words, the controller 130 may generate a layout in which a visual effect varies along with an unfolding motion sensed by the sensor 120. Also, the controller 130 may generate a layout in which a visual effect varies along with a folding motion sensed by the sensor 120. As a result, the controller 130 may generate a layout that varies along with an unfolding or folding motion of the foldable device 11 or the foldable display 111. Accordingly, the controller 130 may control the display of a layout such that a change of a representation of at least one object included in the layout corresponds to a sensed unfolding motion or a sensed folding motion.

The controller 130 may perform an overall process of generating a layout such as a display state of an object to be included in a layout or a type of information corresponding to an object. The controller 130 generates a layout of a user interface screen corresponding to each of the deformation states in the deformation range sensed by the sensor 120. Each of the deformation states may denote the unfolding angle or the unfolding curvature. When a bendable display is used instead of the foldable display 111, each of the deformation states may denote the bending curvature.

In detail, the controller 130 may previously generate a layout corresponding to each of the unfolding angles of the foldable display 111. In other words, the controller 130 may generate at each unfolding angle a layout corresponding to each unfolding angle of the foldable display 111. For example, the controller 130 may generate a "layout 45" corresponding to the unfolding angle "45°", a "layout 90" corresponding to the unfolding angle "90°", or a "layout 135" corresponding to the unfolding angle "135°". In other words, the controller 130 may previously generate a layout to be displayed until reaching a particular unfolding angle like processing a plurality of frames for reproduction of a moving picture.

Likewise, when a bendable display or a rollable display is used instead of the foldable display 111, a layout corresponding to each of a bending curvature and a degree of rolling may be previously generated.

The controller 130 may determine a variable component of a visual effect of a layout, corresponding to the unfolding angle sensed by the sensor 120. The variable component of a visual effect may denote, for example, the arrangement, appearance, or number of at least one object to be included in a layout.

The foldable display 111 provides a graphical user interface screen in which a visual representation dynamically varies along with the deformation of the foldable display 111. In other words, when an unfolding motion is sensed, the foldable display 111 may display a layout in which a representation of at least one of objects varies. The foldable display 111 may display the layout generated by the controller 130 in each of the deformation states. In other words, similar to the principle of reproduction of a moving picture in which a plurality of frames are sequentially and rapidly displayed, the foldable display 111 sequentially or continuously displays the layout generated by the controller 130 and thus a dynamic graphical user interface screen may be provided according to the deformation of the foldable display 111.

When the foldable display 111 is embodied by a touch screen of a layer structure in which a display panel and a touch panel are overlapped with each other display, the foldable display 111 may be hardware having both of a display interfacing function and an input interfacing function. The foldable display 111 embodied by a touch screen may have a function of sensing not only a position of a touch input or a touched area, but also a pressure of a touch input. Also, the foldable display 111 may have a function of detecting not only a physical touch but also a proximity touch.

FIG. 3 is a detailed block diagram of a hardware structure of the flexible device 10 according to an exemplary embodiment.

Referring to FIG. 3, the flexible device 10 may include a user input unit 310 (e.g., user interface), an output unit 320 (e.g., outputter), a communication unit 330 (e.g., communicator), a sensor 340, a memory 350, a controller 360, and an eye tracker 370. The user input unit 310 may include a touch sensing module 311 (e.g., touch sensor), a motion sensing module 312 (e.g., motion sensor), a key sensing module 313 (e.g., key sensor), and a voice sensing module 314 (e.g., microphone). The output unit 320 may include a display unit 321 (e.g., display), a sound output module 322 (e.g., sound outputter), and an alarm unit 323 (e.g., alarm). The communication unit 330 may include a short-range communication module 331 (e.g., short-range communicator), a wireless internet module 332 (e.g., wireless interface), a mobile communication module 333 (e.g., mobile interface), and a wired internet module 334 (e.g., wired interface). In FIG. 3, only hardware components related to an exemplary embodiment are described to focus on the characteristics of an exemplary embodiment. However, it should be understood that common hardware components other than the hardware components illustrated in FIG. 3 may be further included or some of the hardware components illustrated in FIG. 3 may be omitted, according to a type of the flexible device 10. Alternatively, the foldable device 11 of FIG. 2 corresponds to the flexible device 10. Descriptions about the flexible device 10 of FIG. 3 may be understood by the description of the foldable device 11 of FIG. 2.

The user input unit 310 may be a hardware structure that enables a user to input information for controlling the flexible device 10. For example, the user input unit 310 may be embodied by a keypad, a dome switch, a touch pad, a jog wheel, a jog switch, etc.

The touch sensing module 311 may sense a touch gesture or touch input of a user and transfer information about a sensed touch gesture or touch input to the controller 360.

The touch sensing module 311 may include various sensors to sense a touch or a proximity touch. To sense the touch gesture or touch input, the touch sensing module 311 may be embodied by a sensor including at least one of a capacitive overlay method, a resistive overlay method, an infrared beam method, a surface acoustic wave method, an integral strain gauge method, and a piezoelectric method, etc.

Also, the touch sensing module 311 may sense a proximity touch by using a proximity sensor. The proximity sensor may denote a sensor that senses an object approaching a predetermined sensing surface or the existence of an object existing nearby the proximity sensor by using a force of an electronic field or an infrared beam without mechanical contact. The proximity sensor may include, for example, at least one of a transmission type photoelectric sensor, a direct reflection type photoelectric sensor, a mirror reflection photoelectric sensor, a high frequency oscillation type proximity sensor, a capacitance type proximity sensor, a magnetic type proximity sensor, and an infrared proximity sensor, etc.

The touch gesture or touch input of a user may include a tap, touch and hold, double tap, drag, panning, flick, drag and drop, etc.

The touch sensing module 311 may be embodied by a touch screen, forming a multilayer structure with the display unit 321. In other words, the foldable display 111 of FIG. 2 may be embodied by a hardware structure of a touch screen including the touch sensing module 311 and the display unit 321.

The motion sensing module 312 may recognize a motion of the flexible device 10 and transfer information about the motion of the flexible device 10 to the controller 360. The motion sensing module 312 may recognize a motion such as 3-dimensional (3D) movement or rotation.

The motion sensing module 312 may include various sensors to recognize a motion of the flexible device 10. For example, the motion sensing module 312 may include at least one of an acceleration sensor, a tilt sensor, a gyro sensor, and a 3-axis magnetic sensor, etc.

Motion input that may be recognized by the motion sensing module 312 may include a 3D motion input in which the flexible device 10 moves in directions along an X-axis, a Y-axis, and a Z-axis, a rotation motion input in which the flexible device 10 rotates in at least one direction in a 3D space, a shaking motion input in which the flexible device 10 is shaken in at least one direction, and an inclination motion input in which the flexible device 10 inclines in a predetermined direction.

The key sensing module 313 may recognize a user command input through a hardware key, for example, a direction key, a character key, or a mouse. The voice sensing module 314 may recognize voice of a user by using a voice recognition engine and transfer the recognized voice to the controller 360.

The output unit 320 is a hardware structure for outputting an audio signal, a video signal, or an alarm signal.

The display unit 321 is a display interfacing unit to display to a user various pieces of information such as information being processed or to be processed by the flexible device 10. The display unit 321 may display a graphical user interface (GUI) that visually or intuitively provides a user with pieces of information processed by the flexible device 10. The foldable display 111 of FIG. 2 has a function of the display unit 321. Alternatively, the foldable display 111 of FIG. 2 may be embodied by a hardware structure of a touch screen including the touch sensing module 311 and the display unit 321.

The sound output module 322 outputs audio data received through the communication unit 330 or stored in the memory 350. The sound output module 322 may include a speaker or a buzzer.

The alarm unit 323 outputs a signal to notify generation of an event of the flexible display 110. The alarm unit 323 may output a signal to notify generation of an event in a method of at least one of an audio signal, a video signal, and a vibration signal.

The communication unit 330 is a hardware structure that communicates with an external network or an external device.

The short-range communication module 331 denotes a module for short-range communication. The short-range communication technology includes Bluetooth, ultra wideband (UWB), ZigBee, near field communication (NFC), Wi-Fi direct (WFD), infrared data association (IrDA), etc.

The wireless internet module 332 is a module for wireless internet connection. The mobile communication module 333 is a module for communicating with a mobile communication network. The wired internet module 332 is a module for wired internet connection.

The sensor 340 may sense a deformation motion of the flexible device 10 or the flexible display 130 and transfer information about a sensed deformation motion to the controller 360. The sensor 340 may sense a deformation state of the flexible device 10 or the flexible display 130 that is generated after the flexible device 10 is opened to be used. The sensor 340 may sense a deformation motion of the flexible device 10 by collecting and analyzing information about a deformation motion by using at least one sensor. The deformation motion may include a folding motion, a bending motion, an unfolding motion, an unbending motion, or a rolling motion, as described above. The sensor 340 corresponds to the sensor 120 of FIG. 2.

The sensor 340 may acquire information about a deformation position such as a coordinate value or a deformation line, a deformation direction, a deformation angle, a deformation curvature, deformation strength, a deformation speed, a deformation frequency, a deformation motion generation time, or a deformation motion maintenance time, in relation to a deformation motion. The sensor 340 may be embodied by at least one of a load cell, a bending sensor, an infrared sensor, a pressure sensor, and an electromagnetic sensor, etc.

FIG. 4A is a diagram illustrating a method of sensing a folding motion in the sensor 340 according to an exemplary embodiment.

Referring to FIG. 4A, the flexible display 110 is assumed to be folded around one folding axis. A folding sensor 401 of the sensor 340 is located at the folding axis of the flexible display 110 to measure an unfolding angle of the flexible display 110. The folding axis denotes a line around which the flexible display 110 is unfolded. When the flexible display 110 is symmetrically folded, the folding axis may be a center line of the flexible display 110. However, when the flexible display 110 is asymmetrically folded, the folding axis may not be the center line of the flexible display 110.

FIG. 4B is a diagram illustrating a method of sensing a folding motion in the sensor 340 according to another exemplary embodiment.

Referring to FIG. 4B, the flexible display 110 is assumed to be folded around one folding axis, as illustrated in FIG. 4A. However, unlike FIG. 4A, a pair of folding sensors 402 of the sensor 340 of FIG. 4B are located at opposite ends of the flexible display 110 not at the folding axis of the flexible display 110 to measure the unfolding angle of the flexible display 110. The folding sensors 402 of the sensor 340 may measure the unfolding angle of the flexible display 110 by using a measured distance between the sensors. The folding sensors 402 may be embodied by infrared sensors for measuring a distance.

FIG. 5A is a diagram illustrating a method of sensing a folding motion in the sensor 340 according to another exemplary embodiment.

Referring to FIG. 5A, the flexible display 110 is assumed to be folded around a plurality of folding axes, that is, two folding axes in an exemplary embodiment. The two folding sensors 501 of the sensor 340 may be respectively located at the two folding axes of the flexible display 110 to measure the unfolding angle of the flexible display 110.

FIG. 5B is a diagram illustrating a method of sensing a folding motion in the sensor 340 according to another exemplary embodiment.

Referring to FIG. 5B, the flexible display 110 is assumed to be folded around a plurality of folding axes, that is, two folding axes in an exemplary embodiment, like FIG. 5A. However, unlike FIG. 5A, two pairs of folding sensors 502 and 503 of the sensor 340 of FIG. 5B may be located at opposite ends of the flexible display 110 near each of the folding axes of the flexible display 110 to measure the unfolding angle of the flexible display 110. Each of the pair of folding sensors 502 and the pair of folding sensors 503 of the sensor 340 may measure the unfolding angle of the flexible display 110 by using a distance between the folding sensors of each pair. The folding sensors 502 and 503 may be embodied by infrared sensors for measuring a distance.

Figure 6A:
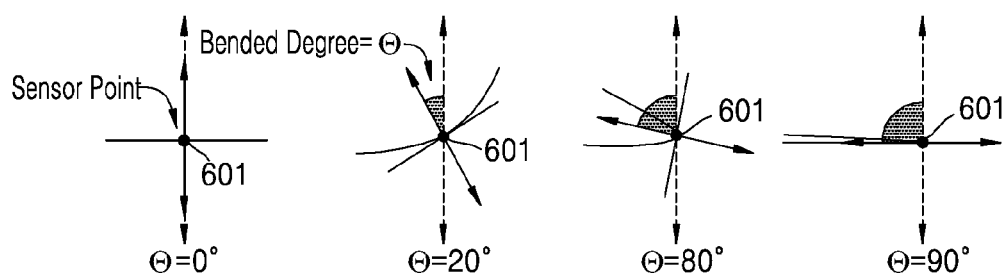
FIGS. 6A and 6B are diagrams illustrating a method of sensing a bending motion in the sensor according to an exemplary embodiment.
Figure 6B:
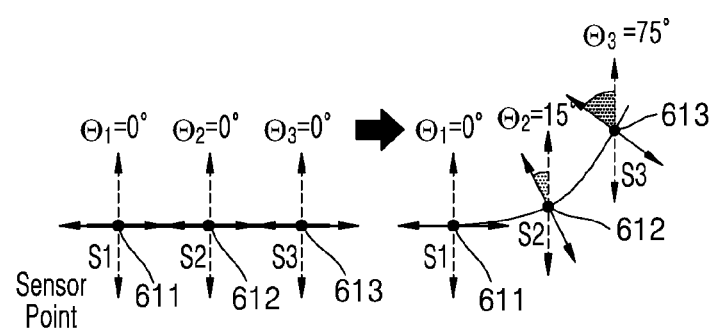

FIGS. 6A and 6B are diagrams illustrating a method of sensing a bending motion in the sensor 340 according to an exemplary embodiment. Referring to FIG. 6A, the sensor 340 may collect a numerical change of a sensor point where a bending sensor 601 is located.

Referring to FIG. 6A, the bending sensor 601 may sense a bending curvature at a sensor point. For example, the bending sensor 601 may sense a bending curvature from +180° to −180°.

Also, referring to FIG. 6B, a plurality of bending sensors 611, 612, and 613 arranged at a predetermined interval may sense a bending curvature at each sensor point.

Referring back to FIG. 3, the memory 350 is a hardware structure for storing the information processed by the flexible device 10 and may be embodied by a hard disk drive (HDD), a solid state drive (SDD), random access memory (RAM), or read only memory (ROM). For example, the memory 350 may store overall information about the graphical user interface screen to be displayed through the flexible display 110.

The controller 360 is a hardware structure for controlling the overall operation and functions of the flexible device 10 and may be embodied by at least one processor such as a CPU or an AP. The controller 130 of FIG. 2 described above may correspond to the controller 360.

The eye tracker 370 is a hardware structure for detecting a viewing direction of a user seeing the flexible display 110 and may be embodied by a module such as an infrared camera or a proximity sensor. The eye tracker 370 may detect a viewing direction by recognizing a direction of user's eyes, a direction toward the front side of the face of a user, etc. The eye tracker 370 may measure not only the viewing direction but also a distance between the flexible display 110 and the user.

Figure 7A:
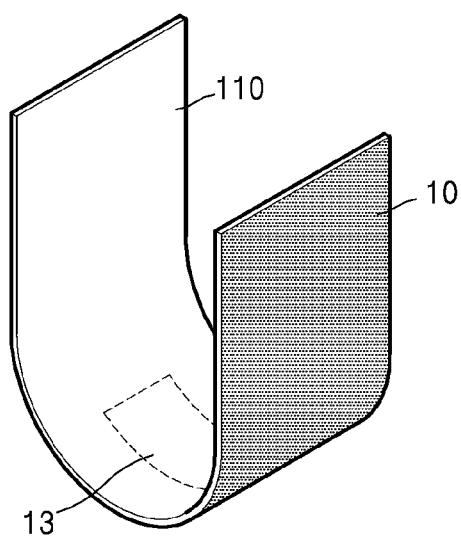
FIGS. 7A, 7B, and 7C are diagrams illustrating a flexible device employing a bendable display with a user interface screen according to an exemplary embodiment.
Figure 7B:
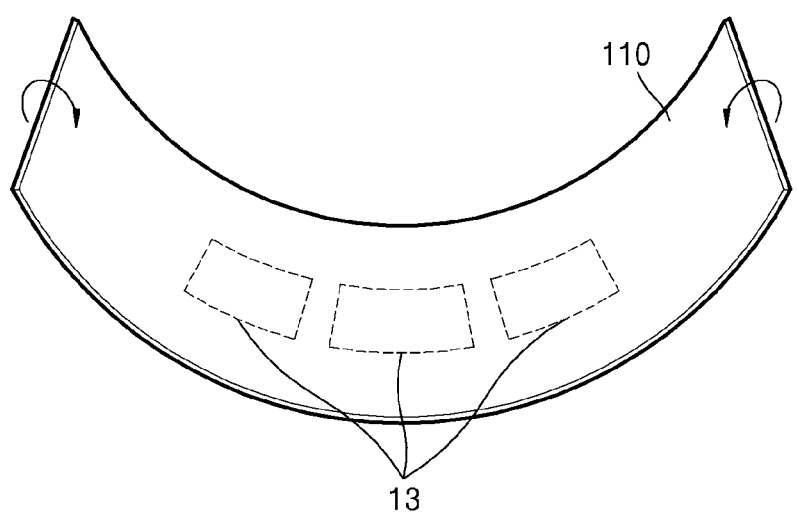
Figure 7C:
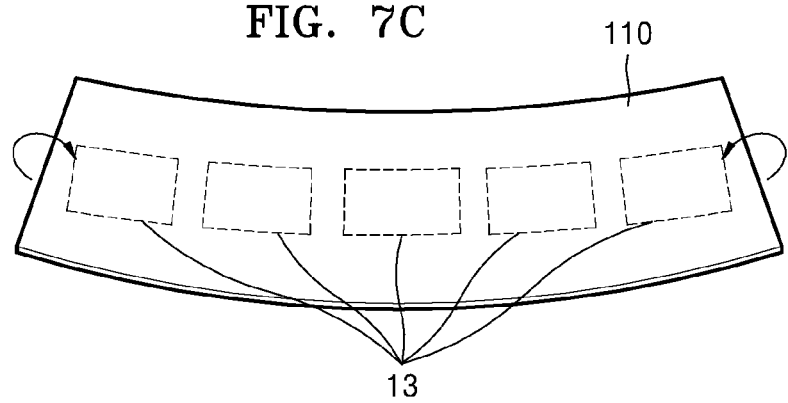

FIGS. 7A, 7B, and 7C are diagrams illustrating that the flexible device 10 employing a bendable display provides a user interface screen according to an exemplary embodiment. Referring to FIGS. 7A to 7C, the flexible device 10 is assumed to be a bendable device rather than a foldable device.

In FIG. 7A, the flexible device 10 is bent significantly and thus a display area that the user sees decreases. Accordingly, the layout 13 includes only one object displayed on the flexible display 110. However, in FIG. 7B in which the flexible device 10 is unbent to a degree, the display area the user sees increases compared to that of FIG. 7A. Accordingly, the layout 13 includes three objects, which is more than the number of objects in FIG. 7A, displayed on the flexible display 110. In FIG. 7C, in which the flexible device 10 is unbent to its maximum amount, the display area the user sees is the largest area. Accordingly, the layout 13 includes five objects, which is more than the number of objects in FIG. 7B, displayed on the flexible display 110.

In other words, like the foldable device, in the flexible display 110, the graphical user interface provided by the flexible display 110 may dynamically vary according to the bending curvature of the flexible device 10 or the flexible display 110. However, in FIGS. 7A to 7C, for convenience of explanation, the number of the objects included in the layout 13 dynamically varies according to the bending curvature of the flexible device 10 or the flexible display 110. However, the disclosure is not limited to this. For example, according to an exemplary embodiment described below, various display states such as the size and arrangement of the objects included in the layout 13 may dynamically vary.

Figure 8:
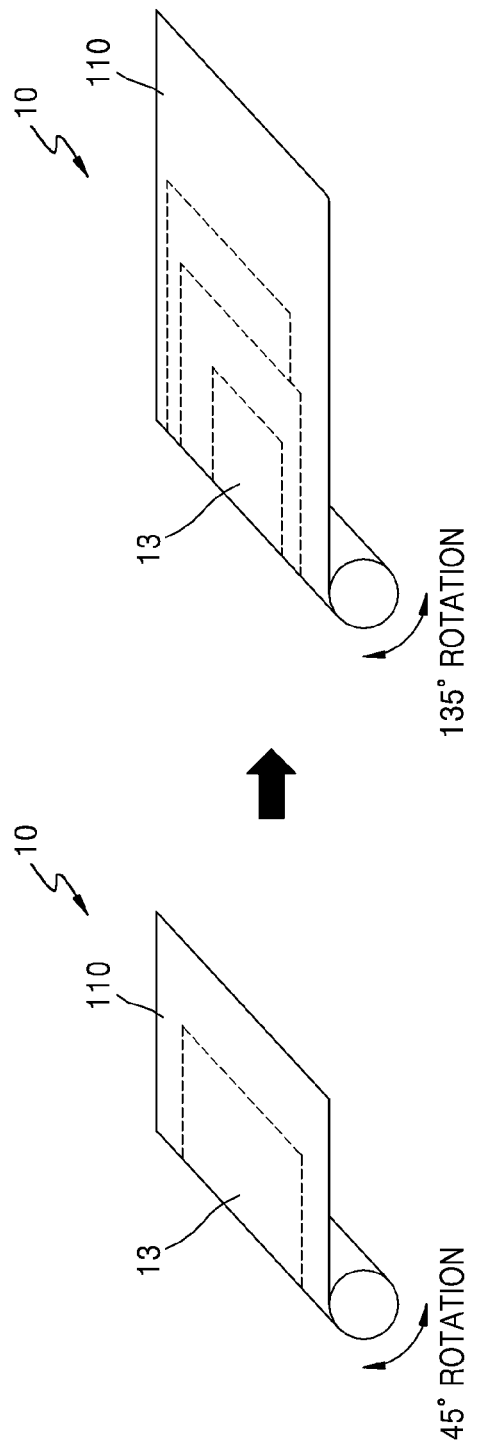
FIG. 8 is a diagram illustrating a flexible device employing a rollable display with a user interface screen, according to an exemplary embodiment.

FIG. 8 is a diagram illustrating that the flexible device 10 employing a rollable display provides a user interface screen, according to an exemplary embodiment.

In a state in which the flexible device 10 is significantly rolled (e.g., a rolling axis is rotated by "45°"), since the display area the user see is relatively small, the layout 13 includes only one object displayed on the flexible display 110. However, in a state in which the flexible device 10 is relatively unrolled (e.g., the rolling axis is rotated by "135°"), since the display area the user sees is relatively large, the layout 13 includes three objects, which are relatively more than one object, displayed on the flexible display 110.

In other words, similar to the foldable device or bendable device, in the flexible display 110, the graphical user interface provided by the flexible display 110 may dynamically vary according to a degree of rolling of the flexible device 10. However, in FIG. 8, for convenience of explanation, the number of objects included in the layout 13 dynamically varies according to a degree of rolling of the flexible device 10. As described below, an exemplary embodiment is not limited thereto and various display states such as the size and arrangement of the objects included in the layout 13 may dynamically vary.

Figure 9:
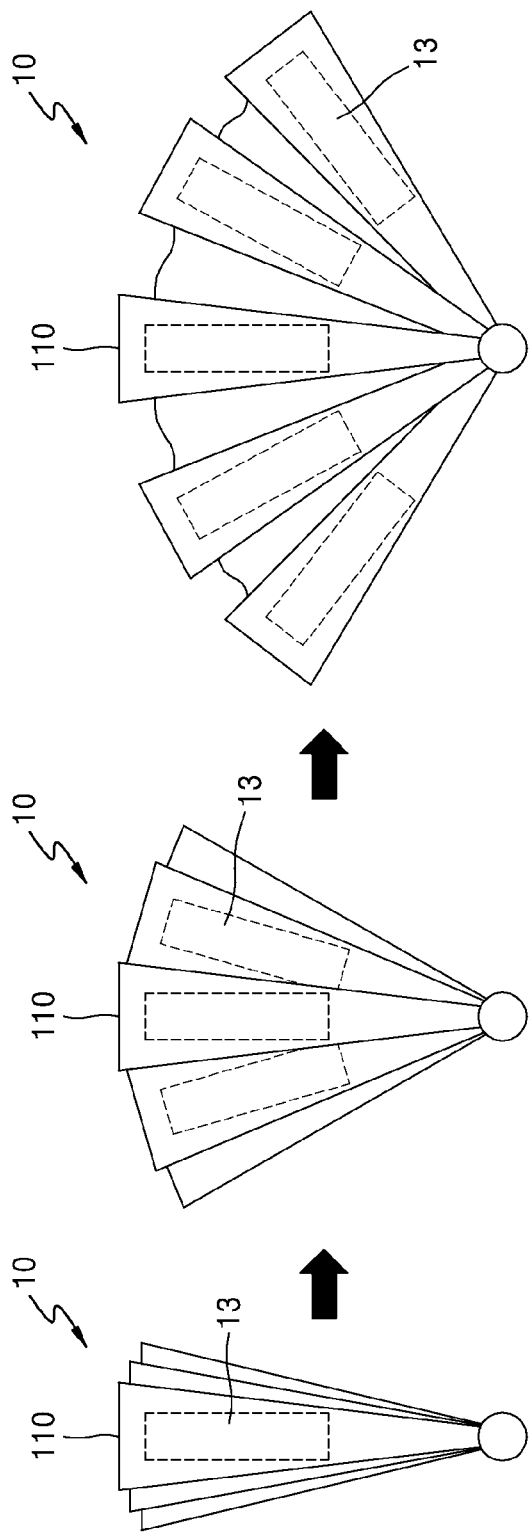
FIG. 9 is a diagram illustrating a flexible device having a fan shape with a user interface screen according to an exemplary embodiment.

FIG. 9 is a diagram illustrating a flexible device having a fan shape with a user interface screen according to an exemplary embodiment. Referring to FIG. 9, the flexible device 10 is assumed to be a device having a fan shape.

In a state in which the flexible device 10 is folded relatively much, since the display area the user sees is only one of the fans, the layout 13 includes only one object displayed on the flexible display 110. However, in a state in which the flexible device 10 is unfolded more, since the display area the user sees is three of the fans, the layout 13 includes three objects, which are relatively more than one object, displayed on the flexible display 110. In a state in which the flexible device 10 is unfolded at its maximum, the layout 13 includes five objects, which are relatively more than three objects, displayed on the flexible display 110.

In other words, like the above-described respective types of the flexible device 10, the graphical user interface provided by the flexible display 110 may dynamically vary according to a degree of unfolding of the flexible device 10. However, for convenience of explanation, FIG. 9 illustrates that the number of the objects included in the layout 13 dynamically varies according to a degree of unfolding of the flexible device 10. As described below, an exemplary embodiment is not limited thereto and various display states such as the size and arrangement of the objects included in the layout 13 may dynamically vary.

Figure 10A:
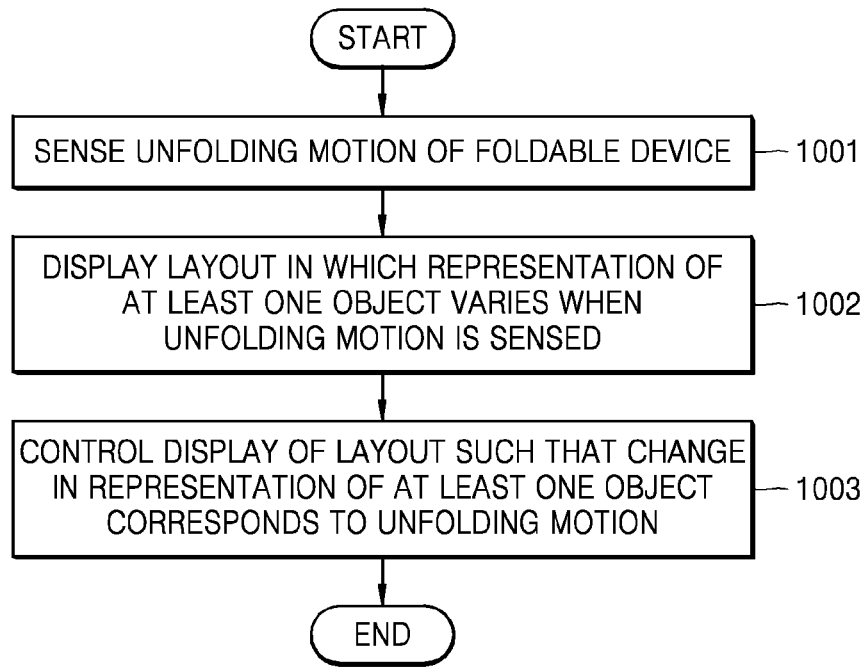
FIG. 10A is a flowchart illustrating a method of providing a user interface screen in a foldable device according to an exemplary embodiment.

FIG. 10A is a flowchart illustrating a method of providing a user interface screen in a foldable device according to an exemplary embodiment. Referring to FIG. 10A, since the method of providing a user interface screen is a set of processes that are time-serially processed in the foldable device 11 of FIG. 2 or the flexible device 10 of FIG. 3, the descriptions presented with reference to other drawings, though they may be omitted in the following descriptions, may be applied to the method of providing a user interface screen of FIG. 10A.

In Operation 1001, the sensor 120 senses an unfolding motion of the foldable device 11 or the flexible device 10.

In Operation 1002, when the unfolding motion is sensed, the foldable display 111 or the flexible display 110 displays a layout in which a representation of at least one object varies.

In Operation 1003, the controller 130 controls the display of a layout such that a change in the representation of at least one object corresponds to the unfolding motion.

Figure 10B:
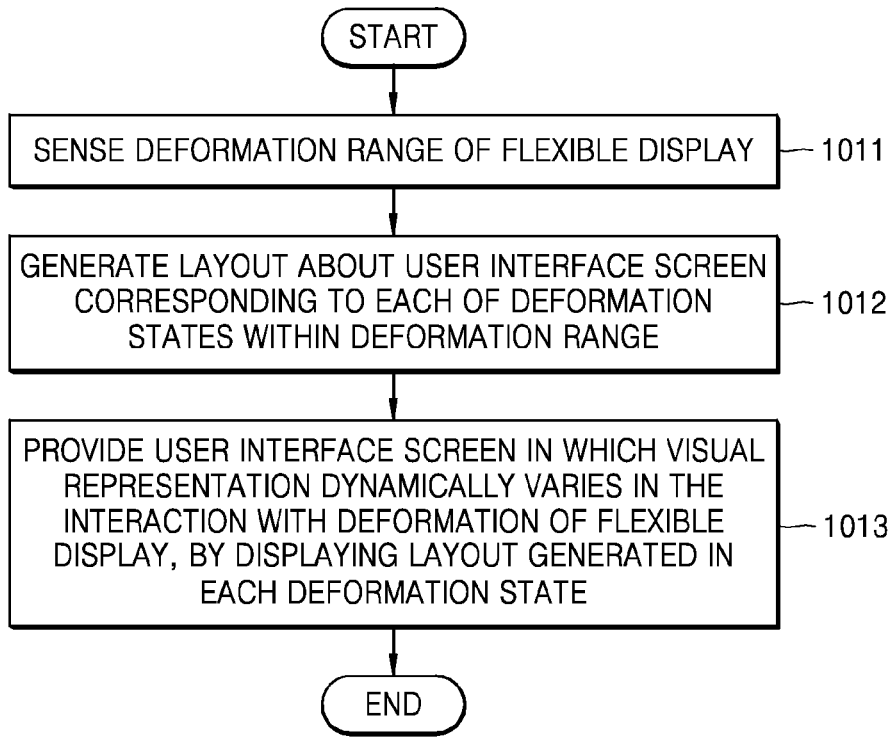
FIG. 10B is a flowchart illustrating a method of providing a user interface screen in a flexible device according to an exemplary embodiment.

FIG. 10B is a flowchart illustrating a method of providing a user interface screen in a flexible device according to an exemplary embodiment. Referring to FIG. 10B, since the method of providing a user interface screen is a set of processes that are time-serially processed in the foldable device 11 of FIG. 2 or the flexible device 10 of FIG. 3, the descriptions provided with reference to the other drawings, though they may be omitted in the following descriptions, may be applied to the method of providing a user interface screen of FIG. 10B.

In Operation 1011, while the flexible display 110 or the flexible device 10 is deformed, the sensor 120 senses a deformation range of the flexible display 110 or the flexible device 10.

In Operation 1012, the controller 130 generates a layout about a user interface screen corresponding to each of deformation states within a sensed deformation range.

In Operation 1013, the flexible display 110 provides a user interface screen in which a visual representation dynamically varies in the interaction with the deformation of the flexible display 110, by displaying the layout generated by the controller 130 in each deformation state.

FIG. 11 is a diagram illustrating user interface screens to be displayed at the respective unfolding angles of the flexible device 10 employing a flexible display 110 according to an exemplary embodiment.

Referring to FIG. 11, layouts 1101, 1102, 1103, and 1104 are illustrated for cases in which the unfolding angles of the flexible device 10 are "0°", "45°", "90°", "135°", and "160°". Also, FIG. 11 illustrates that the number of objects dynamically varies according to the unfolding angles of the flexible device 10.

When the unfolding angle of the flexible device 10 is "0°", the user is not using the flexible device 10 and thus no layout may be displayed on the flexible display 110. In FIG. 11, the flexible display 110 may be the foldable display 111.

When the unfolding angle of the flexible device 10 is "45°", the flexible display 110 may display the layout 1101 including only one object. When the unfolding angle of the flexible device 10 is "90°", the flexible display 110 may display the layout 1102 including two types of objects. When the unfolding angle reaches "160°" as the unfolding angle of the flexible device 10 gradually increases, the flexible display 110 may display the layout 1104 including four types of objects. In other words, since the area of the flexible display 110 the user sees gradually increases as the flexible device 10 is further unfolded, the flexible display 110 may display more objects as the unfolding angle increases. Accordingly, the flexible display 110 may provide the user with a user experience UX in which the graphical user interface dynamically varies in the interaction with the deformation of the flexible display 110.

However, according to an exemplary embodiment, the graphical user interface may be provided in which not only the number of objects gradually increases as the flexible device 10 is gradually unfolded, but also the number of objects gradually decreases as the flexible device 10 is gradually folded.

FIG. 12 is a diagram illustrating user interface screens to be displayed according to a bending curvature of the flexible device 10 employing a flexible display 110 according to an exemplary embodiment.

Referring to FIG. 12, layouts 1201, 1202, 1203, and 1204 are illustrated for cases in which the bending curvatures of the flexible device 10 are "0°", "45°", "90°", "135°", and "160°". Also, like FIG. 11, FIG. 12 illustrates that the number of objects dynamically varies according to the bending curvatures of the flexible device 10. In FIG. 12, the flexible display 110 may be a bendable display.

In other words, since the area of the flexible display 110 the user sees gradually increases as the flexible device 10 is further unbent, the flexible display 110 may display more objects as the bending curvature increases. Accordingly, the flexible display 110 may provide the user with a user experience UX in which the graphical user interface dynamically varies in the interaction with the deformation of the flexible display 110.

However, according to an exemplary embodiment, the graphical user interface may be provided in which not only the number of objects gradually increases as the flexible device 10 is gradually unbent, but also the number of objects gradually decreases as the flexible device 10 is gradually bent.

Figure 13:
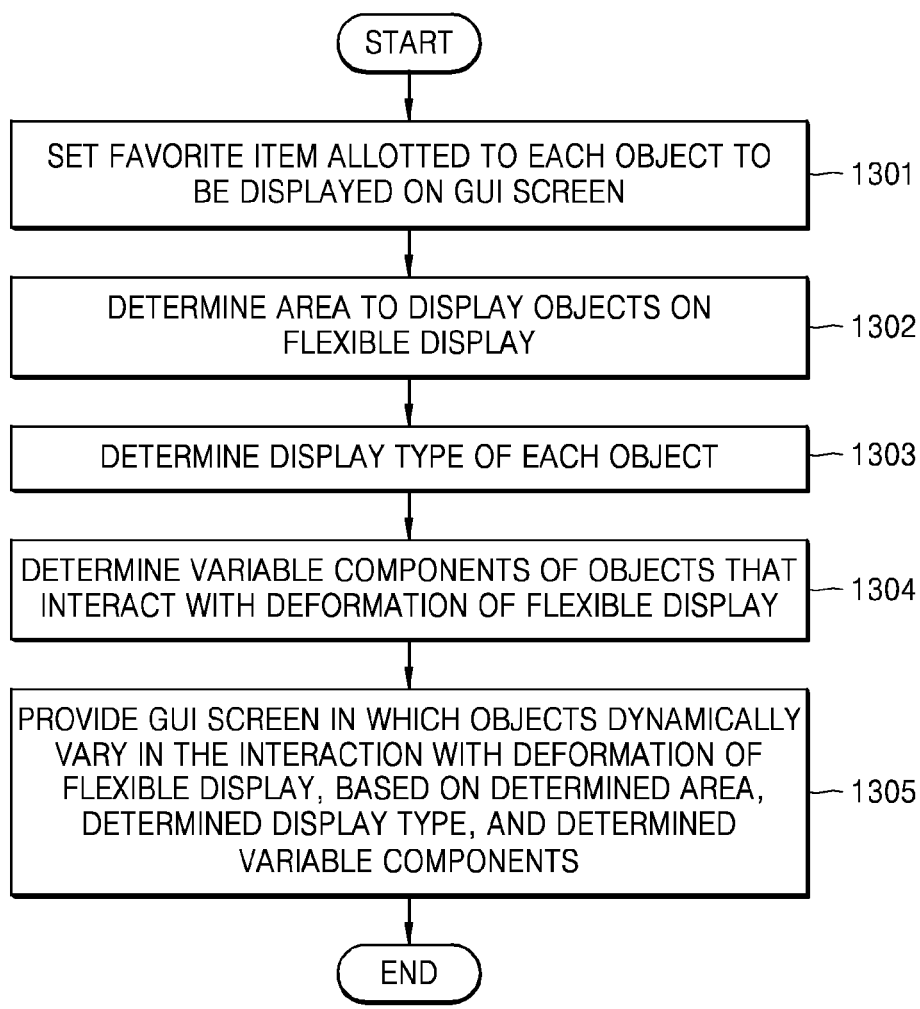
FIG. 13 is a flowchart illustrating the method of providing the user interface screen of FIGS. 10A and 10B.

FIG. 13 is a detailed flowchart illustrating the method of providing the user interface screen of FIGS. 10A and 10B. Referring to FIG. 13, as an example of a method of providing a user interface screen of FIGS. 10A and 10B, a case in which the number of a plurality of objects in a layout varies according to the degree of deformation of the flexible device 10 or the flexible display 110 is described.

In Operation 1301, the controller 130 sets a favorite item allotted to each of the objects to be displayed on the graphical user interface screen. The setting of a favorite item may be input by the user through the flexible display 110 that corresponds to the user input unit 310 (e.g., user interface), for example, a touch screen.

In Operation 1302, the controller 130 determines an area to display the objects on the flexible display 110. For example, when the flexible display 110 is a foldable display, the controller 130 may determine whether to display the objects on both sides with respect to the folding axis of the foldable display or on the entire surface of the foldable display regardless of the folding axis. Also, the controller 130 may determine the position or arrangement of the object to be displayed on the flexible display 110.

Figure 16:
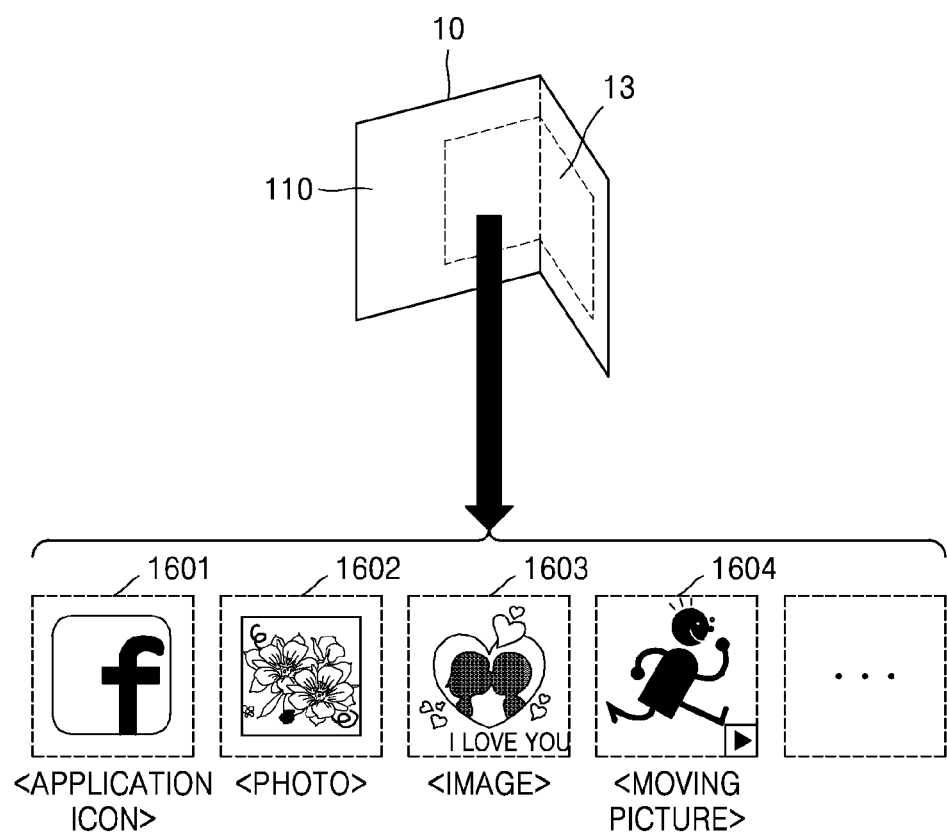
FIG. 16 is a diagram illustrating display types of objects included in a layout to be displayed on a flexible display according to an exemplary embodiment.

In Operation 1303, the controller 130 may determine a display type of each of the objects. For example, the controller 130 may determine which one of various types such as a file tab, a photo, an image, a moving picture, an application icon, etc., to be described below with reference to FIG. 16, is used to display each of the objects.

In Operation 1304, the controller 130 determines variable components of the objects that interact with the deformation of the flexible display 110. For example, the controller 130 may determine how many objects are to be changed or how to change the size, color, font, arrangement, or position of the objects, according to the deformation of the flexible display 110. In addition, the controller 130 may determine various variable components to change the display state of the objects.

In Operation 1305, the flexible display 110 provides the graphical user interface screen in which the objects dynamically vary in the interaction with the deformation of the flexible display 110 based on the area, display type, and variable components that are determined by the controller 130.

Figure 14:
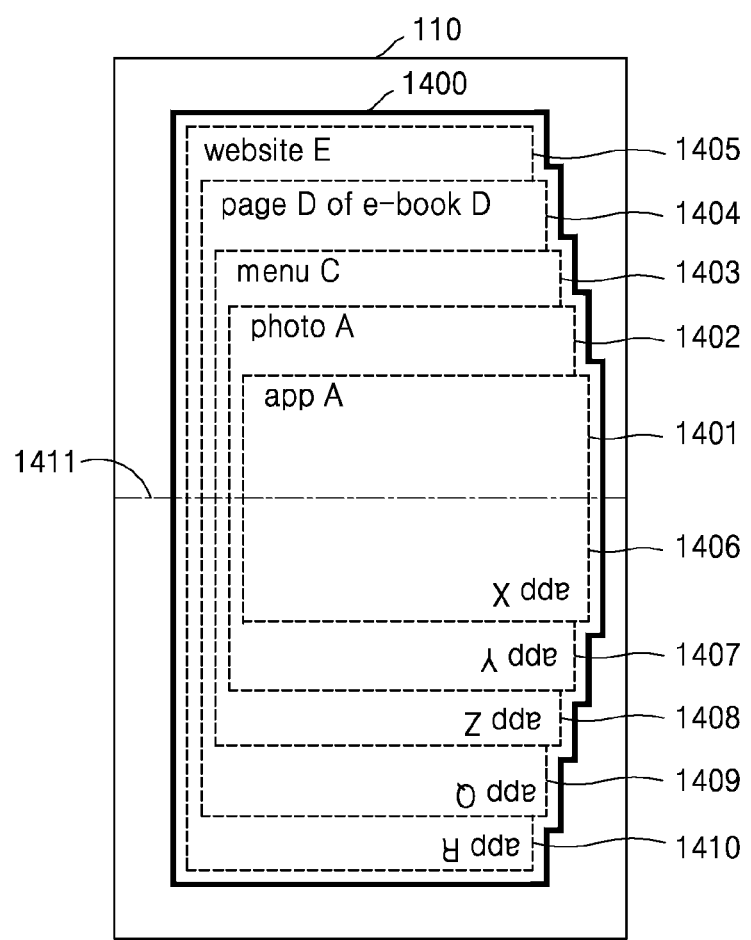
FIG. 14 is a diagram illustrating objects included in a layout to be displayed on a flexible display according to an exemplary embodiment.

FIG. 14 is a diagram illustrating objects included in a layout to be displayed on a flexible display according to an exemplary embodiment.

Referring to FIG. 14, the flexible display 110 may separately display objects 1401 to 1410 in a display area of each of both sides with respect to a folding axis 1411 of the flexible display 110 according to a result of the determination in the operation 1302 of FIG. 13.

The objects 1401 to 1410 on a layout 1400 displayed through the flexible display 110 may correspond to various links. For example, the object 1401 may correspond to an application "app A", the object 1402 may correspond to a photo "photo A" of a photo application installed on the flexible device 10, the object 1403 may correspond to a menu "menu C" of a certain application, the object 1404 may correspond to a page of an electronic book "page D of e-book D", and the object 1405 may correspond to a certain website "website E". Also, the objects 1406 to 1410 may respectively correspond to applications "apps X", "app Y", "app Z", "app 0", and "app R".

In other words, each of the objects 1401 to 1410 on the layout 1400 may correspond to a shortcut to each of the applications installed on the flexible device 10, or each of paths for various purposes that are obtained by using the applications installed on the flexible device 10. The objects 1401 to 1410 may correspond to various links that are provided by an operating system (OS) installed on the flexible device 10.

The links of the objects 1401 to 1410 may be favorite items set by the user. In other words, while using the flexible device 10, the user may directly set as favorite items links to be displayed according to an unfolding motion, an unbending motion, or reverse motions of the flexible device 10 or the flexible display 110.

As described above, the dynamic graphical user interface that interacts with the deformation of the flexible device 10 or the flexible display 110 may be provided such that only the object 1401 ("app A") and the object 1406 ("app X") are initially displayed according to the degree of deformation of the flexible device 10 or the flexible display 110 and then the objects 1401 to 1410 are all displayed as the flexible device 10 or the flexible display 110 is gradually unfolded. Also, not only the number of the objects 1401 to 1410 but also various display states such as the size and color of the objects 1401 to 1410 may be changed in the interaction with the deformation. In FIG. 14, the layout 1400 may refer to an area including all objects 1401 to 1410, but it is not limited thereto.

Figure 15:
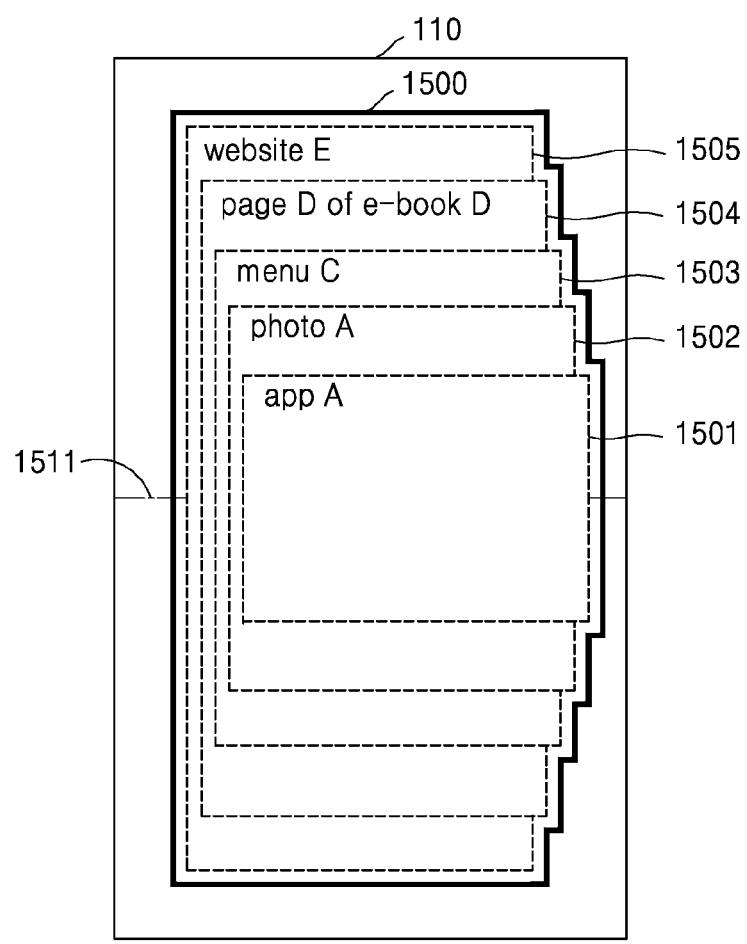
FIG. 15 is a diagram illustrating objects included in a layout to be displayed on a flexible display according to another exemplary embodiment.

FIG. 15 is a diagram illustrating objects included in a layout to be displayed on the flexible display 110 according to another exemplary embodiment.

Referring to FIG. 15, the flexible display 110 may display a plurality of objects 1501 to 1505 across the display areas of both sides of the flexible display 110, regardless of a folding axis 1511 of the flexible display 110, according to a result of the determination in the operation 1302 of FIG. 13.

Like FIG. 14, the objects 1501 to 1505 on a layout 1500 displayed through the flexible display 110 may correspond to various links. For example, the object 1501 may correspond to the application "app A", the object 1502 may correspond to a photo "photo A" of a photo application installed on the flexible device 10, the object 1503 may correspond to a menu "menu C" of a certain application, the object 1504 may correspond to a page of an electronic book "page D of e-book D", and the object 1505 may correspond to a certain website "website E".

The links of the objects 1501 to 1505 may be favorite items set by the user.

The dynamic graphical user interface that interacts with the deformation of the flexible device 10 or the flexible display 110 may be provided such that the object 1501 ("app A") only is initially displayed according to the degree of deformation of the flexible device 10 or the flexible display 110 and then the objects 1501 to 1505 are all displayed as the flexible device 10 or the flexible display 110 is gradually unfolded. Also, not only the number of the objects 1501 to 1505 but also various display states such as the size and color of the objects 1501 to 1505 may be changed in the interaction with the deformation. In FIG. 15, the layout 1500 may refer to an area including all objects 1501 to 1505, but it is not limited thereto.

Although, in one or more exemplary embodiments, as illustrated in FIGS. 14 and 15, the objects 1501 to 1505 are assumed to be displayed by gradually expanding from the center area with respect to the folding axis 1511 to the outside, exemplary embodiments are not limited thereto and the objects 1501 to 1505 may start from a certain area, for example, an upper side, lower side, left side, or right side of the flexible display 110, so that the display state thereof may vary.

FIG. 16 is a diagram illustrating display types of objects included in a layout to be displayed on a flexible display according to an exemplary embodiment.

Referring to FIG. 16, a display type of an object 13 to be displayed on the flexible display 110 of the flexible device 10 may be determined by the controller 130 in the operation 1303 of FIG. 13 to be at least one of various types of an application icon 1601, a photo 1602, an image 1603, a moving picture 1604, etc. Also, the object 13 may be displayed in various other types in addition to the display types illustrated in FIG. 16.

Figure 17:
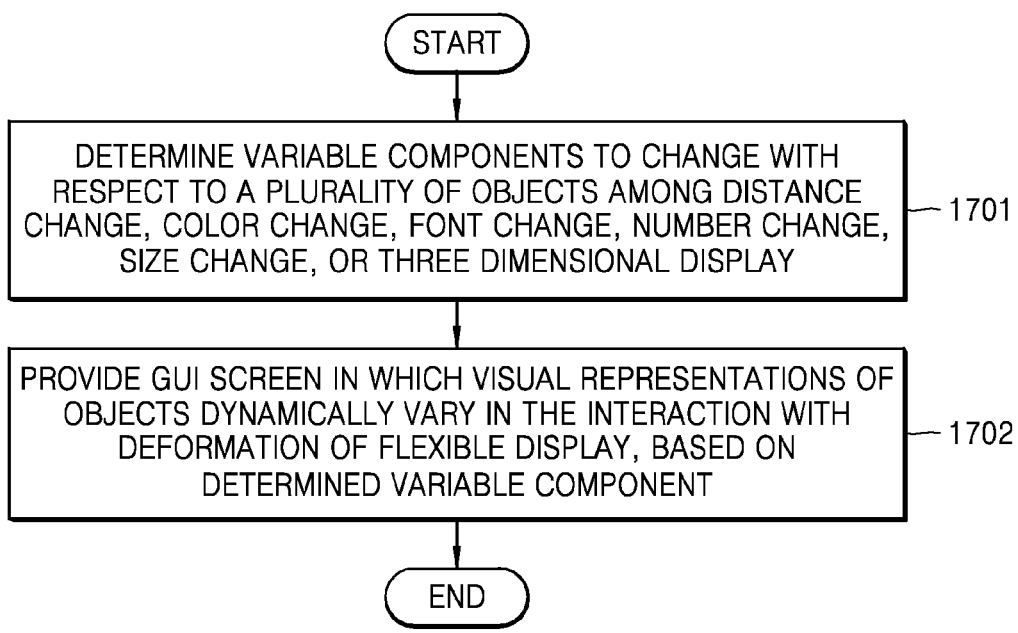
FIG. 17 is a flowchart illustrating a method of determining variable components of objects in the interaction with deformation of a flexible display according to an exemplary embodiment.

FIG. 17 is a flowchart illustrating a method of determining variable components of objects in the interaction with deformation of a flexible display according to an exemplary embodiment.

In Operation 1701, the controller 130 determines variable components to change with respect to a plurality of objects from among a distance change, a color change, a font change, a number change, a size change, or a three dimensional display. In addition, the controller 130 may determine different types of variable components such as a position change of objects, an arrangement change, etc.

In Operation 1702, the flexible display 110 provides a user interface screen in which visual representations of the objects dynamically vary in the interaction with the deformation of the flexible display based on the determined variable component.

Next, various cases in which objects may vary are described. The layouts illustrated in FIGS. 18 to 30 are front views of the flexible display 110 at the respective deformation degrees "45°", "135°", and "160°".

Figure 18:
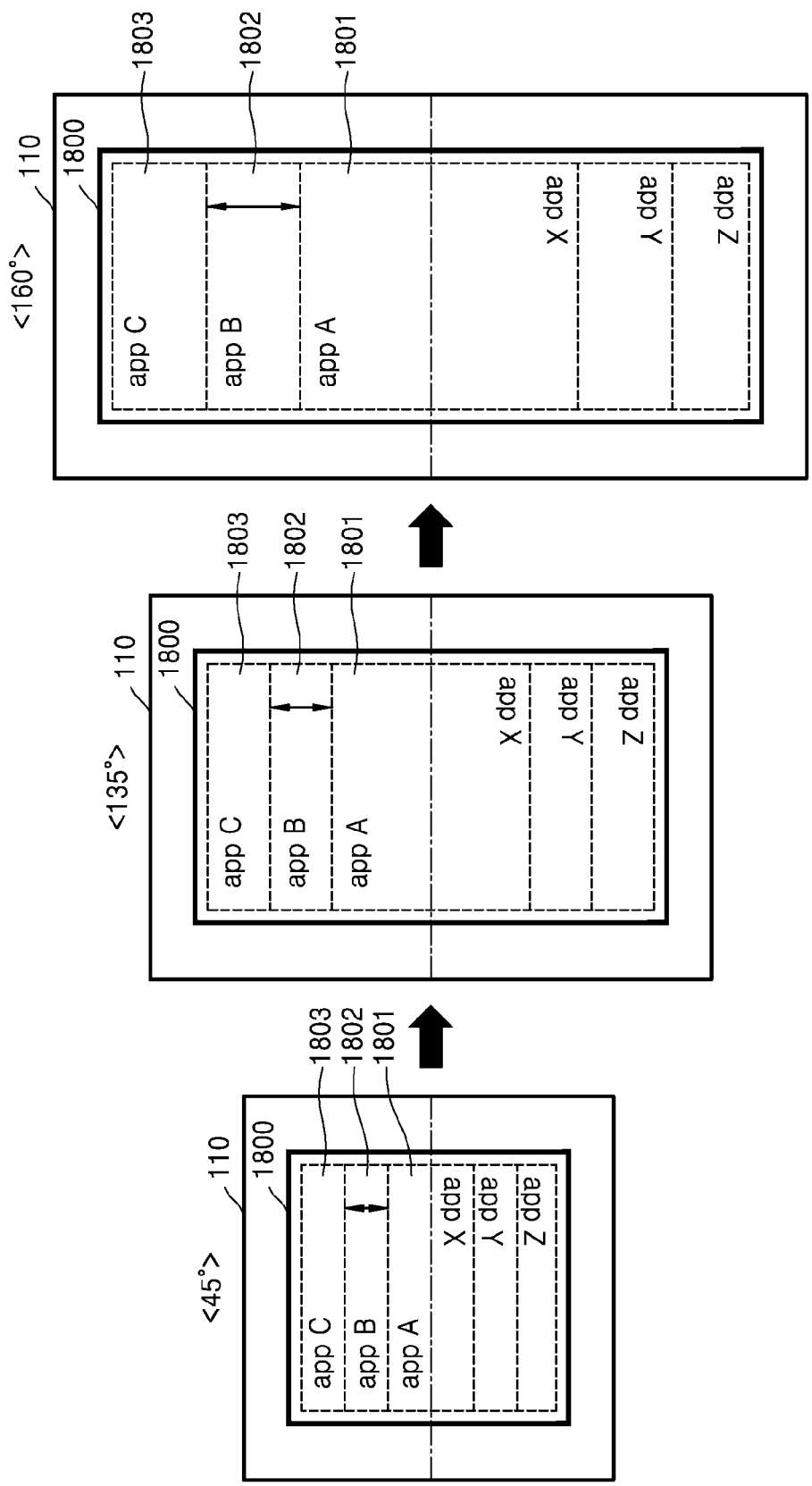
FIGS. 18-21 are diagrams illustrating that display states of objects of a layout dynamically vary according to deformation of a flexible display according to one or more exemplary embodiments.

FIG. 18 is a diagram illustrating that display states of objects of a layout dynamically vary according to a deformation of a flexible display according to an exemplary embodiment.

Referring to FIG. 18, a degree of the unfolding angle or bending curvature of the flexible display 110 is illustrated with respect to a layout 1800 in the states of "45°", "135°", and "160°". The layout 1800 may refer to an area where objects 1801 to 1803 are displayed on the flexible display 110, but it is not limited thereto. Likewise, in FIGS. 19 to 28 similar to FIG. 18, the layout may refer to an area where the objects are displayed on the flexible display 110, but it is not limited thereto. According to FIG. 18, the number of the objects 1801 to 1803 on the layout 1800 may be maintained the same regardless of the deformation of the flexible display 110.

In a case in which a deformation degree or state is "45°" is compared to a case in which the deformation degree or state is "135°", the sizes of the object 1801 ("app A"), the object 1802 ("app B"), and the object 1803 ("app C") are relatively larger when the deformation degree or state is "135°". In other words, in a state in which the flexible display 110 is further unfolded or unbent, the objects 1801 to 1803 may be displayed to be relatively larger in the interaction with the unfolding.

Also, in a case in which the deformation degree or state is "135°" is compared to a case in which the deformation degree or state is "160°", a result of the comparison is similar to the above-described result. In other words, the size and distance of each of the objects 1801 to 1803 on the layout 1800 may be displayed to dynamically vary according to the degree of deformation of the flexible display 110.

Although in FIG. 18 the size and width of each of the objects 1801 to 1803 are described to be simultaneously changed, it is not limited to this. For example, the size and width of one or more of the objects may be changed.

Figure 19:
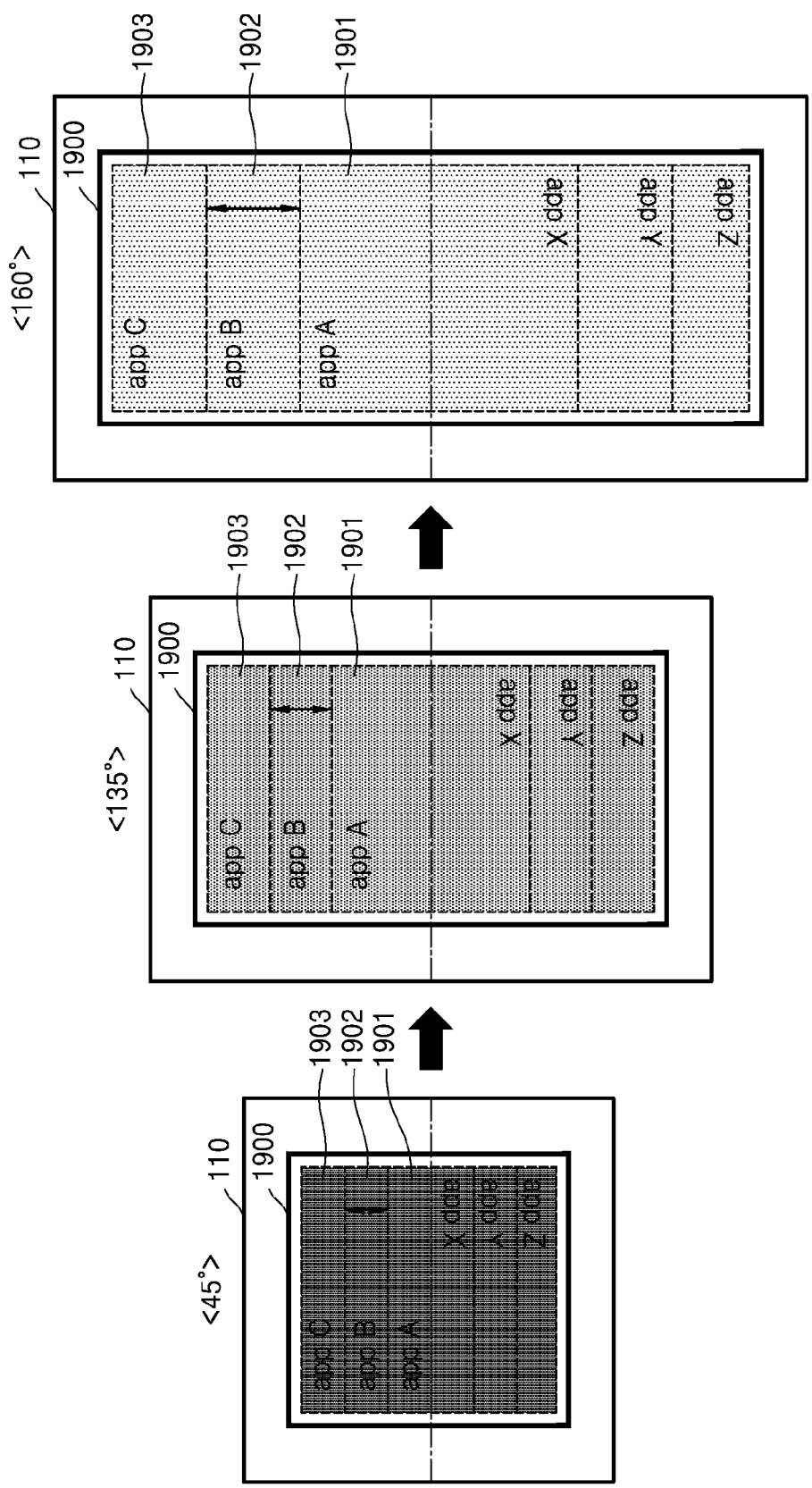

FIG. 19 is a diagram illustrating that display states of objects of a layout dynamically vary according to deformation of a flexible display according to another exemplary embodiment.

Referring to FIG. 19, a layout 1900 in the states in which the deformation degree, such as an unfolding angle or a bending curvature, of the flexible display 110 is "45°", "135°", and "160°" is illustrated. According to FIG. 19, the number of objects 1901 to 1903 of a layout 1900 may be maintained the same regardless of the deformation of the flexible display 110.

In a case in which a deformation degree or state is "45°" is compared to a case in which the deformation degree or state is "135°", as in FIG. 18, the sizes of the object 1901 ("app A"), the object 1902 ("app B"), and the object 1903 ("app C") are relatively larger when the deformation degree or state is "135°". In other words, in a state in which the flexible display 110 is further unfolded or unbent, the objects 1901 to 1903 may be displayed to be relatively larger in the interaction with the unfolding.

Also, in a case in which the deformation degree or state is "45°" is compared to a case in which the deformation degree or state is "135°", as in FIG. 18, the widths of the object 1901 ("app A"), the object 1902 ("app B"), and the object 1903 ("app C") are relatively larger when the deformation degree or state is "135°". In other words, in a state in which the flexible display 110 is further unfolded or unbent, the objects 1901 to 1903 may be displayed to be relatively wider in the interaction with the unfolding.

Furthermore, in a case in which the deformation degree or state is "45°" is compared to a case in which the deformation degree or state is "135°", as in FIG. 18, the colors of the object 1901 ("app A"), the object 1902 ("app B"), and the object 1903 ("app C") are relatively softer when the deformation degree or state is "135°". In other words, in a state in which the flexible display 110 is further unfolded or unbent, the objects 1901 to 1903 may be displayed to have relatively softer colors in the interaction with the unfolding. Also, the objects 1901 to 1903 may be processed to be displayed to be relatively thicker colors.

In a case in which the deformation degree or state is "135°" is compared to a case in which the deformation degree or state is "160°", a result of the comparison is similar to the above-described result. In other words, the size, width, and color of each of the objects 1901 to 1903 on the layout 1900 may be displayed to dynamically vary according to the degree of deformation of the flexible display 110.

Although in FIG. 19 the size, width, and color of the objects 1901 to 1903 are illustrated to be simultaneously changed, at least any one of the size, width, and color thereof may be changed.

Figure 20:
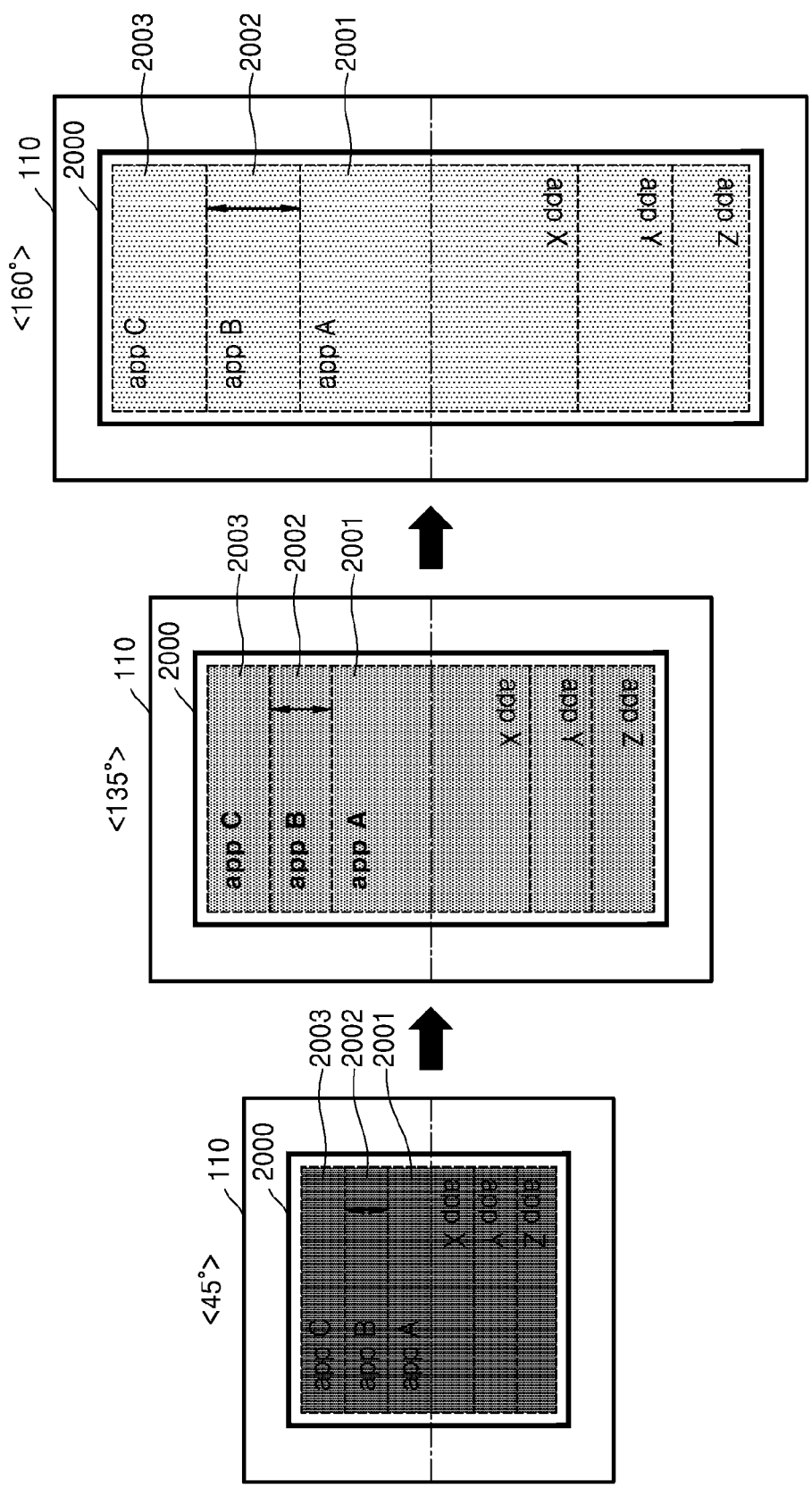

FIG. 20 is a diagram illustrating that display states of objects of a layout dynamically vary according to deformation of a flexible display according to another exemplary embodiment.

Referring to FIG. 20, a layout 2000 in the states in which the deformation degree, such as an unfolding angle or a bending curvature, of the flexible display 110 is "45°", "135°", and "160°" is illustrated. According to FIG. 20, the number of objects 2001 to 2003 of the layout 2000 may be maintained the same regardless of the deformation of the flexible display 110.

In a case in which the deformation degree or state is "45°" is compared to a case in which the deformation degree or state is "135°", as in FIGS. 18 and 19, the sizes of the object 2001 ("app A"), the object 2002 ("app B"), and the object 2003 ("app C") are relatively larger when the deformation degree or state is "135°". In other words, in a state in which the flexible display 110 is further unfolded or unbent, the objects 2001 to 2003 may be displayed to be relatively larger in the interaction with the unfolding.

Also, in a case in which the deformation degree or state is "45°" is compared to a case in which the deformation degree or state is "135°", as in FIGS. 18 and 19, the widths of the object 2001 ("app A"), the object 2002 ("app B"), and the object 2003 ("app C") are relatively larger when the deformation degree or state is "135°". In other words, in a state in which the flexible display 110 is further unfolded or unbent, the objects 2001 to 2003 may be displayed to be relatively wider in the interaction with the unfolding.

Furthermore, in a case in which the deformation degree or state is "45°" is compared to a case in which the deformation degree or state is "135°", the colors of the object 2001 ("app A"), the object 2002 ("app B"), and the object 2003 ("app C") are relatively softer when the deformation degree or state is "135°" than when the deformation degree or state is "45°". In other words, in a state in which the flexible display 110 is further unfolded or unbent, the objects 2001 to 2003 may be displayed to have relatively softer colors in the interaction with the unfolding. Also, the objects 2001 to 2003 may be processed to be displayed to be relatively thicker colors.

Furthermore, in a case in which the deformation degree or state is "45°" is compared to a case in which the deformation degree or state is "135°", the fonts of the object 2001 ("app A"), the object 2002 ("app B"), and the object 2003 ("app C") are changed.

In a case in which the deformation degree or state is "135°" is compared to a case in which the deformation degree or state is "160°", a result of the comparison is similar to the above-described result. In other words, the size, width, color, and font of each of the objects 2001 to 2003 on the layout 2000 may be displayed to dynamically vary according to the degree of deformation of the flexible display 110.

Although in FIG. 20 the size, width, color, and font of the objects 2001 to 2003 are described to be simultaneously changed, at least any one of the size, width, color, and font thereof may be changed.

Figure 21:
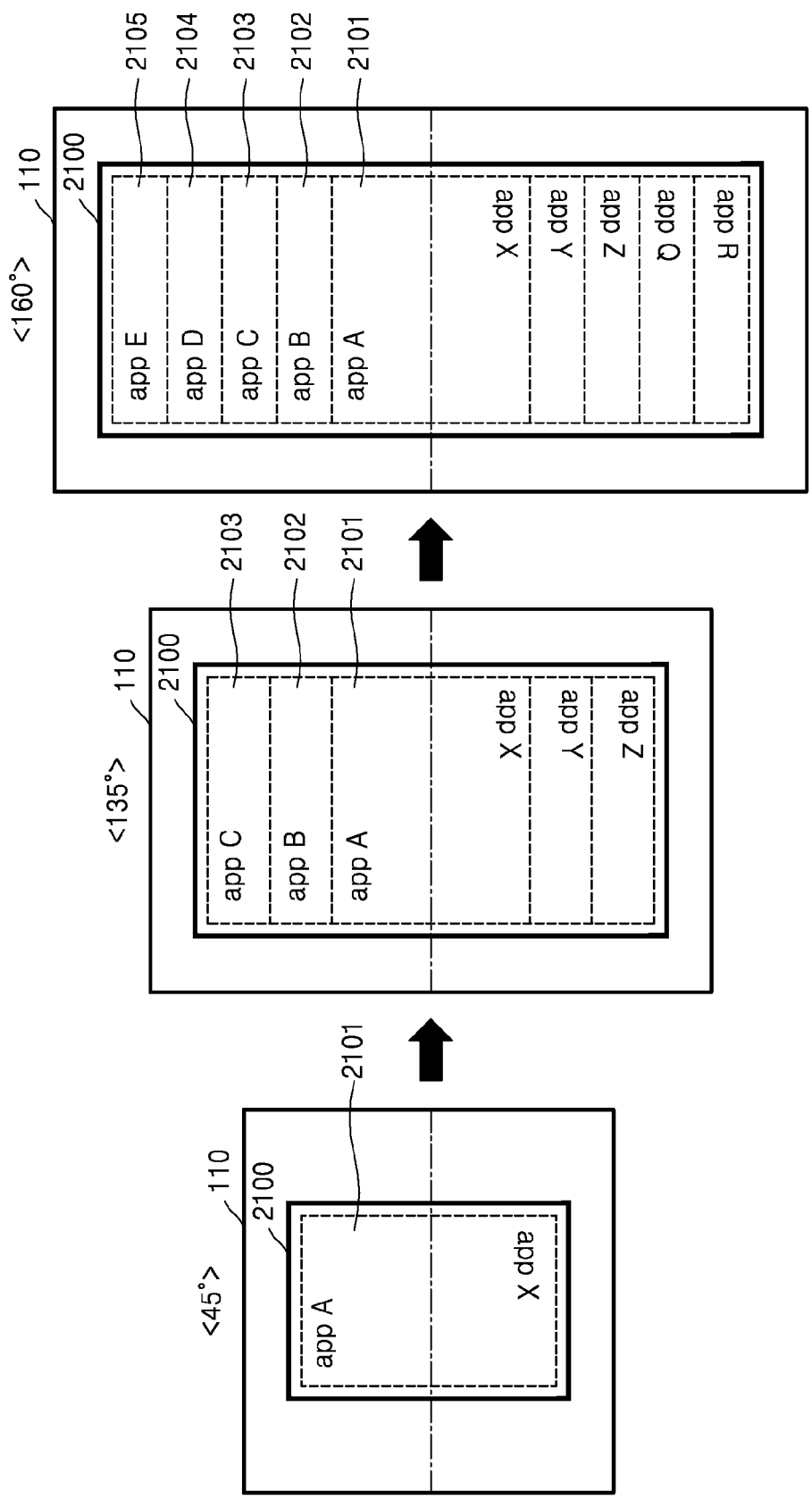

FIG. 21 is a diagram illustrating that display states of objects of a layout dynamically vary according to deformation of a flexible display according to another exemplary embodiment.

Referring to FIG. 21, a layout 2100 in the states in which the deformation degree, such as an unfolding angle or a bending curvature, of the flexible display 110 is "45°", "135°", and "160°" is illustrated.

According to FIG. 21, unlike FIGS. 18 to 20, the number of objects 2101 to 2105 of the layout 2100 may vary according to the degree of deformation of the flexible display 110.

Figure 22:
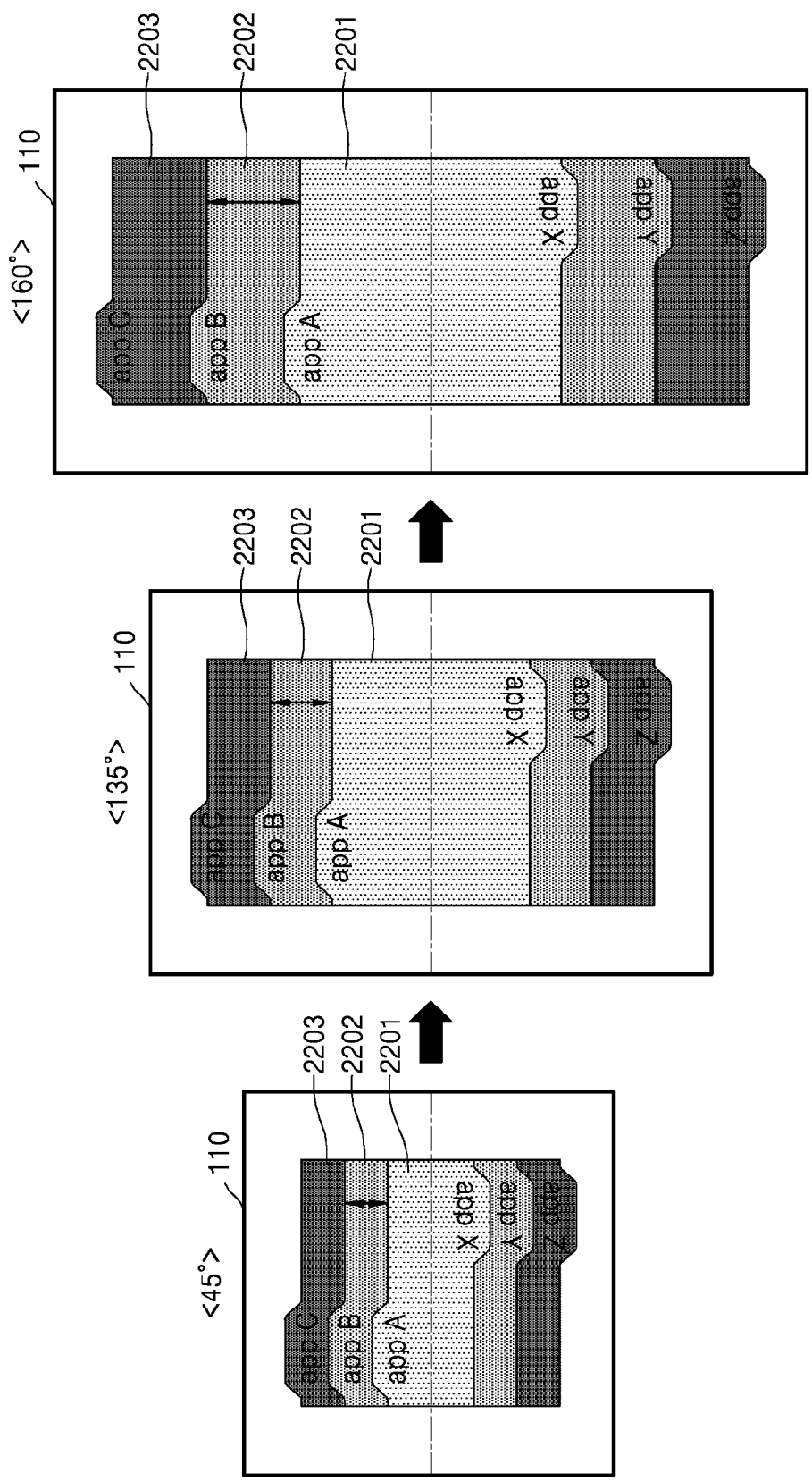
FIGS. 22-26 are diagrams illustrating that display states of objects in a display type of a file tab dynamically vary according to deformation of a flexible display according to one or more exemplary embodiments.

FIG. 22 is a diagram illustrating that display states of objects in a display type of a file tab dynamically vary according to deformation of a flexible display according to an exemplary embodiment.

Referring to FIG. 22, similar to FIG. 18, as the deformation degree, such as an unfolding angle or a bending curvature, of the flexible display 110 varies between "45°", "135°", and "160°", the size and width of each of objects 2201 to 2203 having a display type of a file tab may be displayed to dynamically vary.

Figure 23:
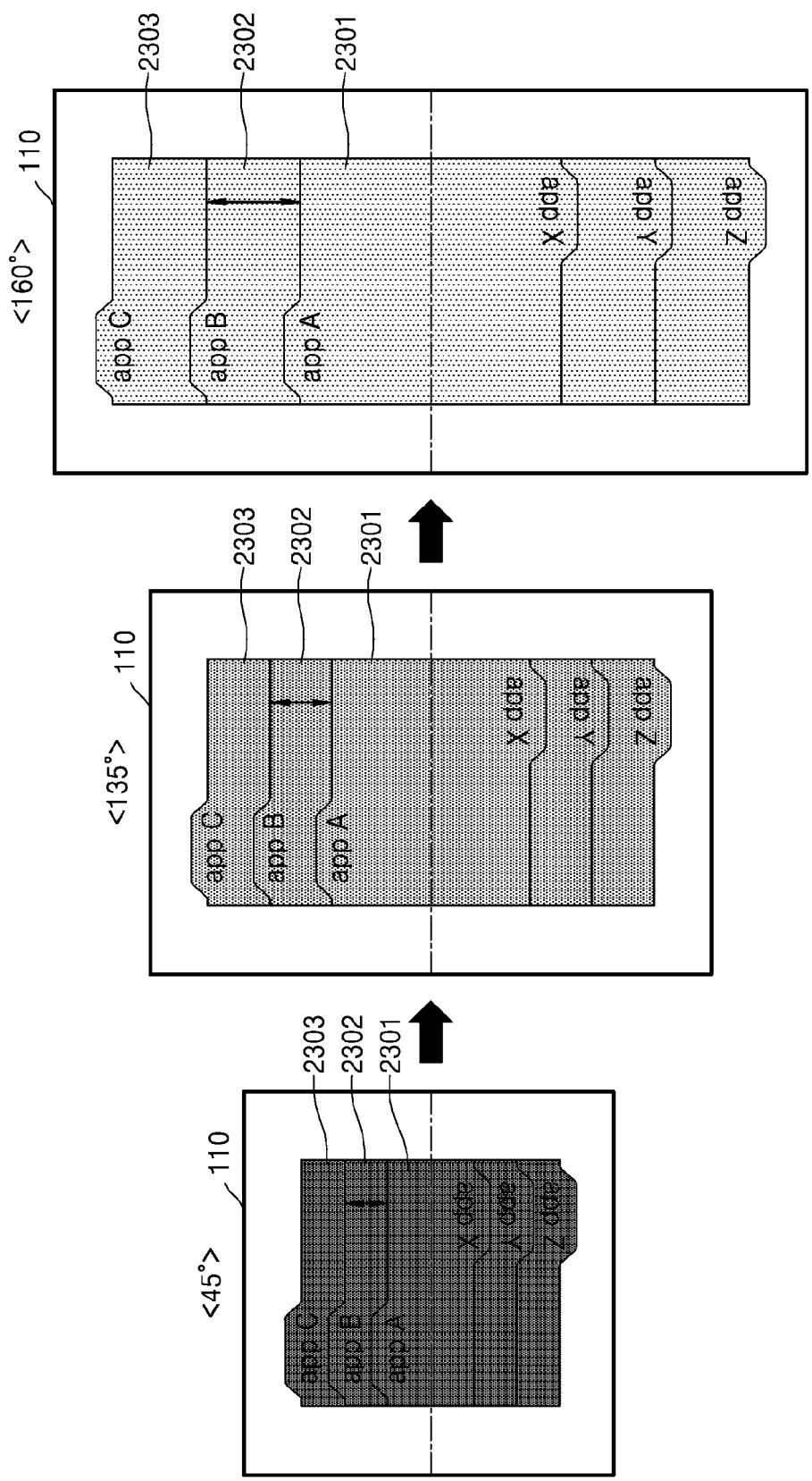

FIG. 23 is a diagram illustrating that display states of objects in a display type of a file tab dynamically vary according to deformation of a flexible display according to another exemplary embodiment.

Referring to FIG. 23, similar to FIG. 19, as the deformation degree, such as an unfolding angle or a bending curvature, of the flexible display 110 varies between "45°", "135°", and "160°", the size, width, and color of each of objects 2301 to 2303 having a display type of a file tab may be displayed to dynamically vary.

Figure 24:
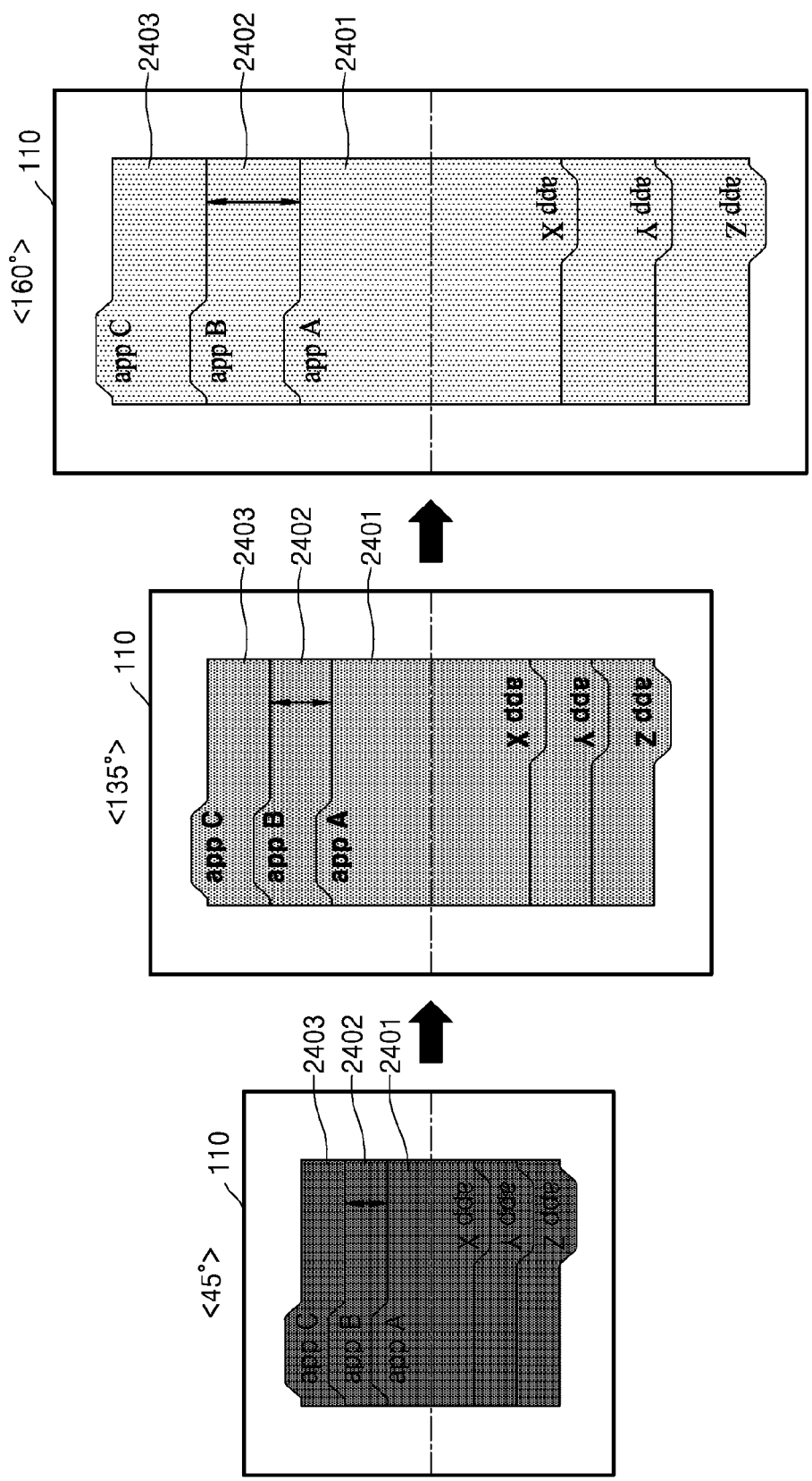

FIG. 24 is a diagram illustrating that display states of objects in a display type of a file tab dynamically vary according to deformation of a flexible display according to another exemplary embodiment.

Referring to FIG. 24, similar to FIG. 20, as the deformation degree, such as an unfolding angle or a bending curvature, of the flexible display 110 varies between "45°", "135°", and "160°", the size, width, color, and font of each of objects 2401 to 2403 having a display type of a file tab may be displayed to dynamically vary.

Figure 25:
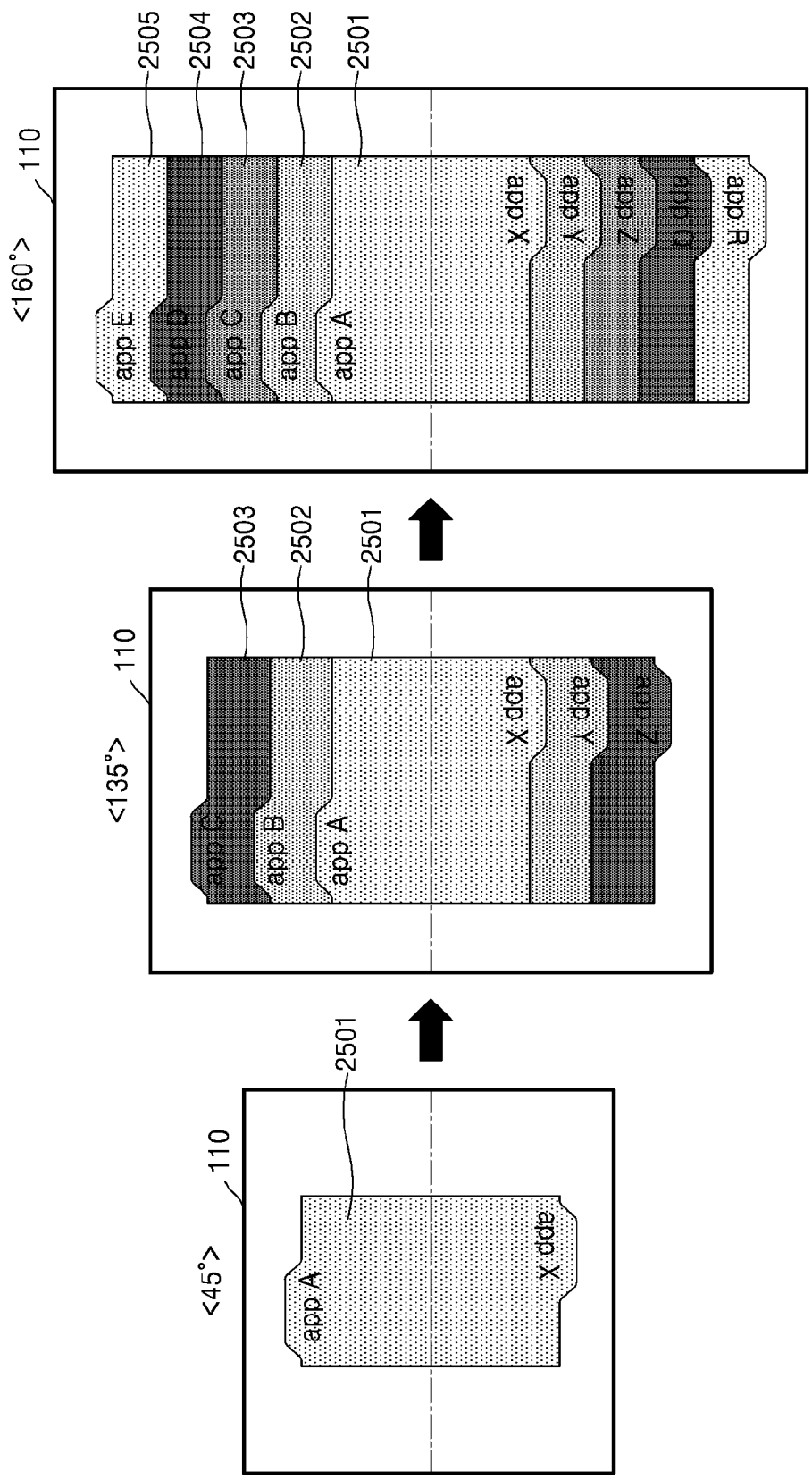

FIG. 25 is a diagram illustrating that display states of objects in a display type of a file tab dynamically vary according to deformation of a flexible display according to another exemplary embodiment.

Referring to FIG. 25, similar to FIG. 21, as the deformation degree, such as an unfolding angle or a bending curvature, of the flexible display 110 varies between "45°", "135°", and "160°", the number of objects 2501 to 2503 having a display type of a file tab may be displayed to dynamically vary.

Figure 26:
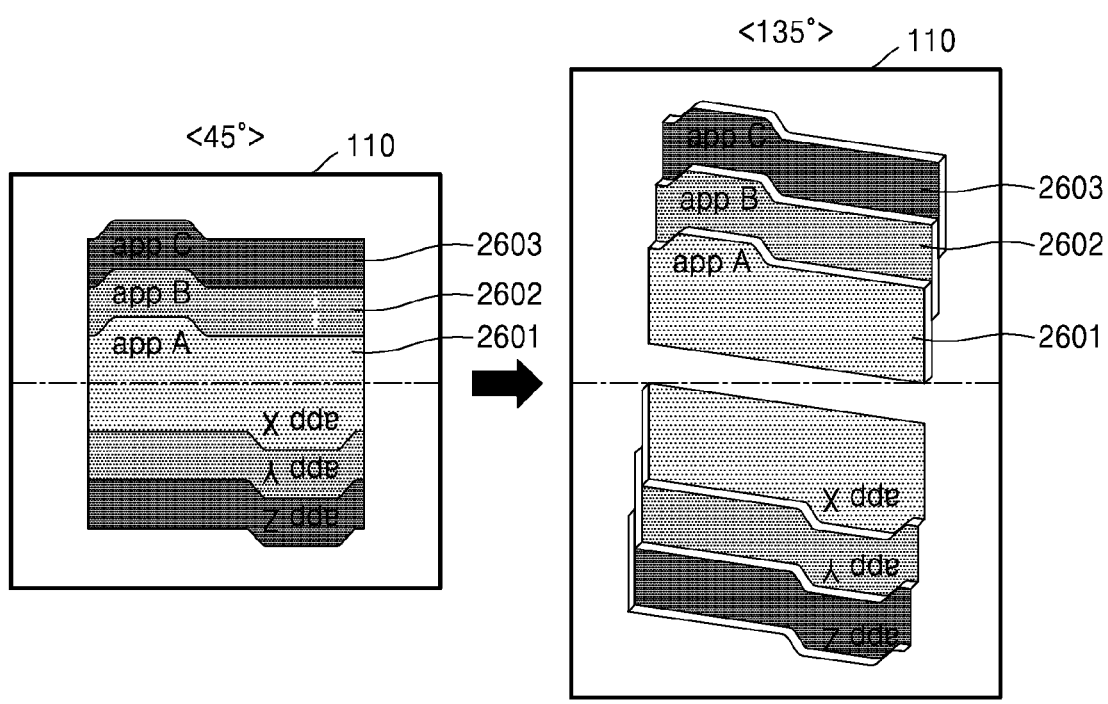

FIG. 26 is a diagram illustrating that display states of objects in a display type of a file tab dynamically vary according to deformation of a flexible display according to another exemplary embodiment.

Referring to FIG. 26, as the deformation degree, such as an unfolding angle or a bending curvature, of the flexible display 110 varies between "45°" and "135°", the size and width of each of objects 2601 to 2603 having a display type of a file tab may be displayed to vary in three dimensions. For example, a degree of depth of each of the objects 2601 to 2603 to be expressed in three dimensions may vary as the degree of deformation of the flexible display 110 varies.

Figure 27:
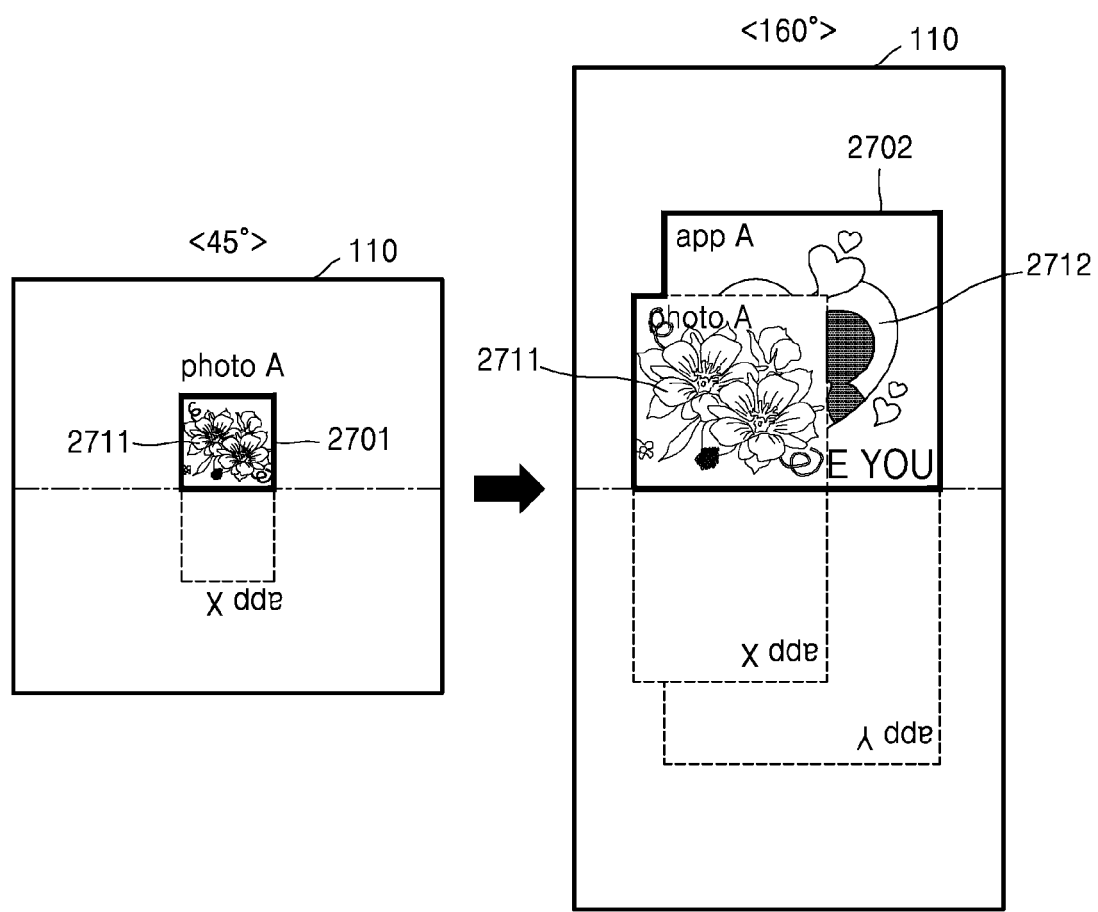
FIG. 27 is a diagram illustrating that display states of objects having various display types dynamically vary according to deformation of a flexible display according to an exemplary embodiment.

FIG. 27 is a diagram illustrating that display states of objects having various display types dynamically vary according to deformation of a flexible display according to an exemplary embodiment.

Referring to FIG. 27, when the deformation degree, such as an unfolding angle or a bending curvature, of the flexible display 110 is "45°", an object 2711 presented as a photo "photo A" may be displayed on a layout 2701. In other words, when the object 2711 is clicked on the flexible display 110, the photo A may be viewed through a photo application.

When the degree of deformation is "160°", an object 2712, which was not displayed when the degree of deformation was "45°", may be additionally displayed on the layout 2702. The display type of the object 2712 is the image 1603 of FIG. 16, and the object 2712 on the layout 2702 may be a link to the application "app A". Accordingly, when the object 2712 is clicked on the flexible display 110, the application "app A" may be directly executed. Also, the display states of objects, such as a size of the object, dynamically vary according to deformation of a flexible display.

Figure 28:
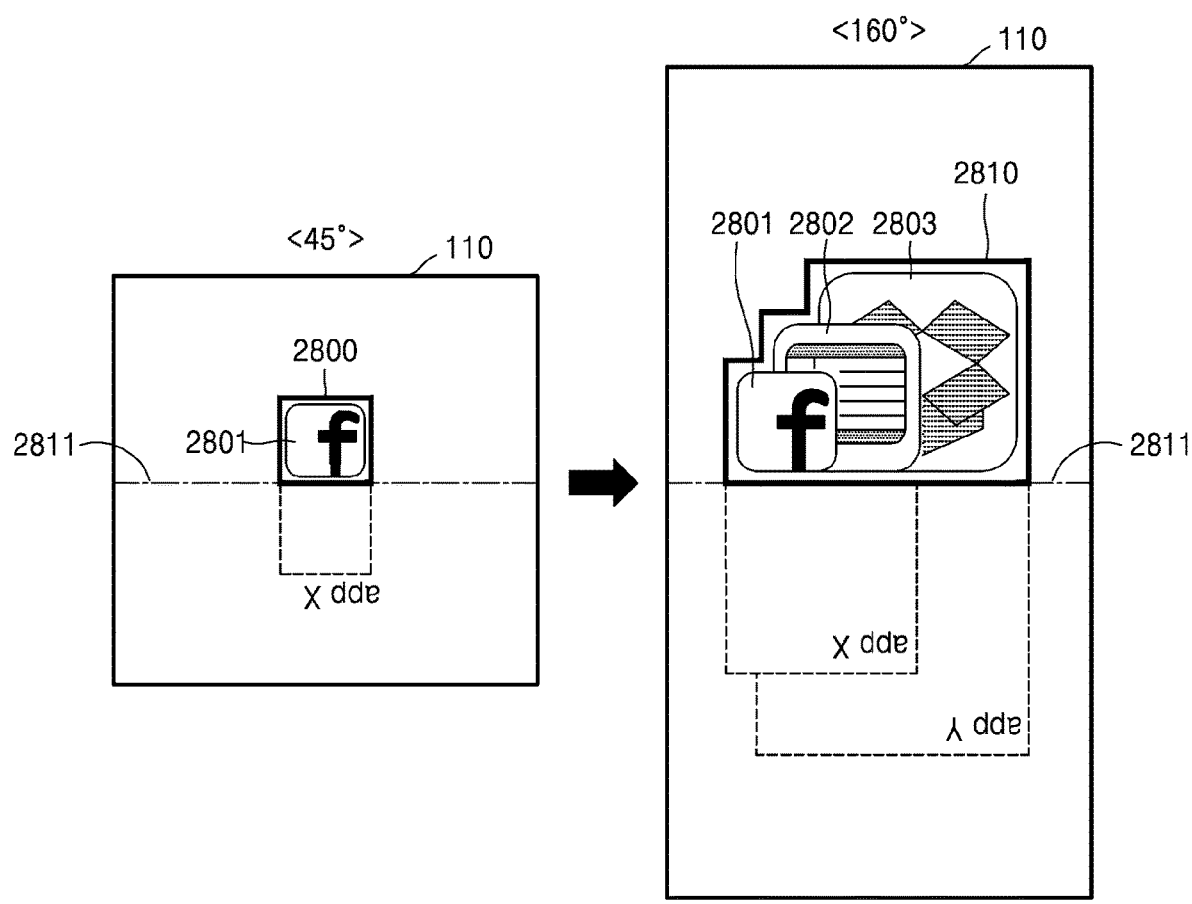
FIG. 28 is a diagram illustrating that display states of objects having display types of application icons dynamically vary according to deformation of a flexible display according to an exemplary embodiment.

FIG. 28 is a diagram illustrating that display states of objects having display types of application icons dynamically vary according to deformation of a flexible display according to an exemplary embodiment.

Referring to FIG. 28, when the deformation degree, such as an unfolding angle or a bending curvature, of the flexible display 110 is "45°", an object 2801 presented as an icon for an application "Facebook" may be displayed on a layout 2800. In other words, when the object 2801 is clicked on the flexible display 110, the "Facebook" application may be executed.

When the degree of deformation is "160°", objects 2802 and 2803, which were not displayed when the deformation degree was "45°", may be additionally displayed on a layout 2810. The display type of the objects 2801 to 2803 is the application icon 1601 of FIG. 16, and the objects 2801 to 2803 may be links to the "Facebook" application, a memo application, and a "Dropbox" application, respectively. Accordingly, when the objects 2801 to 2803 are clicked on the flexible display 110, an appropriate application may be directly executed.

In other words, the objects described with reference to FIGS. 18 to 26, like the objects 2701 and 2702 of FIG. 27 and the objects 2801 to 2803 of FIG. 28, may correspond to the links the user allotted as favorite items and may be displayed in a display type desired by the user.

As illustrated in FIG. 28 with respect to objects 2801 to 2803 and "app Y" and "app X," a layout may be asymmetrically displayed in each of both display areas of the flexible display 110 with respect to a folding axis 2811.

Figure 29:
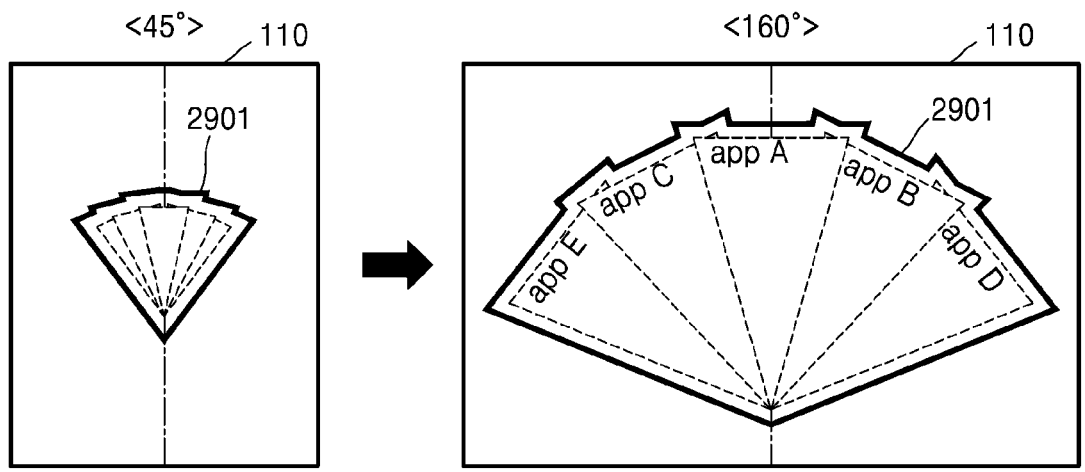
FIG. 29 is a diagram illustrating that a display state of a layout in a display type of a fan shape dynamically varies according to deformation of a flexible display according to an exemplary embodiment.

FIG. 29 is a diagram illustrating that a display state of a layout in a display type of a fan shape dynamically varies according to deformation of a flexible display according to an exemplary embodiment.

Referring to FIG. 29, when the deformation degree, such as an unfolding angle or a bending curvature, of the flexible display 110 is "45°", a layout 2901 presented in a fan shape may be displayed to have a relatively smaller size and to be in a folded state. However, when the degree of deformation is "160°", the layout 2901 having a fan shape may be displayed to have an increased size and in an unfolded state. Each slat of the layout 2901 having a fan shape may correspond to an object indicating any one of the applications "app A", "app B", "app C", "app D", "app E", etc.

Figure 30:
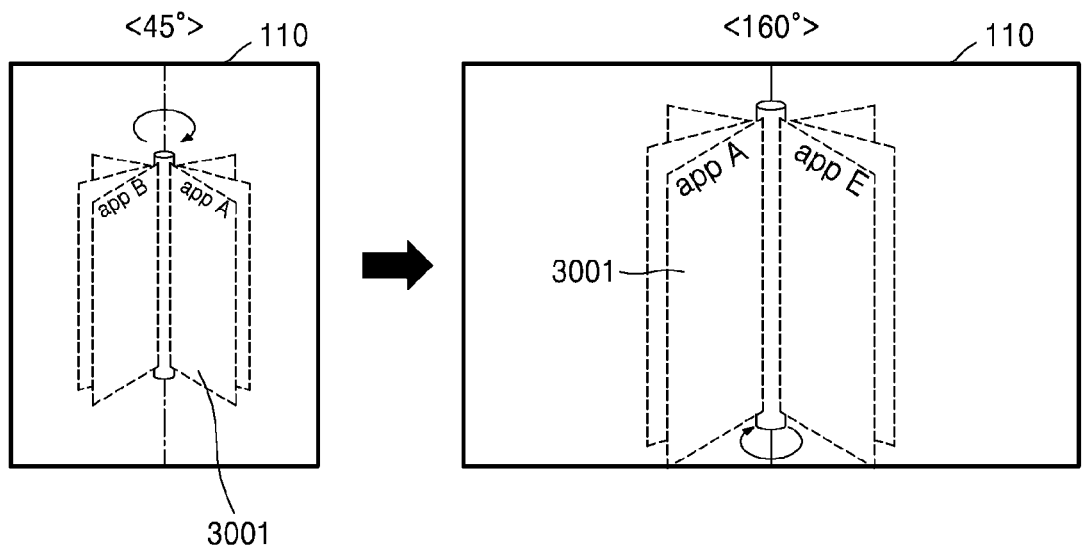
FIG. 30 is a diagram illustrating that a display state of a layout in a display type of a rotating menu board shape dynamically varies according to deformation of a flexible display according to an exemplary embodiment.

FIG. 30 is a diagram illustrating that a display state of a layout in a display type of a rotating menu board shape dynamically varies according to deformation of a flexible display according to an exemplary embodiment.

Referring to FIG. 30, when the deformation degree, such as an unfolding angle or a bending curvature, of the flexible display 110 is "45°", each of menu board areas on a layout 3001 having a rotating menu board shape may correspond to an object indicating any one of the applications "app A", "app B", etc. However, when the degree of deformation is "160°", as the menu board rotates, each of the menu board areas on the layout 3001 having a rotating menu board shape may correspond to an object indicating any one of the applications "app A", "app E", etc.

Figure 31:
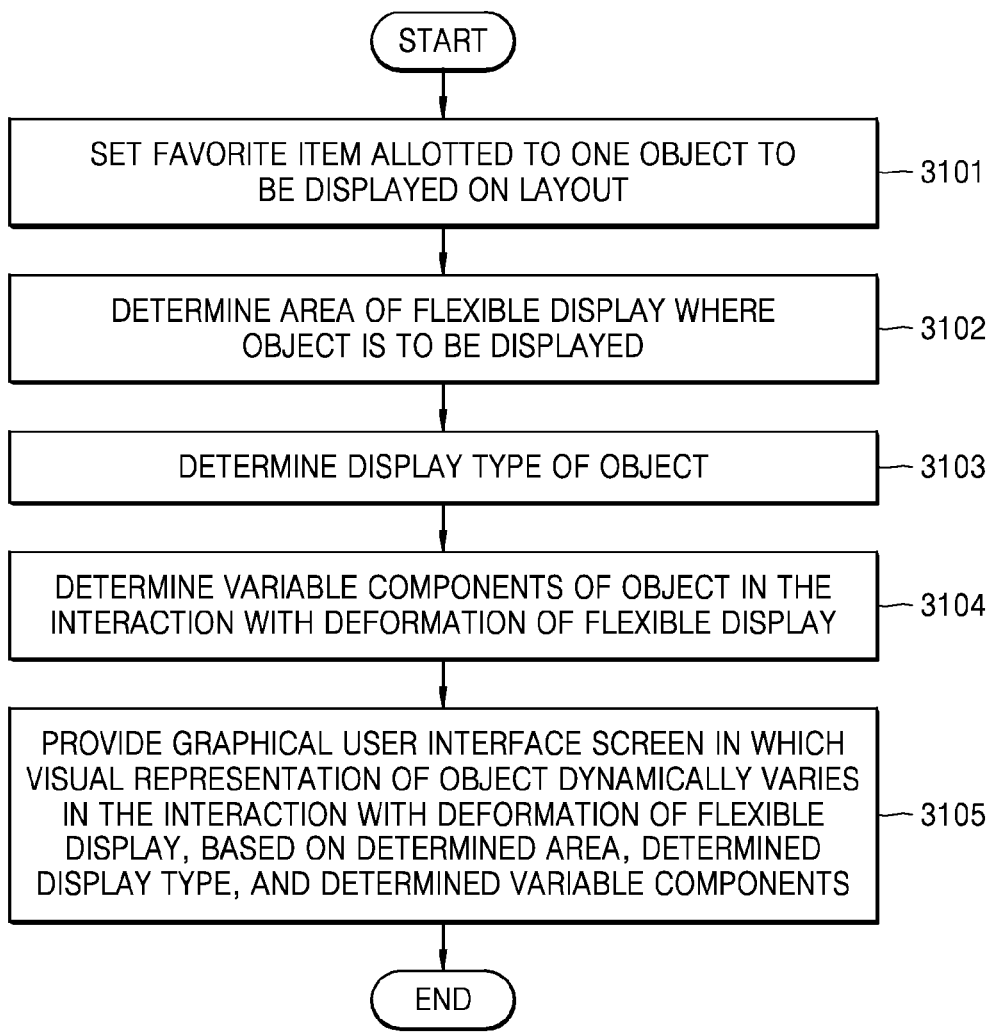
FIG. 31 is a detailed flowchart illustrating a method of providing the user interface screen of FIGS. 10A and 10B.
Figure 32:
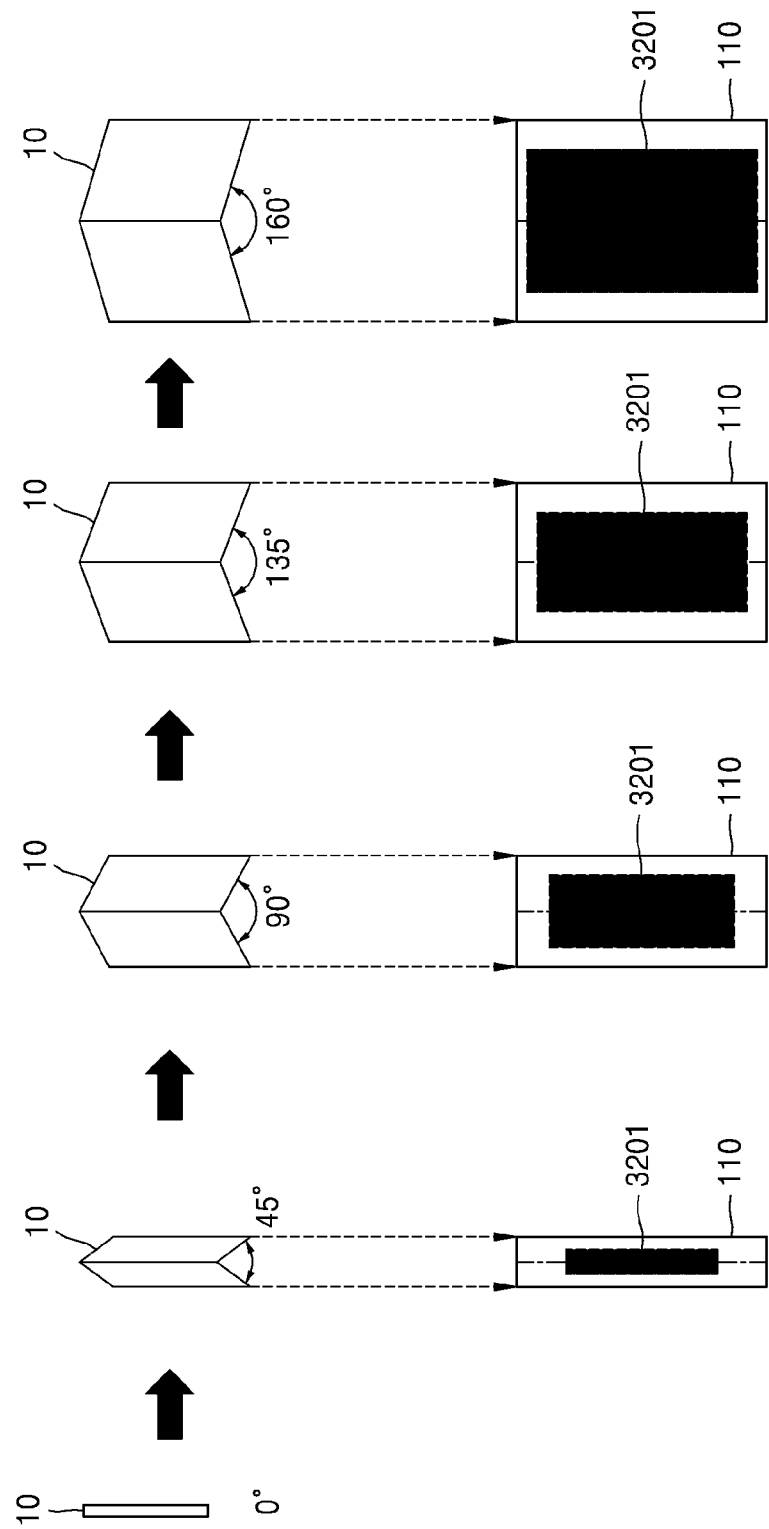
FIG. 32 is a diagram illustrating user interface screens to be displayed at the respective unfolding angles of a flexible device employing a foldable display according to another exemplary embodiment.

FIG. 31 is a detailed flowchart illustrating a method of providing the user interface screen of FIGS. 10A and 10B. Referring to FIG. 31, as another example of the method of providing a user interface screen of FIGS. 10A and 10B, a case in which a display state of only one object (rather than a plurality of objects) varies is described.

In Operation 3101, the controller 130 sets a favorite item allotted to one object to be displayed on a layout.

In Operation 3102, the controller 130 determines an area of the flexible display 110 where an object is to be displayed. For example, the controller 130 may determine the position and arrangement of the object to be displayed on the flexible display 110.

In Operation 3103, the controller 130 determines a display type of the object. For example, the controller 130 may determine which one of various types such as the application icon 1601, the photo 1602, the image 1603, the moving picture 1604 etc. of FIG. 16 is used to display the object.

In Operation 3104, the controller 130 determines variable components of the object in the interaction with the deformation of the flexible display 110. For example, the controller 130 may determine how to change the size, color, font, arrangement, or position of the object according to the deformation of the flexible display 110. In addition, the controller 130 may determine various variable components to change the display state of the object.

In Operation 3105, the flexible display 110 provides a graphical user interface screen in which a visual representation of the object dynamically varies in the interaction with the deformation of the flexible display 110, based on the area, display type, and variable components determined by the controller 130.

FIG. 32 is a diagram illustrating user interface screens to be displayed at the respective unfolding angles of a flexible device employing a foldable display according to another exemplary embodiment.

Referring to FIG. 32, a layout 3201 is illustrated for cases in which the unfolding angles of the flexible device 10 are "0°", "45°", "90°", "135°", and "160°". Also, in FIG. 32 (unlike FIG. 11 in which the display states of the objects vary), a display state of only one object dynamically varies according to the unfolding angles of the flexible device 10.

When the unfolding angle of the flexible device 10 is "0°", which signifies a state in which the user is not using the flexible device 10, no graphical user interface may be displayed on the flexible display 110.

When the unfolding angle of the flexible device 10 is "45°", the object is displayed to be relatively smaller on the flexible display 110. When the unfolding angle of the flexible device 10 gradually increases to "90°", "135°", and "160°", the size of the object may be displayed to gradually increase on the flexible display 110. In other words, since the area of the flexible display 110 that the user sees gradually increases as the flexible device 10 is further unfolded, the flexible display 110 may display the size of the object to gradually increase as the unfolding angle increases. Accordingly, the flexible display 110 may provide the user with a user experience UX in which the graphical user interface dynamically varies in the interaction with the deformation of the flexible display 110.

However, in an exemplary embodiment, a graphical user interface may be provided in which the size of the object gradually increases as the flexible device 10 gradually increases, or conversely, the size of the object gradually decreases as the flexible device 10 is gradually folded.

Figure 33:
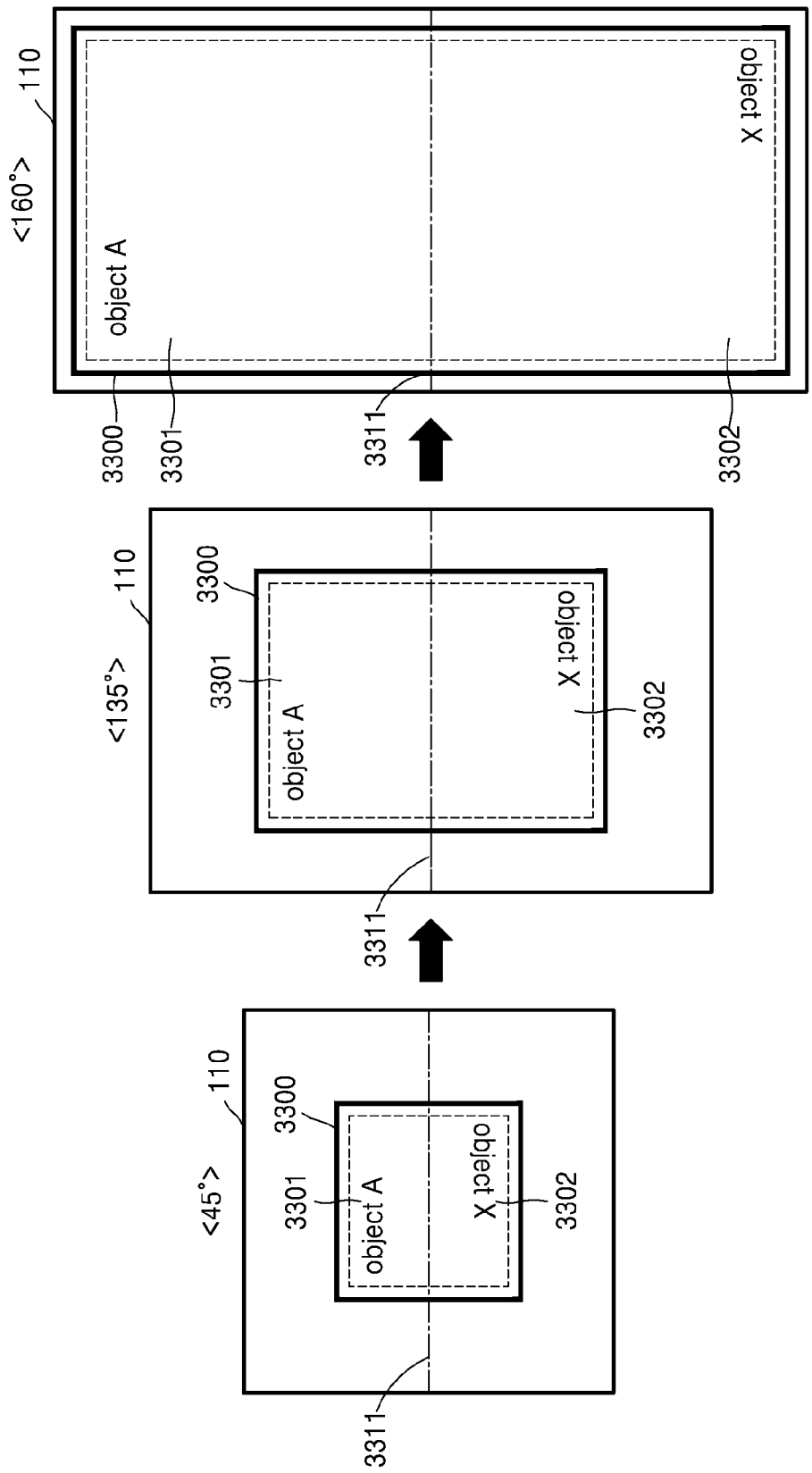
FIG. 33 is a diagram illustrating that a display state of an object of a layout dynamically varies according to deformation of a flexible display according to an exemplary embodiment.

FIG. 33 is a diagram illustrating that a display state of an object of a layout dynamically varies according to deformation of a flexible display according to an exemplary embodiment.

Referring to FIG. 33, the flexible display 110 may separately display an object 3301 and an object 3302 in the display areas of both sides of a layout 3300 with respect to a folding axis 3311 of the flexible display 110, according to a result of the determination in operation 3102 of FIG. 13. In FIG. 33, one object is described instead of a plurality of objects because only one object is continuously displayed in a display area of any one side.

In a case in which the deformation degree, such as an unfolding angle or a bending curvature, of the flexible display 110 is "45°" is compared to a case in which the deformation degree, such as an unfolding angle or a bending curvature, of the flexible display 110 is "135°", the size of the layout 3300 and the sizes of the object 3301 ("object A") and the object 3302 ("object X") included in the layout 3300 are relatively larger when the deformation degree or state is "135°". In other words, in a state in which the flexible display 110 is further unfolded or unbent, the object 3301 ("object A") and the object 3302 ("object X") may be displayed to be relatively larger in the interaction with the unfolding.

The comparison between a case in which the deformation degree or state is "135°" and a case in which the deformation degree or state is "160°" leads to a result similar to the above-described result. In other words, the size of the object 3301 or the object 3302 on the layout 3300 may be displayed to dynamically vary according to the degree of deformation of the flexible display 110. According to an exemplary embodiment, similar to a case in which the unfolding angle increases (unfolding), the object 3301 may dynamically vary such that the size of the object 3301 decreases when the unfolding angle decreases (folding), conversely to the above case.

Although FIG. 33 illustrates that a change in the display type is a change in the size only, an exemplary embodiment is not limited thereto and different display states (e.g., a color, an arrangement, a font, etc.) of the object 3301 or the object 3302 may vary in the interaction with the deformation of the flexible display 110.

Figure 34:
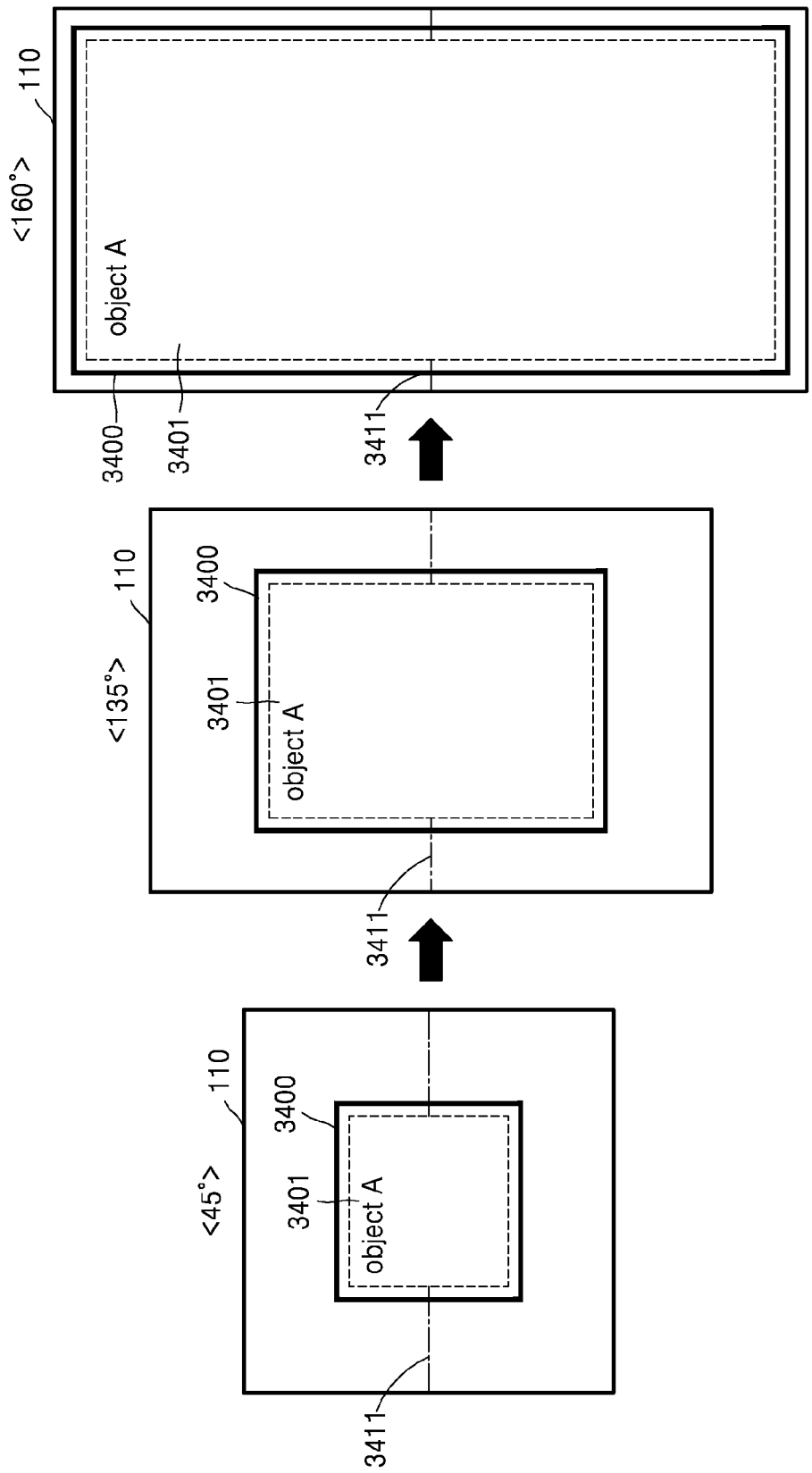
FIG. 34 is a diagram illustrating that a display state of an object of a layout dynamically varies according to deformation of a flexible display according to another exemplary embodiment.

FIG. 34 is a diagram illustrating that a display state of an object of a layout dynamically varies according to deformation of a flexible display according to another exemplary embodiment.

Referring to FIG. 34, the flexible display 110 may display one object 3401 across the display areas of both sides of the flexible display 110, regardless of a folding axis 3411 of the flexible display 110, according to a result of the determination of the operation 1302 of FIG. 13.

In a case in which the deformation degree, such as an unfolding angle or a bending curvature, of the flexible display 110 is "45°" is compared to a case in which the deformation degree, such as an unfolding angle or a bending curvature, of the flexible display 110 is "135°", the size of a layout 3400 and the sizes of the object 3401 ("object A") included in the layout 3400 are relatively larger when the deformation degree or state is "135°".

The comparison between a case in which the deformation degree or state is "135°" and a case in which the deformation degree or state is "160°" leads to a result similar to the above-described result. In other words, the size of the object 3401 on the layout 3400 may be displayed to dynamically vary according to the degree of deformation of the flexible display 110. According to an exemplary embodiment, similar to a case in which the unfolding angle increases (unfolding), the object 3401 may dynamically vary such that the size of the object 3401 decreases when the unfolding angle decreases (folding), conversely to the above case.

Although FIG. 34 illustrates that a change in the display type is a change in the size only, an exemplary embodiment is not limited thereto and different display states (e.g., a color, an arrangement, a font, etc.) of the object 3401 may vary in the interaction with the deformation of the flexible display 110.

Figure 35:
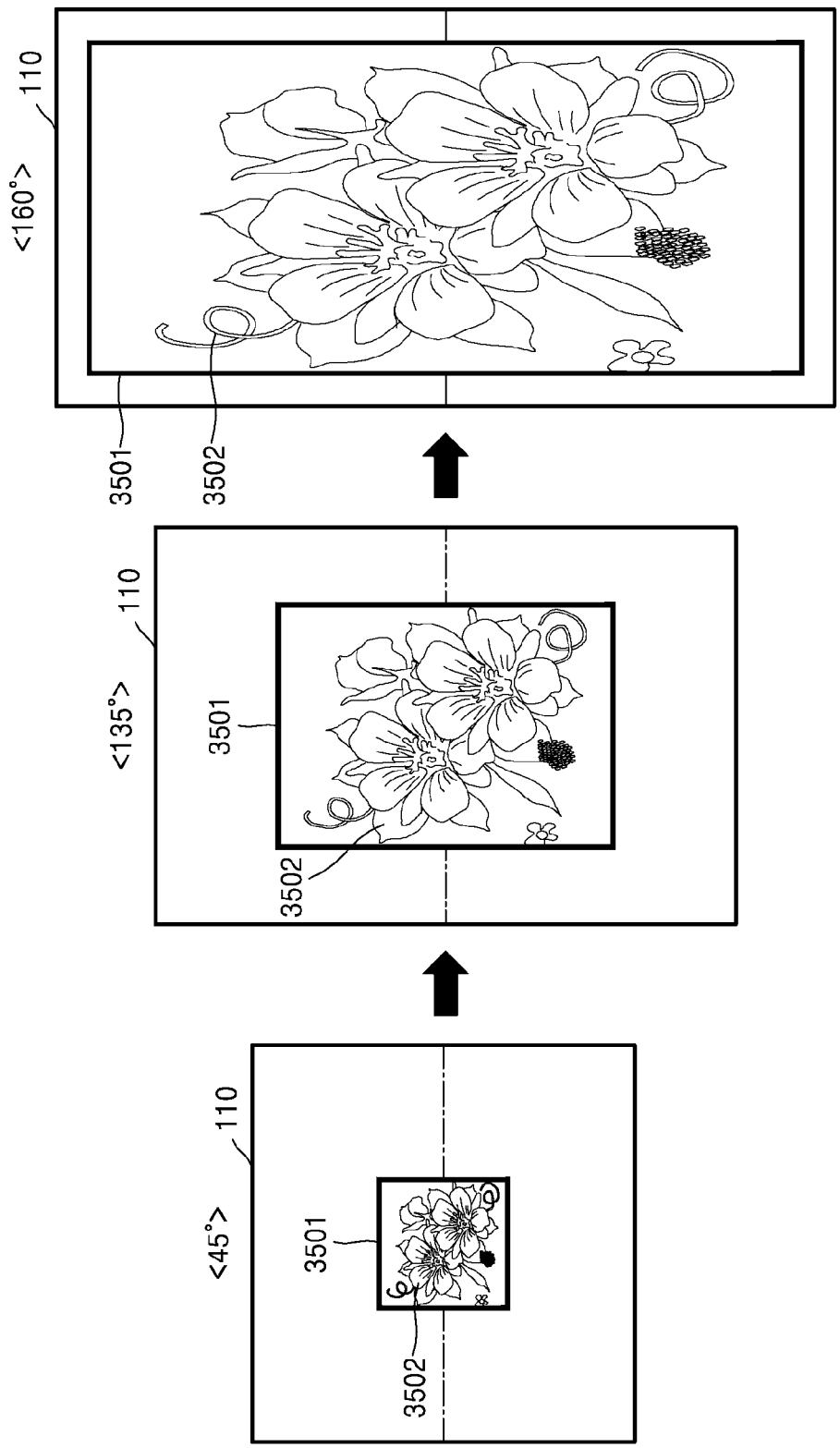
FIG. 35 is a diagram illustrating that a display state of an object presented as a photo dynamically varies according to deformation of a flexible display according to an exemplary embodiment.

FIG. 35 is a diagram illustrating that a display state of an object presented as a photo dynamically varies according to deformation of a flexible display according to an exemplary embodiment.

Referring to FIG. 35, as the deformation degree, such as an unfolding angle or a bending curvature, of the flexible display 110 increases, a photo 3502 on a layout 3501 is displayed to gradually expand. That is, in a state in which the flexible display 110 is further unfolded or unbent, the photo 3502 on the layout 3501 may be displayed to be relatively larger in the interaction with the unfolding.

In other words, the size of the photo 3502 on the layout 3501 may be displayed to dynamically vary according to a degree of deformation of the flexible display 110. According to an exemplary embodiment, similar to a case in which the unfolding angle increases (unfolding), the photo 3502 may dynamically vary such that the size of the photo 3502 decreases when the unfolding angle decreases (folding), conversely to the above case.

Additionally, when the photo 3502 is clicked on the flexible display 110, the photo 3502 may be viewed through a photo application.

Figure 36:
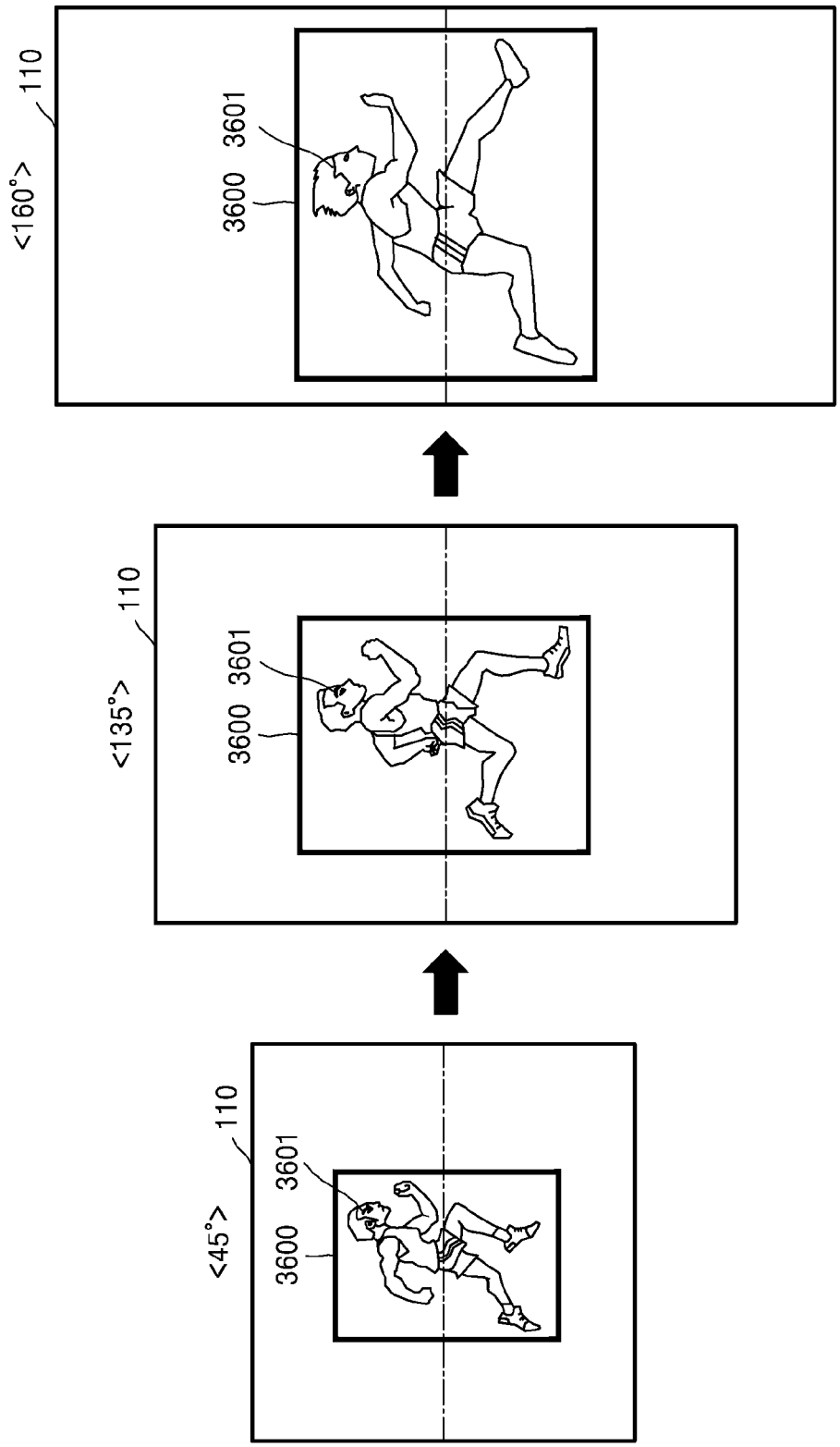
FIG. 36 is a diagram illustrating that a display state of an object presented as a moving picture dynamically varies according to deformation of a flexible display according to another exemplary embodiment.

FIG. 36 is a diagram illustrating that a display state of an object presented as a moving picture dynamically varies according to deformation of a flexible display according to another exemplary embodiment.

Referring to FIG. 36, a moving picture 3601 may be reproduced on a layout 3600 in the interaction with the deformation degree, such as an unfolding angle or a bending curvature, of the flexible display 110. As the flexible display 110 is further unfolded or unbent, the moving picture 3601 on the layout 3600 may be displayed to be relatively larger in the interaction with unfolding, and a reproduction speed of the moving picture 3601 may vary as well. That is, a reproduction state of the moving picture 3601 on the layout 3600 may be displayed to dynamically vary according to a degree of deformation of the flexible display 110.

When the moving picture 3601 is clicked on the flexible display 110, the moving picture 3601 may be reproduced by a moving picture application.

Figure 37:
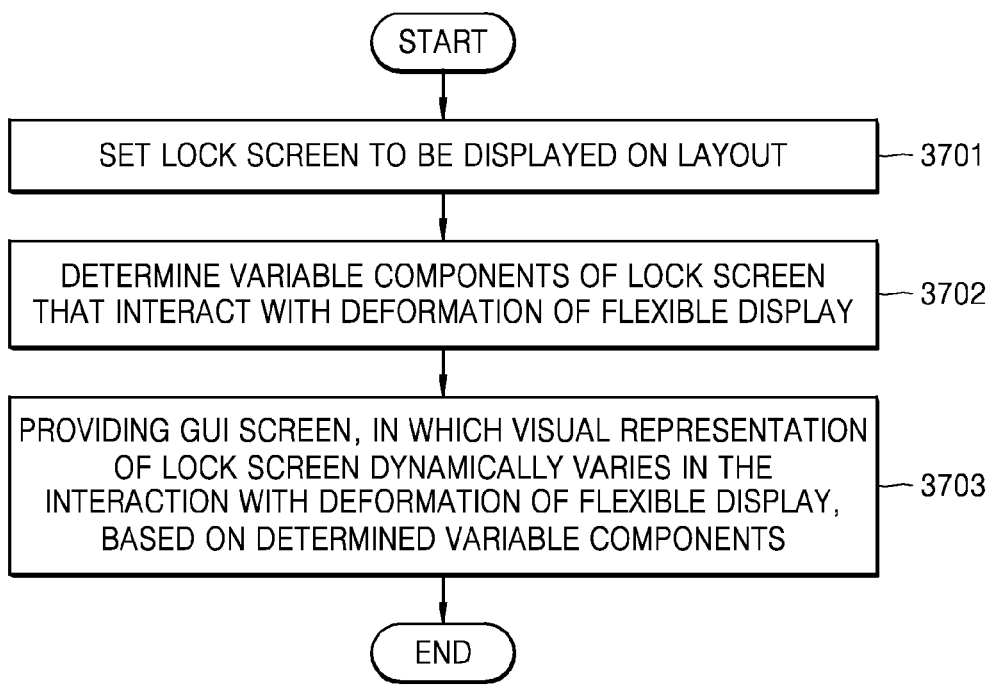
FIG. 37 is a flowchart illustrating a method of dynamically varying a layout of a lock screen in the interaction with deformation of a flexible device according to an exemplary embodiment.

FIG. 37 is a flowchart illustrating a method of dynamically varying a layout of a lock screen in the interaction with deformation of a flexible device according to an exemplary embodiment. Referring to FIG. 37, as another example of a method of providing a user interface screen of FIGS. 10A and 10B, a case in which a layout is a lock screen is described below.

In Operation 3701, the controller 130 sets a lock screen to be displayed on a layout.

In Operation 3702, the controller 130 determines variable components of a lock screen that interact with deformation of the flexible display 110. For example, the controller 130 may determine the size and position of the lock screen corresponding to a degree of deformation.

In Operation 3703, the flexible display 110 provides a graphical user interface screen, in which a visual representation of a lock screen dynamically varies in the interaction with the deformation of the flexible display 110, based on the variable components determined by the controller 130.

Figure 38:
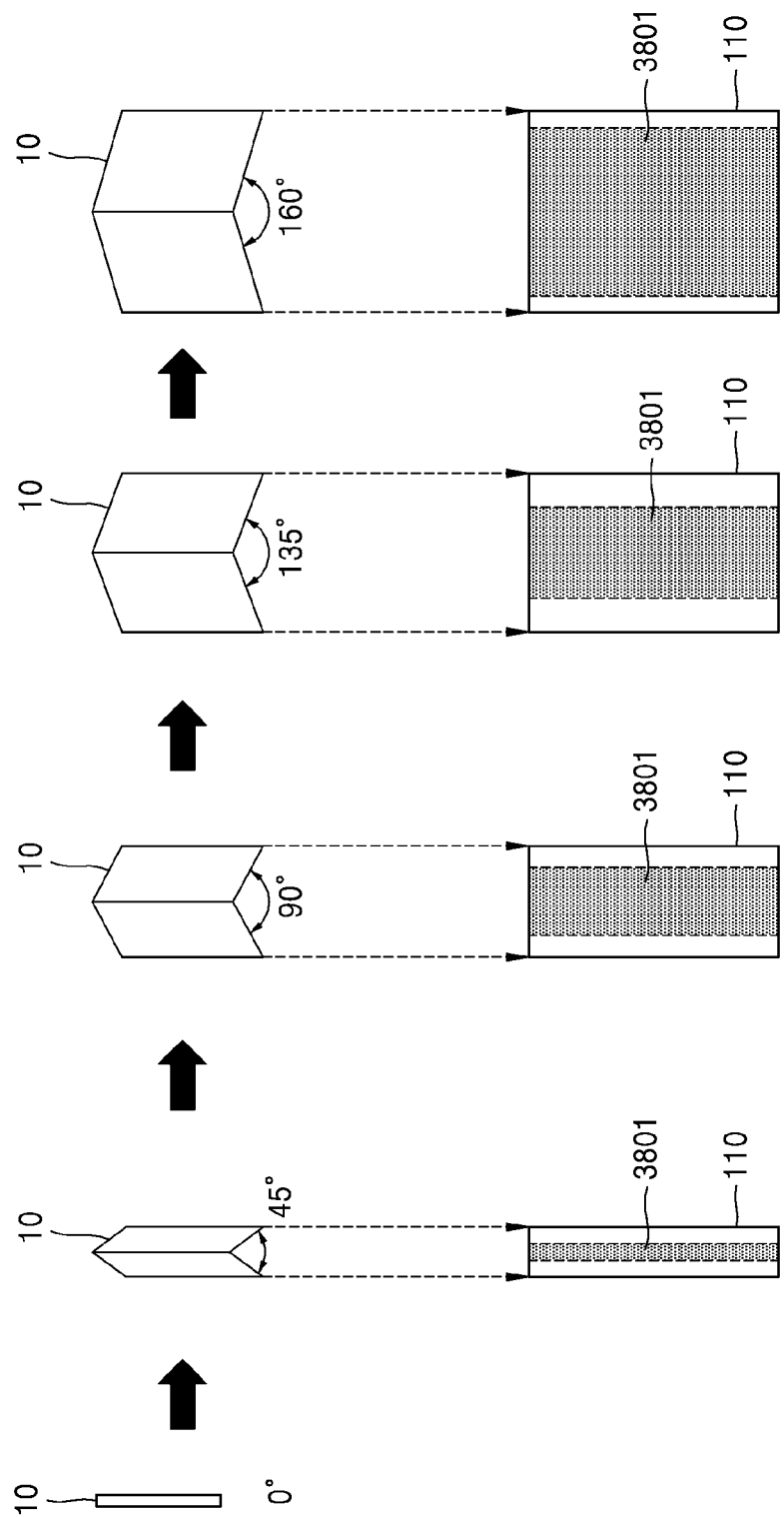
FIG. 38 is a diagram illustrating display states of a lock screen layout to be displayed at each of unfolding angles of a flexible device employing a foldable display according to an exemplary embodiment.

FIG. 38 is a diagram illustrating display states of a lock screen layout to be displayed at each of unfolding angles of a flexible device employing a foldable display according to an exemplary embodiment.

Referring to FIG. 38, a lock screen layout 3801 for cases in which the unfolding angles of the flexible device 10 are "0°", "45°", "90°", "135°", and "160°" are illustrated.

When the unfolding angle of the flexible device 10 is "0°", which signifies a state in which the user is not using the flexible device 10, the lock screen layout 3801 may not be displayed on the flexible display 110.

When the unfolding angle of the flexible device 10 gradually increases to "45°", "90°", "135°", and "160°", the size of the lock screen layout 3801 may be displayed to gradually increase on the flexible display 110. In other words, since the area of the flexible display 110 that the user sees gradually increases as the flexible device 10 is further unfolded, the flexible display 110 may display the size of the lock screen layout 3801 to gradually increase as the unfolding angle increases. Accordingly, the flexible display 110 may provide the user with a user experience UX in which the lock screen layout dynamically varies in the interaction with the deformation of the flexible display 110.

However, in an exemplary embodiment, a graphical user interface may be provided, in which the size of the lock screen layout 3801 gradually increases as the flexible device 10 gradually increases, or conversely, the size of the lock screen layout 3801 gradually decreases as the flexible device 10 is gradually folded.

FIGS. 39A to 39C are diagrams illustrating that layouts of a lock screen dynamically vary in the interaction with deformation of a flexible display according to an exemplary embodiment.

A lock screen layout 3901 of FIG. 39A may correspond to a lock screen for "Android" that is a mobile operating system (OS) developed by Google. A lock screen layout 3902 of FIG. 39B may correspond to a lock screen for "iOS" that is a mobile operating system (OS) developed by Apple. A lock screen layout 3903 of FIG. 39C may correspond to a lock screen for "Windows Mobile" that is a mobile operating system (OS) developed by Microsoft. Referring to FIG. 39A to 39C, when the unfolding angle of the flexible device 10 is "45°", only a portion of a center area of the lock screen layout 3901, 3902, or 3903 may be displayed on the flexible display 110. As the unfolding angle of the flexible device 10 increases to "135°" and "160°", a relatively larger area of the lock screen layout 3901, 3902, or 3903 may be displayed on the flexible display 110. In other words, the size of the lock screen layout 3901, 3902, or 3903 may be displayed to dynamically vary according to a degree of deformation of the flexible display 110.

Figure 40:
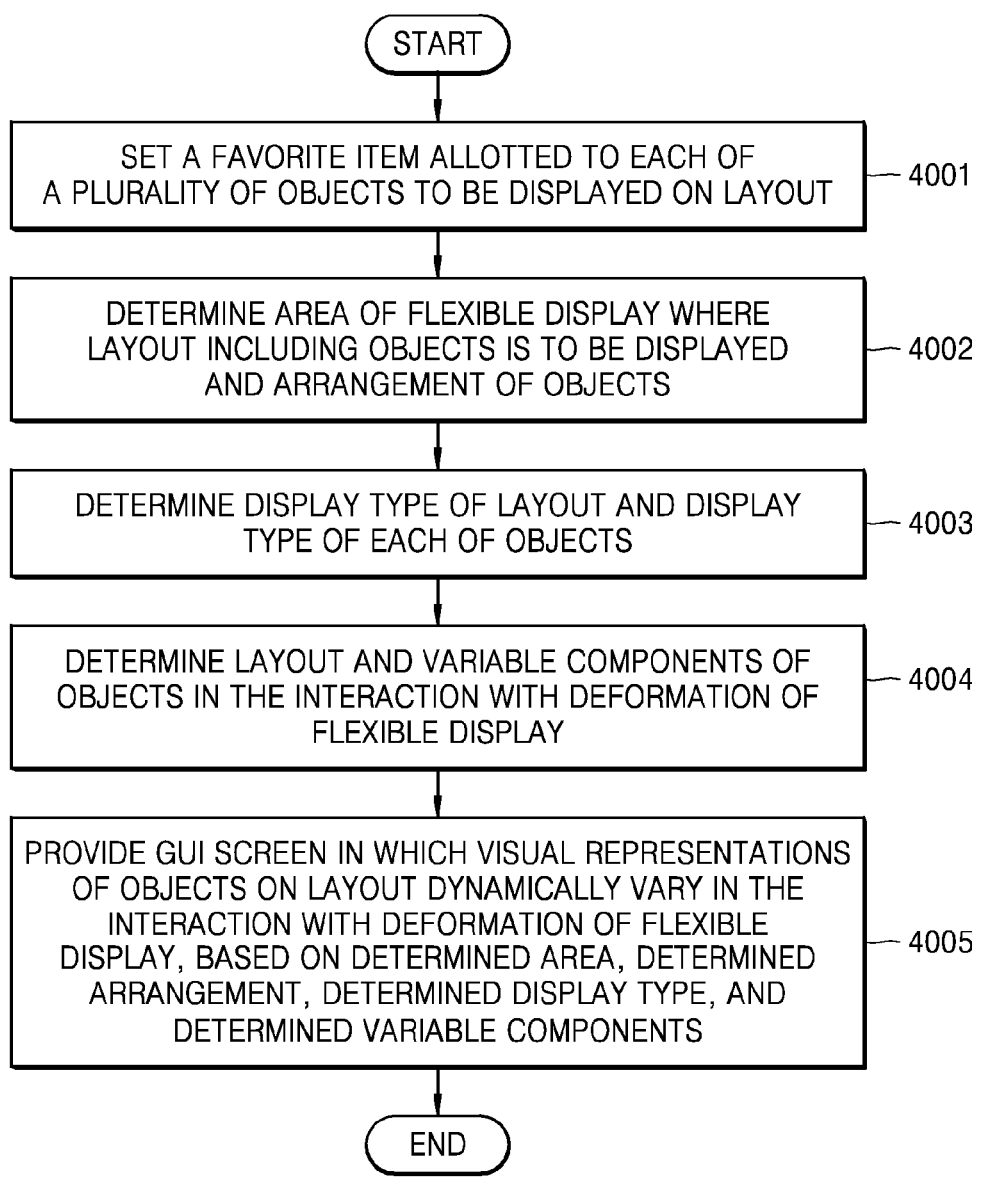
FIG. 40 is a detailed flowchart illustrating a method of providing the user interface screen of FIGS. 10A and 10B.

FIG. 40 is a detailed flowchart illustrating a method of providing the user interface screen of FIGS. 10A and 10B. Referring to FIG. 40, as another example of the method of providing a user interface screen of FIGS. 10A and 10B, a case in which a display state of a layout and a display state of at least one object on the layout vary is described below.

In Operation 4001, the controller 130 sets a favorite item allotted to each of a plurality of objects to be displayed on a layout.

In Operation 4002, the controller 130 determines an area of the flexible display 110 where a layout including the objects is to be displayed, and an arrangement of the objects.

In Operation 4203, the controller 130 determines a display type of the layout and a display type of each of the objects.

In Operation 4004, the controller 130 determines a layout and variable components of the objects in the interaction with the deformation of the flexible display 110.

In Operation 4005, the flexible display 110 provides a graphical user interface screen in which visual representations of the objects on the layout dynamically vary in the interaction with the deformation of the flexible display 110, based on the area, arrangement, display type, and variable components determined by the controller 130.

Figure 41:
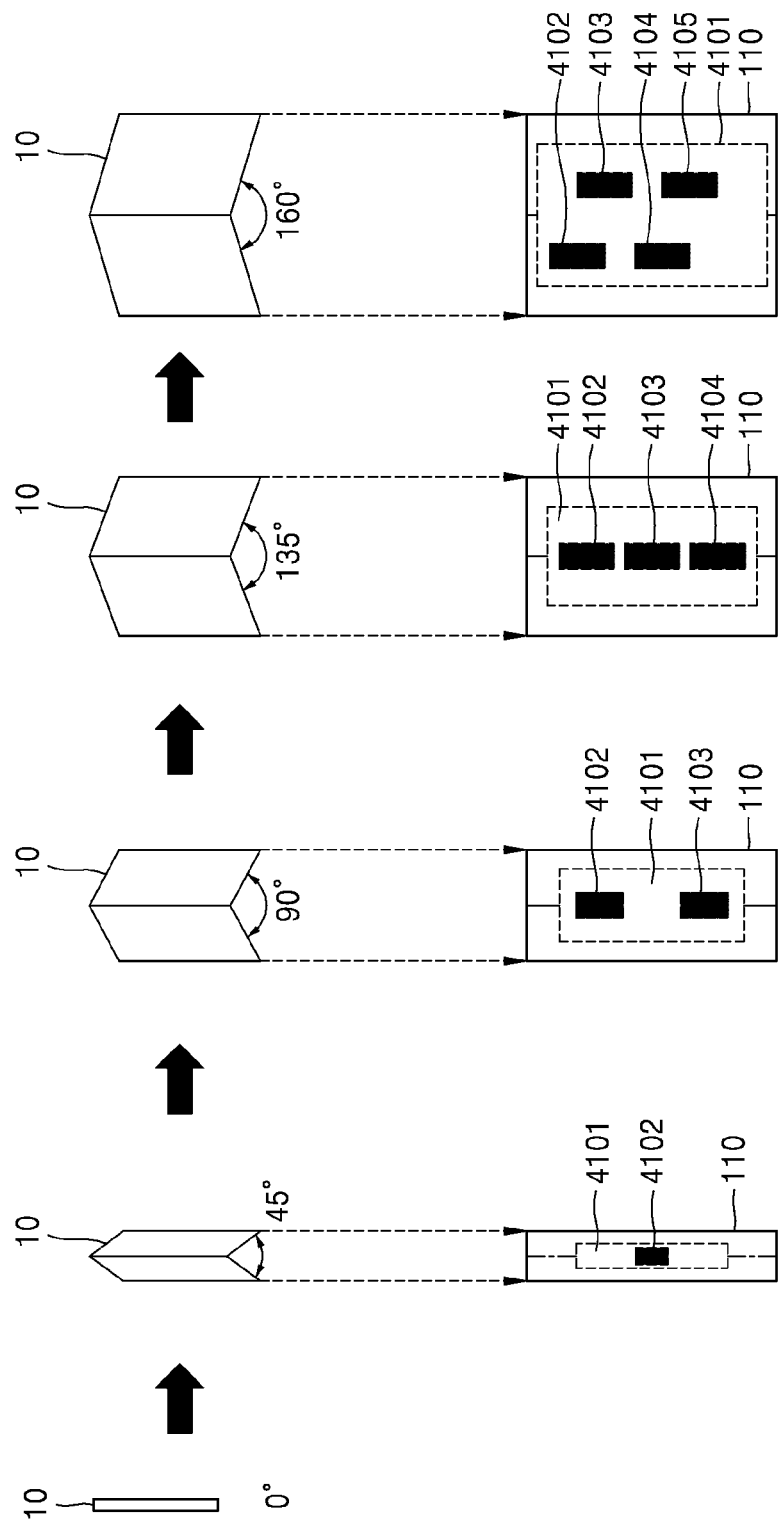
FIG. 41 is a diagram illustrating user interface screens to be displayed at the respective unfolding angles of a flexible device employing a foldable display according to another exemplary embodiment.

FIG. 41 is a diagram illustrating user interface screens to be displayed at the respective unfolding angles of a flexible device employing a foldable display according to another exemplary embodiment.

Referring to FIG. 41, layouts when the unfolding angles of the flexible device 10 are "0°", "45°", "90°", "135°", and "160°" are illustrated. Also, in FIG. 41, display states of a plurality of objects 4102 to 4105 and a display state of a layout 4104 including the objects 4102 to 4105 dynamically vary altogether according to the unfolding angles of the flexible device 10.

When the unfolding angle of the flexible device 10 is "0°", which signifies a state in which the user is not using the flexible device 10, no graphical user interface may be displayed on the flexible display 110.

When the unfolding angle of the flexible device 10 is "45°", only an object 4102 is displayed in a layout 4101 on the flexible display 110. When the unfolding angle of the flexible device 10 gradually increases to "90°", "135°", and "160°", the size of the layout 4101 may be displayed to gradually increase on the flexible display 110. Also, the number of the objects 4102 to 4105 on the layout 4101 may be displayed to vary. Accordingly, the flexible display 110 may provide the user with a user experience UX in which the layout dynamically varies in the interaction with the deformation of the flexible display 110.

Figure 42:
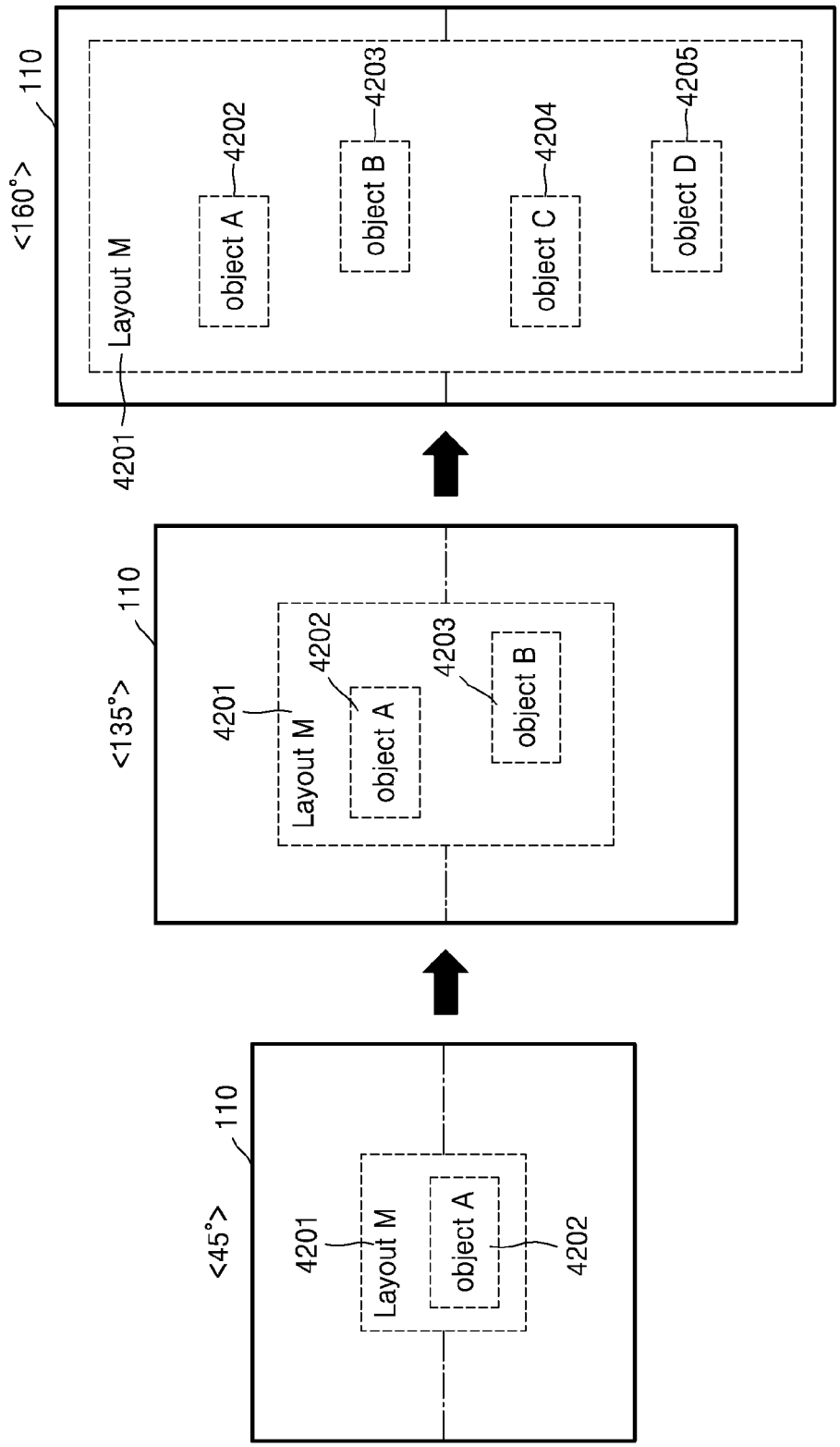
FIG. 42 is a diagram illustrating that display states of objects of a layout dynamically vary according to deformation of a flexible display according to an exemplary embodiment.

FIG. 42 is a diagram illustrating that display states of objects of a layout dynamically vary according to deformation of a flexible display according to an exemplary embodiment.

Referring to FIG. 42, when the deformation degree, such as an unfolding angle or a bending curvature, of the flexible display 110 is "45°", the flexible display 110 may display a layout 4201 "Layout M" and an object 4202 "object A" that overlaps over the layout 4201.

When the deformation degree or state increases to "135°", the flexible display 110 may display the layout 4201 to be relatively large and simultaneously display an additional object 4203 "object B", which was not displayed before, to overlap over the layout 4201.

When the deformation degree increases further to "160°", the flexible display 110 may display the layout 4201 to be relatively large and simultaneously display additional objects 4204 and 4205 "object C and object D", which were not displayed before, to overlap over the layout 4201.

In other words, display states of the objects 4202 to 4205 and a display state of the layout 4201 including the objects 4202 to 4205 may simultaneously and dynamically vary according to the unfolding angles of the flexible device 10.

Figure 43:
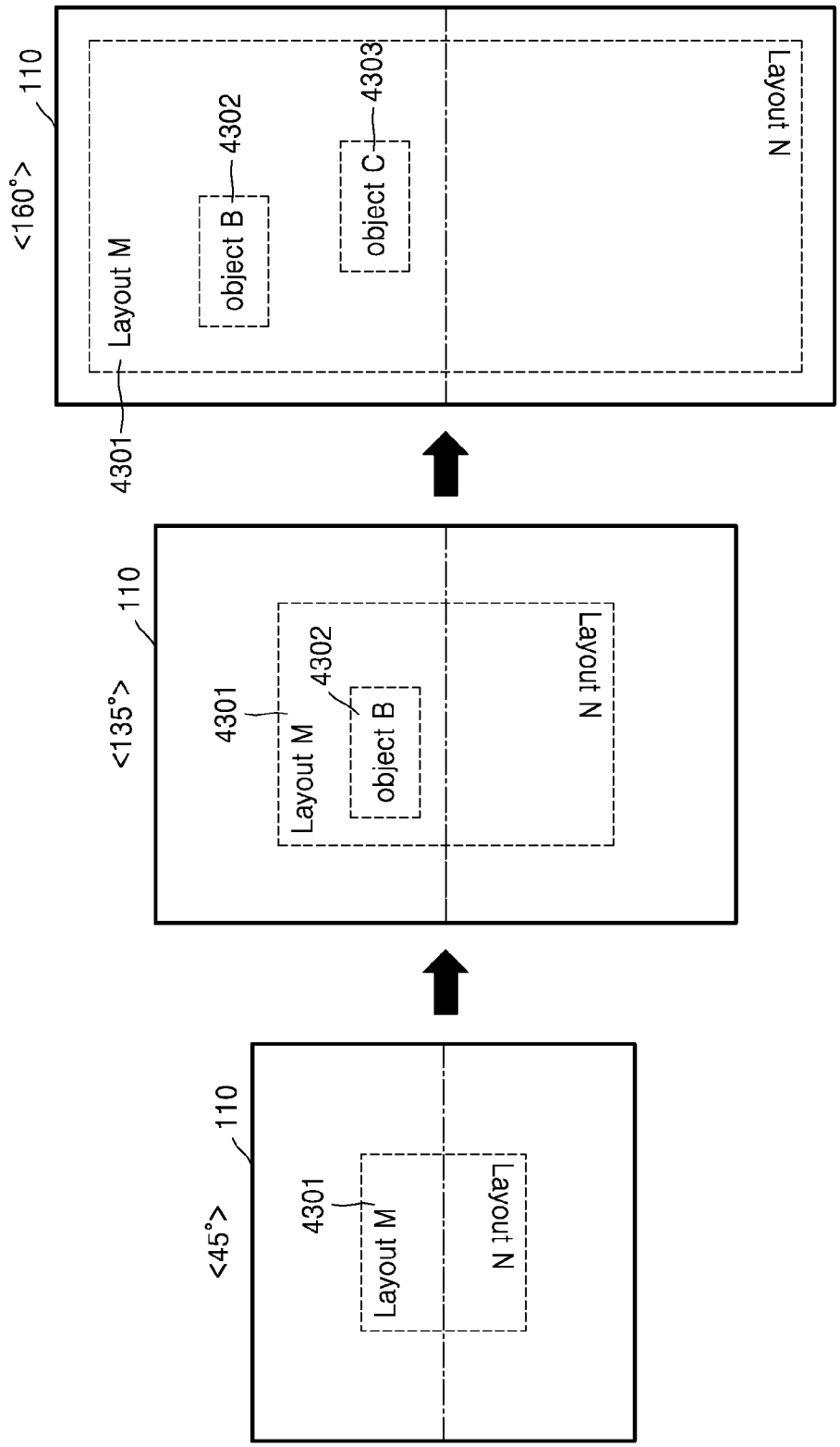
FIG. 43 is a diagram illustrating that display states of objects of a layout dynamically vary according to deformation of a flexible display according to another exemplary embodiment.

FIG. 43 is a diagram illustrating that display states of objects of a layout dynamically vary according to deformation of a flexible display according to another exemplary embodiment.

Referring to FIG. 43, objects 4302 and 4303 "object B" and "object C" may be displayed such that the number of the objects 4302 and 4303 varies only on a layout 4301 "Layout M" in a display area of one side of the flexible display 110 according to a degree of deformation of the flexible display 110.

Figure 44:
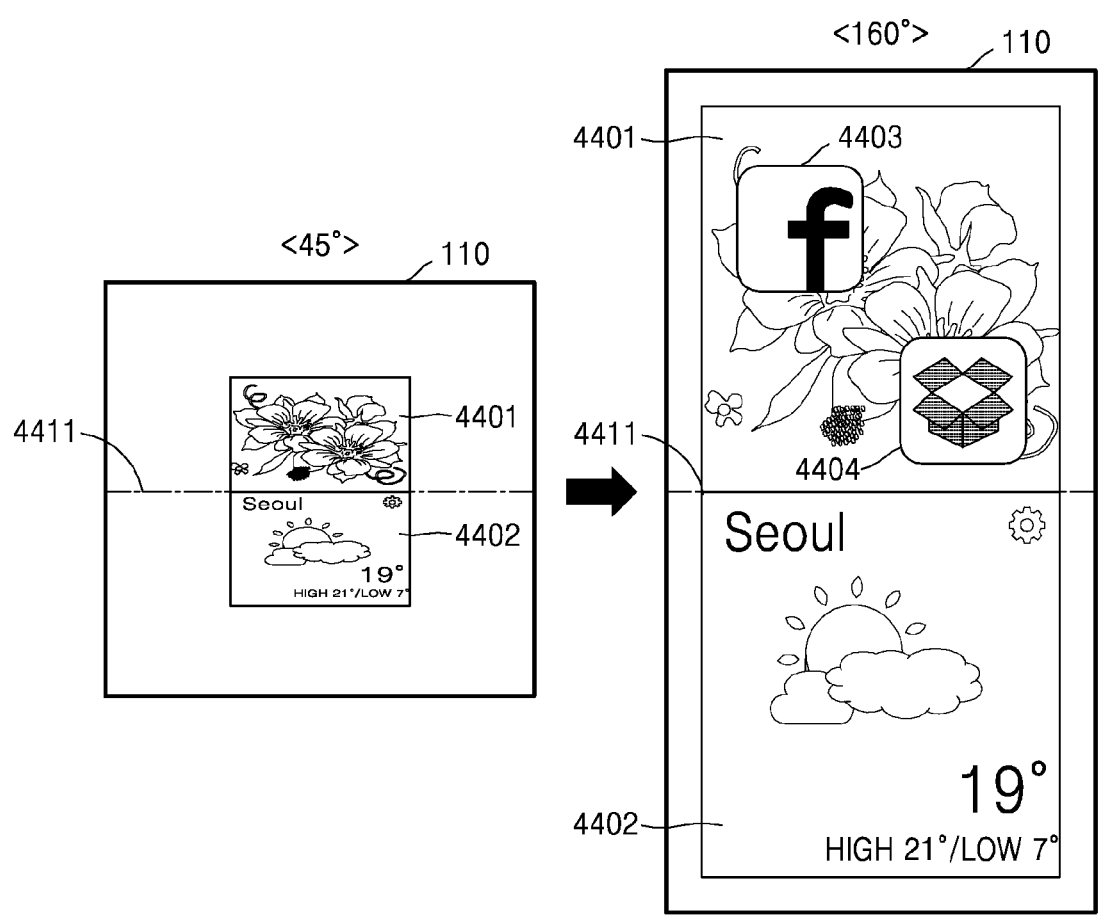
FIG. 44 is a diagram illustrating that display states of objects of various types of layouts dynamically vary according to deformation of a flexible display according to an exemplary embodiment.

FIG. 44 is a diagram illustrating that display states of objects of various types of layouts dynamically vary according to deformation of a flexible display according to an exemplary embodiment.

Referring to FIG. 44, when the deformation degree, such as an unfolding angle or a bending curvature, of the flexible display 110 is "45°", the flexible display 110 may display a photo layout 4401 in a display area of one side and a weather layout 4402 in a display area of the other side, with respect to a folding axis 4411. When the user clicks the photo layout 4401 or the weather layout 4402, a photo application or a weather application may be executed.

When the deformation degree or state is "160°", the flexible display 110 displays the photo layout 4401 and the weather layout 4402 by magnifying the same. Also, the flexible display 110 displays an object 4403 of a Facebook application icon and an object 4404 of a Dropbox application icon, which were not displayed before, on the photo layout 4401.

In other words, the flexible display 110 may display the sizes of the layouts 4401 and 4402 to vary or may display the objects 4403 and 4404, which were not displayed before, in the interaction with the deformation of the flexible device 10 or the flexible display 110.

Figure 45:
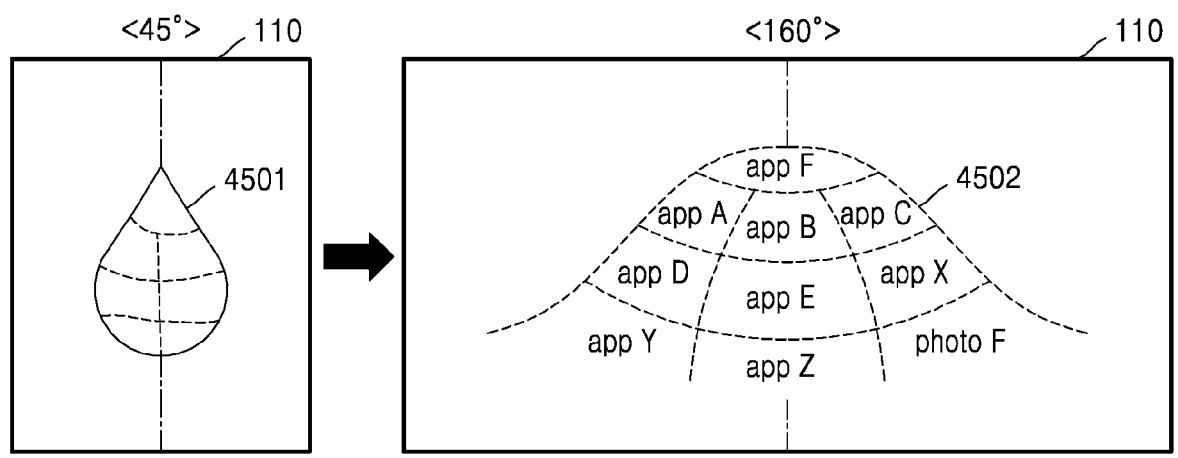
FIG. 45 is a diagram illustrating that a display state of a layout having a shape of a water drop dynamically varies according to deformation of a flexible display according to an exemplary embodiment.

FIG. 45 is a diagram illustrating that a display state of a layout having a shape of a water drop dynamically varies according to deformation of a flexible display according to an exemplary embodiment.

Referring to FIG. 45, when the deformation degree, such as an unfolding angle or a bending curvature, of the flexible display 110 is "45°", the flexible display 110 may display a layout 4501 having a shape of a condensed water drop. However, when the deformation degree or state increases to "160°", the flexible display 110 may display a layout 4502 having a shape of a water drop that spreads or expands. In other words, the flexible display 110 may provide a layout having a shape of a water drop that gradually spreads or expands as the deformation degree, such as an unfolding angle or a bending curvature, increases.

The layout 4501 and the layout 4502 may include various types of objects "app A", "app B", "app C", "photo F", etc.

Figure 46:
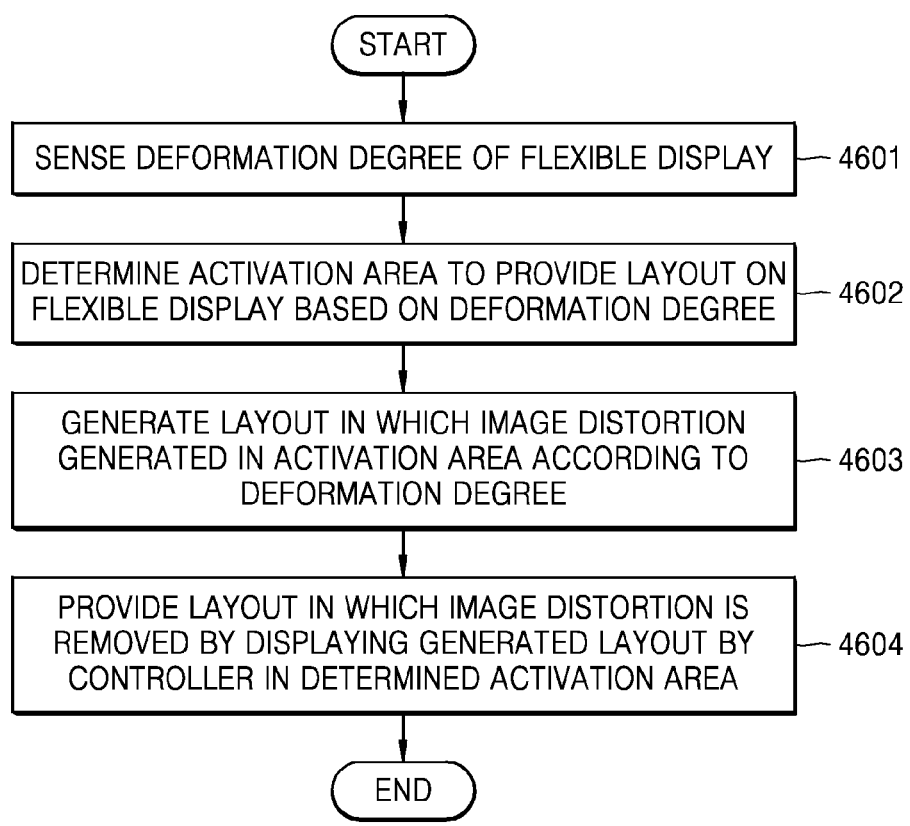
FIG. 46 is a flowchart illustrating a method of providing a user interface screen in which display distortion according to deformation is corrected in a flexible device according to an exemplary embodiment.

FIG. 46 is a flowchart illustrating a method of providing a user interface screen in which display distortion according to deformation is corrected in a flexible device according to an exemplary embodiment. Referring to FIG. 46, since the method of providing a user interface screen is a set of processes that are time-serially processed in the foldable device 11 of FIG. 2 or the flexible device 10 of FIG. 3, the descriptions presented with reference to other drawings, though they may be omitted in the following descriptions, may be applied to the method of providing a user interface screen of FIG. 46.

In Operation 4601, the sensor 120 senses a degree of deformation, for example, an unfolding angle, a bending curvature, etc., of the flexible display 110.

In Operation 4602, the controller 130 determines an activation area to provide a layout on the flexible display 110 based on a sensed deformation degree.

In Operation 4603, the controller 130 generates a layout in which image distortion generated in the activation area according to the sensed deformation degree is corrected.

In Operation 4604, the flexible display 110 provides a layout in which the image distortion is removed by displaying the layout generated by the controller 130 in the determined activation area.

Figure 47:
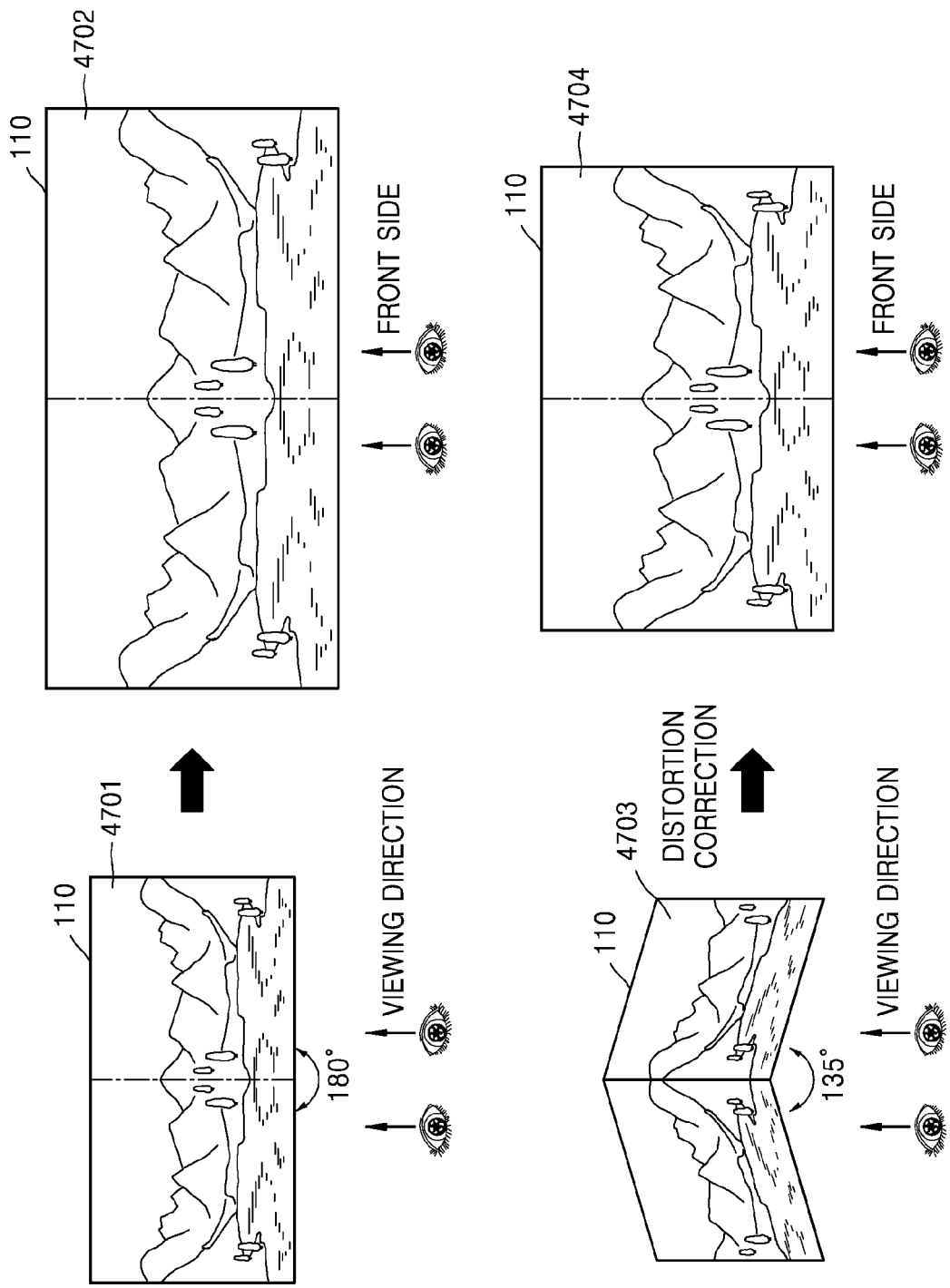
FIG. 47 is a diagram for showing comparison between a layout when a flexible display is completely unfolded and a layout when the flexible display is folded according to an exemplary embodiment.

FIG. 47 is a diagram for showing a comparison between a layout when the flexible display 110 is completely unfolded or unbent and a layout when the flexible display 110 is folded according to an exemplary embodiment.

Referring to FIG. 47, in a state in which the degrees of deformation, for example, an unfolding angle or a bending curvature, of the flexible display 110 are "180°" and "135°", layouts 4702 and 4704 when the user sees the flexible display 110 from the front side thereof is described below.

When the user sees the flexible display 110 from the front side thereof in a state in which the flexible display 110 is completely unfolded, that is, when the deformation degree is "180°", the user may see a layout 4702 that is the same as an original image 4701 displayed on the flexible display 110.

However, when the user sees the flexible display 110 from the front side thereof in a state in which the flexible display 110 is folded, e.g., when the deformation degree is "135°", a viewable area of the flexible display 110 decreases. Accordingly, when the original image 4701 is displayed on the flexible display 110 in a folded state, the original image 4701, when viewed from the front side of the flexible display 110, may be distorted.

However, if a corrected image 4703 in which the display distortion that may be generated according to the degree of deformation of the flexible display 110 is displayed, even when the user sees the flexible display 110 in a deformed state from the front side thereof, the user may see a layout 4704 that looks similar to the layout 4702.

Figure 48:
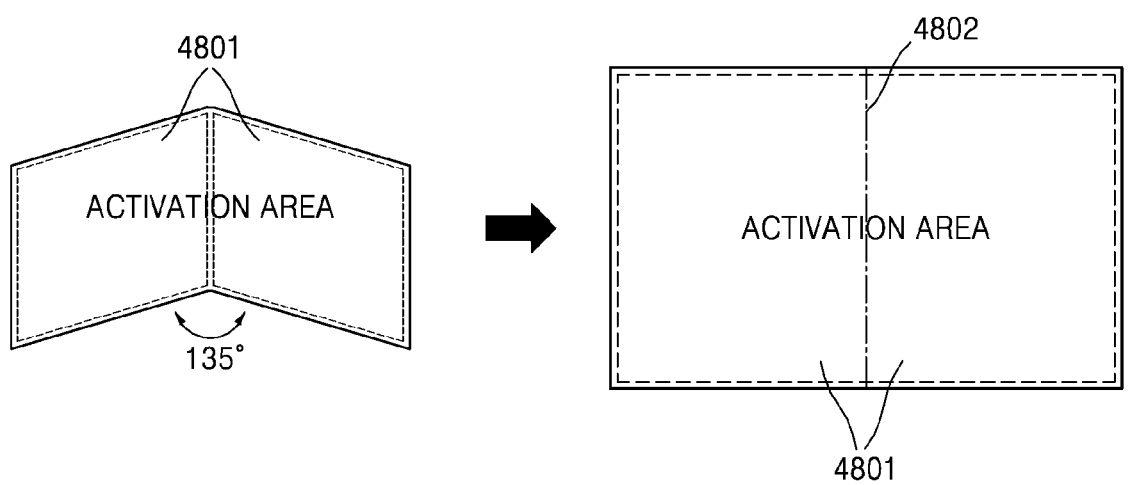
FIG. 48 is a diagram illustrating an activation area of a flexible display according to an exemplary embodiment.

FIG. 48 is a diagram illustrating an activation area of a flexible display according to an exemplary embodiment.

Referring to FIG. 48, the activation area 4801 denotes an area where a layout is to be displayed on the flexible display 110. In contrast, a non-activation area may denote an area where the layout is not displayed.

In detail, when the activation area 4801 corresponds to a part of a displayable area of the flexible display 110, the non-activation area is the other area of the displayable area of the flexible display 110, excluding the activation area 4801. In the non-activation area, the layout is not displayed as pixels located in the non-activation area of the flexible display 110 are deactivated or turned off. Also, the non-activation area may be an area that may be processed to be a margin having a color such as black, white, blue, red, green, etc., during generation of a layout.

As described above with reference to FIG. 47, when the flexible display 110 is completed unfolded, that is, when the deformation degree is "180°", the user may see the flexible display 110 with the whole area of the flexible display 110 as it is.

However, when the flexible display 110 is folded, the user who sees the flexible display 110 from the front side may feel that the visible area of the flexible display 110 is decreased.

In particular, as the flexible display 110 is folded further, even when a layout is displayed, it may be difficult for the user to see the display area around a folding axis 4802 of the flexible display 110. Accordingly, when the flexible display 110 is folded significantly, by setting the display area around the folding axis 4802 to be a non-activation area, a layout that is difficult for the user to recognize may be prevented.

In other words, as an activation area where a layout is to be displayed is dynamically determined according to the deformation degree or state of the flexible display 110, user readability of the flexible display 110 in a deformation state may be improved.

Figure 49:
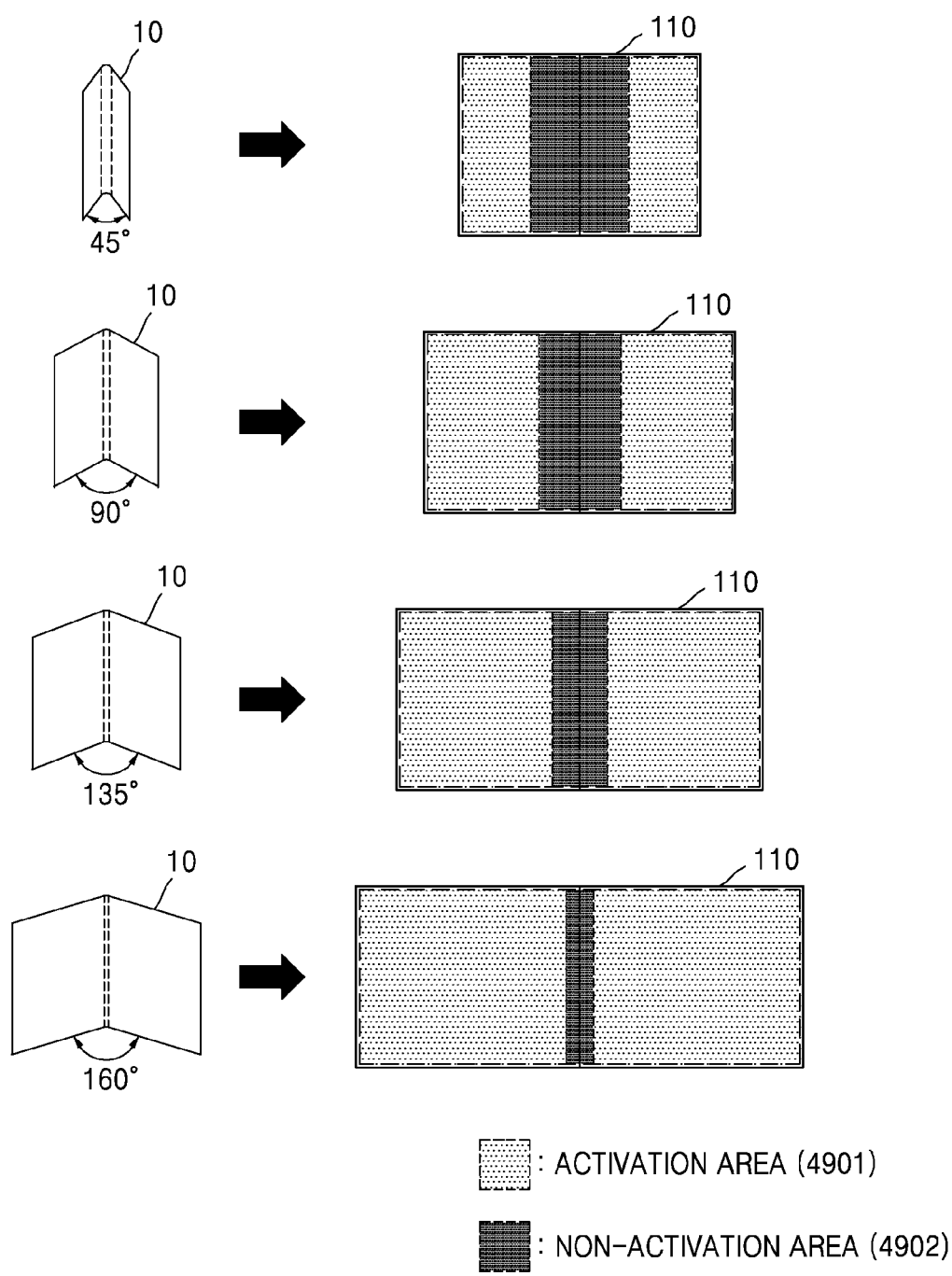
FIG. 49 is a diagram illustrating that an activation area of a flexible display dynamically varies according to a degree of deformation of flexible device employing a foldable display according to an exemplary embodiment.

FIG. 49 is a diagram illustrating that an activation area of a flexible display dynamically varies according to a degree of deformation of flexible device employing a foldable display according to an exemplary embodiment.

Referring to FIG. 49, the activation area 4901 for each case when the unfolding angles of the flexible device 10 is "45°", "90°", "135°", and "160°" is illustrated.

When the unfolding angle of the flexible device 10 is "45°", a visible area of the flexible display 110, viewed from the front side, is smaller than that when the unfolding angle of the flexible device 10 is "90°". In particular, when the unfolding angle of the flexible device 10 is "45°", it may be difficult for the user to further identify the display area around a folding axis of the flexible display 110.

Accordingly, when the unfolding angle of the flexible device 10 is "45°", compared to a case in which the unfolding angle of the flexible device 10 is "90°", the activation area 4901 of the flexible display 110 may be relatively narrow and a non-activation area 4902 may be relatively wide.

When the flexible device 10 is gradually unfolded to "135°" and "160°", the visible area that user sees gradually increases and thus the size of the activation area 4901 may gradually increases and the size of the non-activation area 4902 may gradually decrease.

As such, the flexible device 10 may provide a user experience UX that improves user readability by adjusting the ratio or size of the activation area 4901 on the flexible display 110, in the interaction with the deformation degree or state of the flexible device 10.

Figure 50:
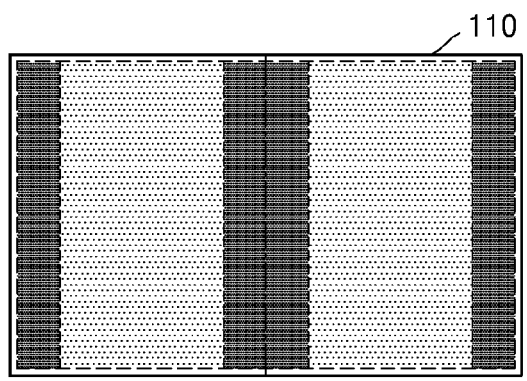
FIG. 50 is a diagram illustrating arrangement of an activation area and a non-activation area on a flexible display according to an exemplary embodiment.

FIG. 50 is a diagram illustrating an arrangement of an activation area and a non-activation area on a flexible display according to an exemplary embodiment.

In FIG. 49, a non-activation area 4902 is described to be arranged in a display area around a folding axis. However, referring to FIG. 50, the non-activation area 5002 may be arranged in display areas at opposite ends of the flexible display 110. Accordingly, an activation area 5001 may be arranged in the middle portion of the display area at each side of the flexible display 110, except for the folding axis and the opposite ends.

However, according to an exemplary embodiment, the arrangement of the activation area 5001 and the non-activation area 5002 are not limited to the arrangements illustrated in FIGS. 48 to 50 and may be changed in various ways.

FIG. 51 is a diagram illustrating displaying an electronic book (e-book) in an activation area of a flexible display according to an exemplary embodiment.

Referring to FIG. 51, words and images may be displayed at a left page 5110 and a right page 5120 of an e-book 5100. However, since a margin may exist on each page of a book, the e-book 5100 may also have a margin.

When the flexible display 110 is divided into an activation area 5101 and a non-activation area 5102, the activation area 5101 may display only words and images in the left page 5110 and the right page 5120 of the e-book 5100. The non-activation area 5102 may be arranged on the flexible display 110 in the form of an edge similar to the margin existing in the left page 5110 and the right page 5120 of the e-book 5100.

Alternatively, the controller 130 of FIG. 2 may generate layouts in which the margin of each of the left page 5110 and the right page 5120 is removed on a screen where an e-book application is executed. Also, the flexible display 110 may display the layouts generated as above in the activation area 5101.

Although FIG. 51 illustrates an example of the e-book 5100, an exemplary embodiment is not limited thereto and the flexible display 110 may display other types of contents as illustrated in FIG. 51. In order to display the content in a portion except of the margin in the activation area 5101, the controller 130 generates a layout by removing a margin from an application execution screen, a content screen, or a background screen.

Figure 52A:
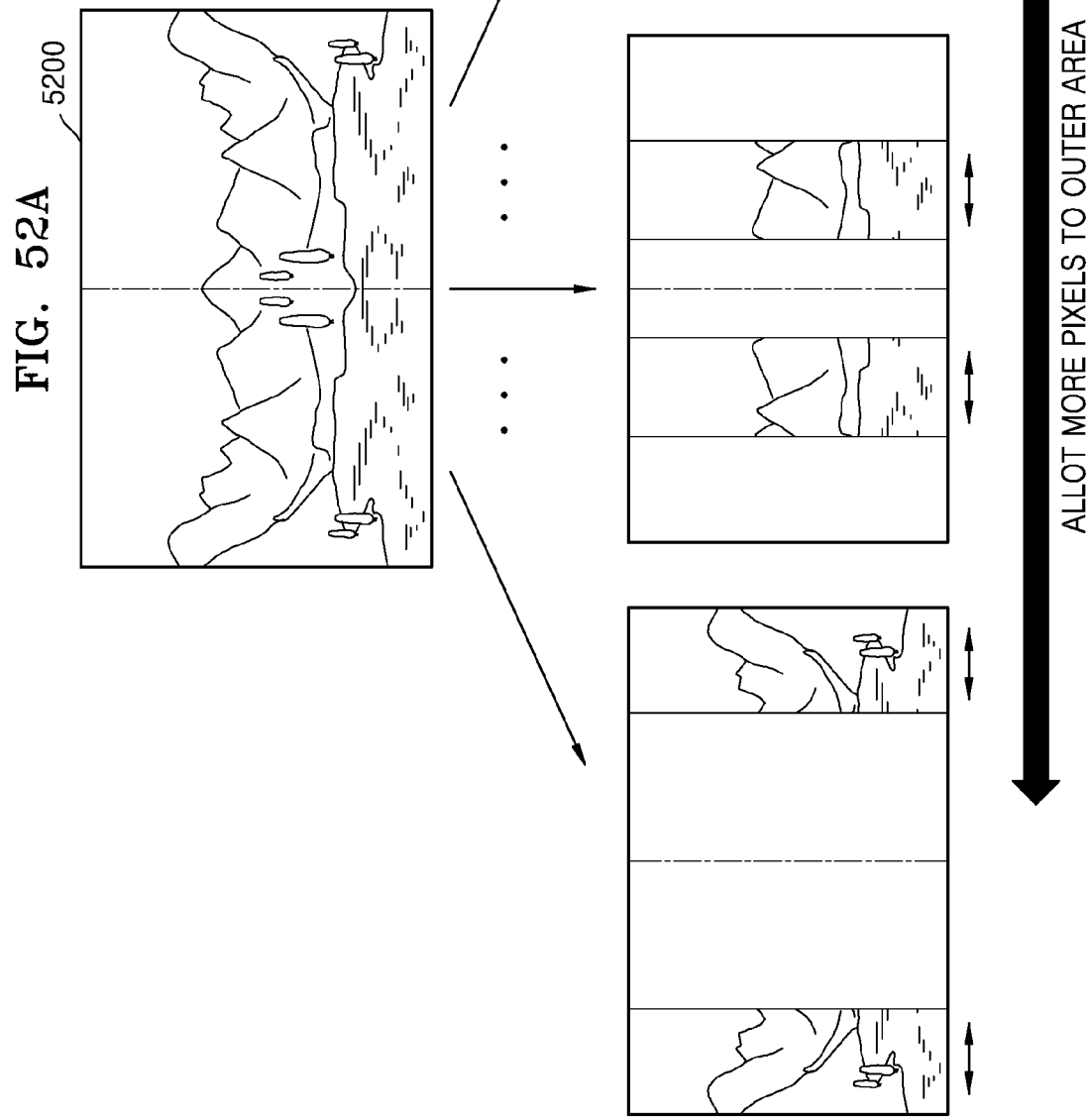
FIGS. 52A to 52D are diagrams illustrating generation of a corrected image to remove display distortion that may be generated when a flexible display is folded according to an exemplary embodiment.

FIG. 52A is a diagram illustrating generation of a corrected image to remove display distortion that may be generated when a flexible display is folded according to an exemplary embodiment.

Referring to FIG. 52A, when an original image 5200 is displayed on the flexible display 110 as it is in a state in which the flexible display 110 is in a folding state or bending state, the original image 5200 may be displayed to be distorted when viewed from the front side of the flexible display 110.

In order to correct the display distortion, the controller 130 generates a layout by adjusting arrangement of pixels of a layout allotted to an activation area, based on the deformation degree of the flexible display 110. The controller 130 may generate a layout by resizing the application execution screen, the content screen, or the background screen.

For example, the controller 130 may generate a layout such that the number of pixels in outer areas of both sides of the original image 5200 is greater than the original number of pixels to be allotted to the flexible display 110. In contrast, the controller 130 may generate a layout such that the number of pixels in a center area between both sides of the original image 5200 is less than the original number of pixels to be allotted to the flexible display 110. The controller 130 may adjust an allocation ratio based on the deformation degree of the flexible display 110. As such, the flexible display 110 may provide a layout in which the display distortion is corrected, by displaying the layouts generated by which the pixels may be allotted again by the controller 130.

Figure 52B:
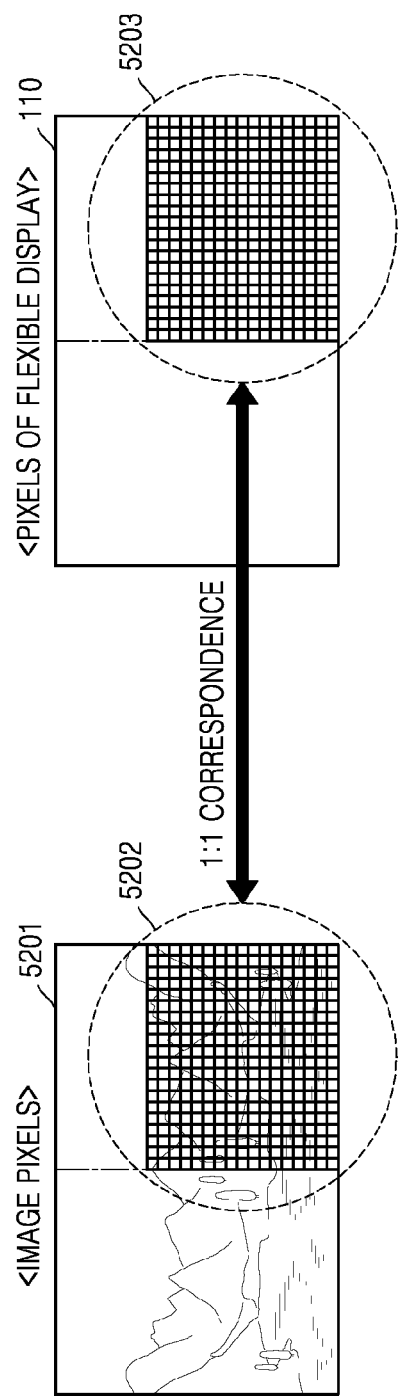
Figure 52C:
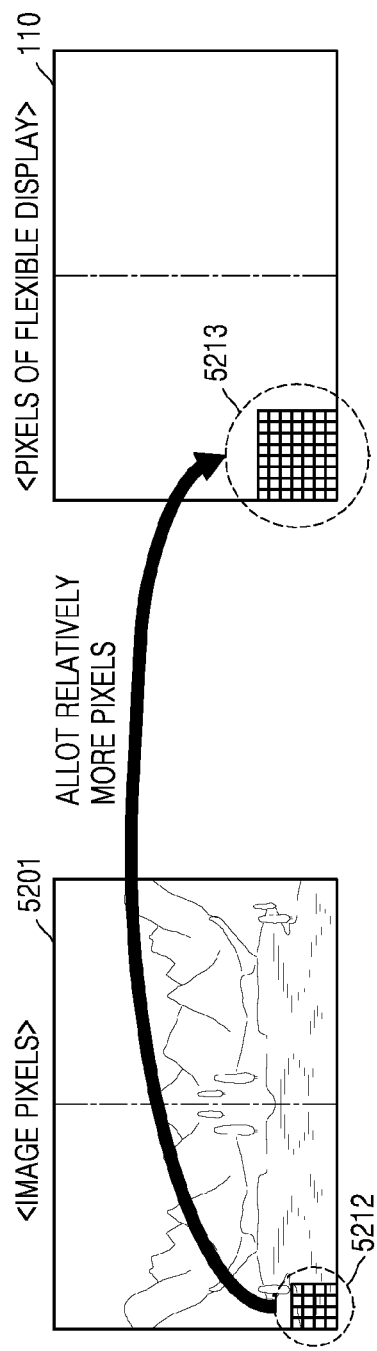
Figure 52D:
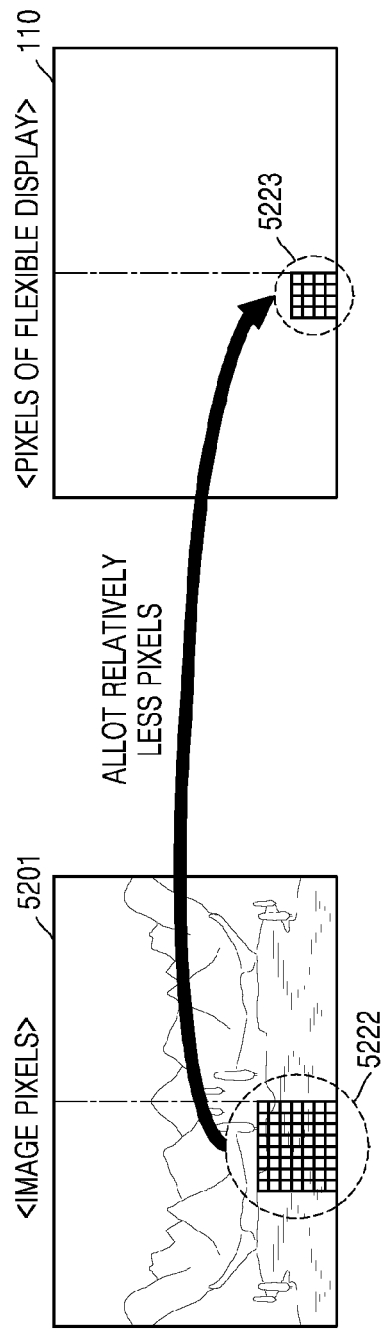

FIGS. 52B to 52D are diagrams illustrating in detail the process of generating a corrected image in FIG. 52A.

In FIG. 52B, the flexible display 110 is completely unfolded, for example, the unfolding angle is "180°". In FIGS. 52C and 52D, the flexible display 110 is assumed to be folded at a certain angle, for example, the unfolding angle is "135°".

In FIG. 52B, assuming that a displayable pixel array of the flexible display 110 and a pixel array of an image 5201 are the same matrix structure, the image 5201 may be displayed such that pixels of the image 5201 correspond on a one-to-one basis to pixels of the flexible display 110. In other words, as illustrated in FIG. 52B, when the flexible display 110 is in a flat surface state, display distortion is not generated and thus the controller 130 maps the pixels of the image 5201 to the pixels of the flexible display 110 at a ratio of 1:1.

However, as illustrated in FIGS. 52C and 52D, when the flexible display 110 is in a state of being folded at a certain angle, display distortion may be generated and thus the controller 130 may adjust an allocation ratio of the pixels of the flexible display 110 to the pixels of the image 5201 according to the position of a pixel in the image 5201, to correct the display distortion.

For example, as illustrated in FIG. 52C, the controller 130 may adjust an allocation ratio such that relatively more pixels 5213 of the flexible display 110 are allotted with respect to pixels 5212 distributed in an outer area of the image 5201. In other words, the pixels 5213 of the flexible display 110 displayed as a part of the image 5201 corresponding to the positions of the pixels 5212 are further extended. In contrast, as illustrated in FIG. 52D, the controller 130 may adjust an allocation ratio such that relatively fewer pixels 5223 of the flexible display 110 are allotted with respect to pixels 5222 distributed in a center area of the image 5201. In other words, the pixels 5223 of the flexible display 110 displayed as a part of the image 5201 corresponding to the positions of the pixels 5212 are further reduced.

Alternatively, unlike FIGS. 52C and 52D, the controller 130 may adjust an allocation ratio such that relatively less pixels of the flexible display 110 are allotted with respect to pixels 5212 distributed in the outer area of the image 5201 and relatively more pixels of the flexible display 110 are allotted with respect to pixels 5222 distributed in the center area of the image 5201.

Figure 52E:
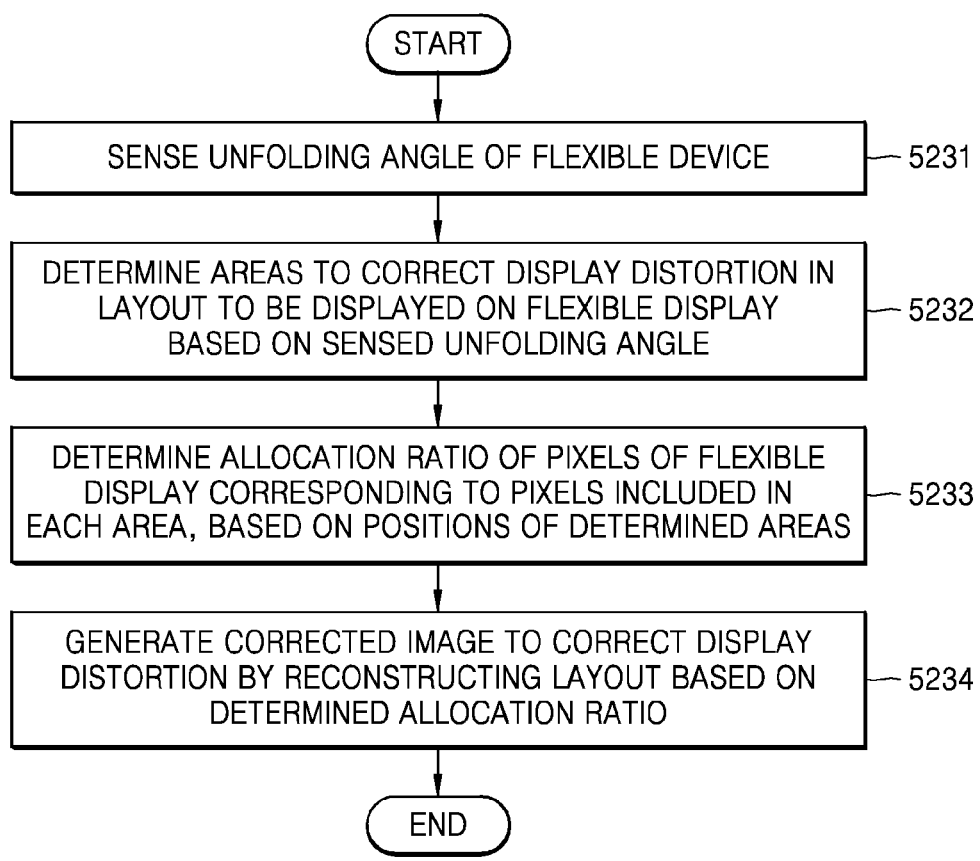
FIG. 52E is a flowchart illustrating a method of generating a corrected image to remove display distortion that may be generated when a flexible display is folded according to an exemplary embodiment.

FIG. 52E is a flowchart illustrating a method of generating a corrected image to remove display distortion that may be generated when a flexible display is folded according to an exemplary embodiment.

Referring to FIG. 52E, a method of generating a corrected image in the cases of FIGS. 52C and 52D in which the flexible display 110 is folded at a certain angle is described.

In Operation 5231, the sensor 120 senses the unfolding angle of the flexible device 10 or the flexible display 110. For example, as described above with reference to FIGS. 52C and 52D, the sensor 120 may sense that the unfolding angle of the flexible device 10 or the flexible display 110 is "135°".

In Operation 5232, the controller 130 determines areas to correct display distortion in a layout to be displayed on the flexible display 110 based on a sensed unfolding angle. In other words, the controller 130 may determine areas of the image 5201 to correct the display distortion based on the sensed unfolding angle. For example, the controller 130 may determine that correction of the display distortion is necessary for the pixels 5212 distributed in the outer area of the image 5201 and the pixels 5222 distributed in the center area of the image 5201. The controller 130 may determine the areas of the image 5201 to correct the display distortion, by adjusting the number of the pixels 5212 distributed in the outer area and the number of the pixels 5222 distributed in the center area according to the sensed unfolding angle.

In Operation 5233, the controller 130 determines an allocation ratio of the pixels of the flexible display 110 corresponding to the pixels included in each of the determined areas, based on the positions of the determined areas. In other words, the controller 130 determines an allocation ratio of the pixels of the flexible display 110 corresponding to each of the areas of the image 5201, based on the positions of the areas of the determined the image 5201. For example, the controller 130 may determine the allocation ratio such that relatively more pixels 5213 of the flexible display 110 are allotted with respect to pixels 5212 distributed in the outer area of the image 5201. Also, the controller 130 may determine the allocation ratio such that relatively fewer pixels 5223 of the flexible display 110 are allotted with respect to pixels 5222 distributed in the center area of the image 5201.

In Operation 5234, the controller 130 generates a corrected image to correct the display distortion by reconstructing the layout based on the determined allocation ratio. In other words, the controller 130 generates a corrected image to correct the display distortion by reconstructing the image 5201 based on the determined allocation ratio.

Figure 53A:
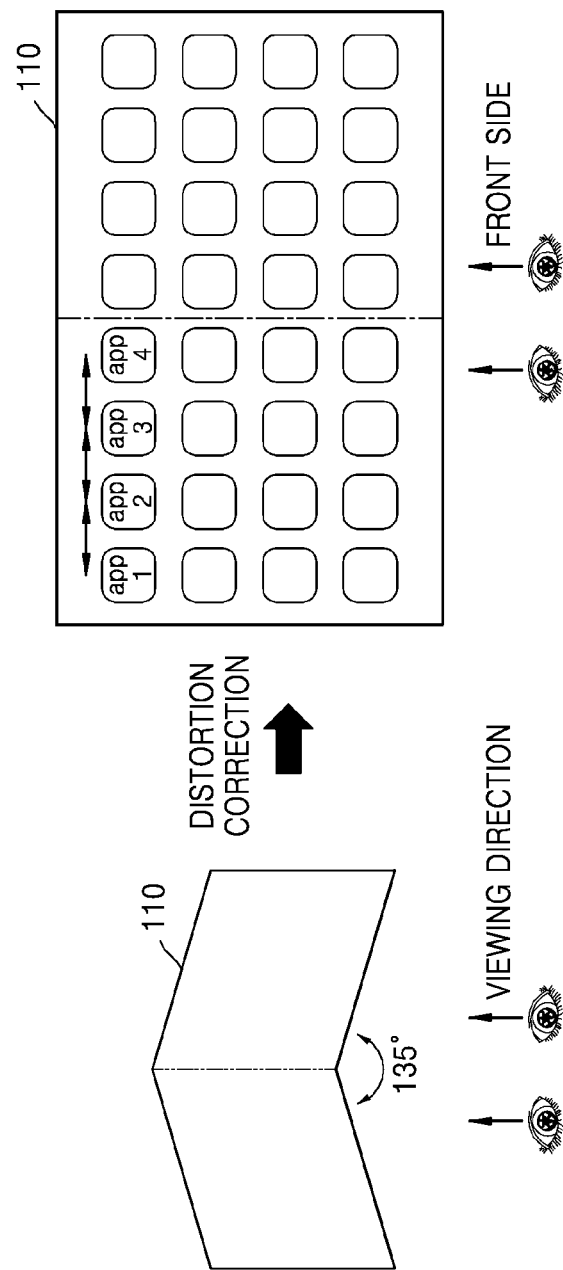
FIGS. 53A and 53B are diagrams illustrating an arrangement of application icons to remove display distortion that may be generated when a flexible display is folded according to an exemplary embodiment.
Figure 53B:
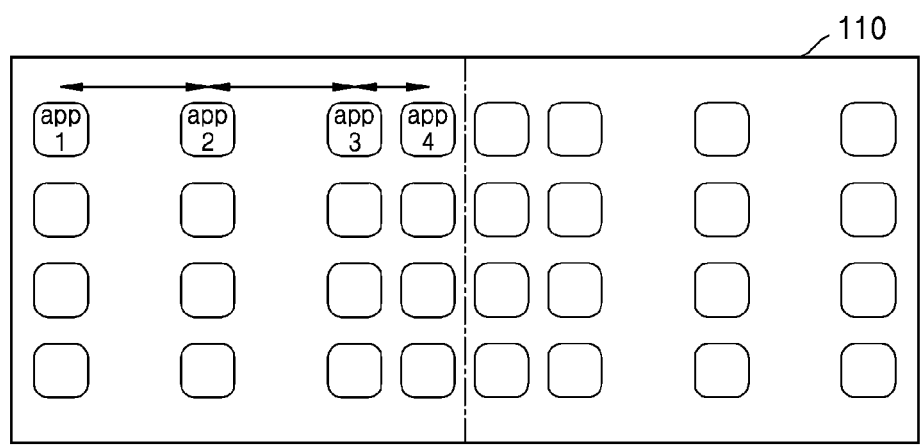

FIGS. 53A and 53B are diagrams illustrating arrangement of application icons to remove display distortion that may be generated when a flexible display is folded according to an exemplary embodiment.

Referring to FIG. 53A, when the flexible display 110 is folded or bent, for example, the unfolding angle is "135°", the interval between the application icons may appear to be constant when the flexible display 110 is viewed from the front side thereof, through the correction of display distortion.

Referring to FIG. 53B, to correct the display distortion, the flexible display 110 may display an interval between the application icons located in the outer area to be relatively wider and an interval between the application icons located in the inner area to be relatively narrow. Accordingly, when a graphical user interface screen of the flexible display 110 of FIG. 53B is viewed from the front side thereto, the application icons may be displayed to have a constant interval as illustrated in FIG. 53A.

Figure 54:
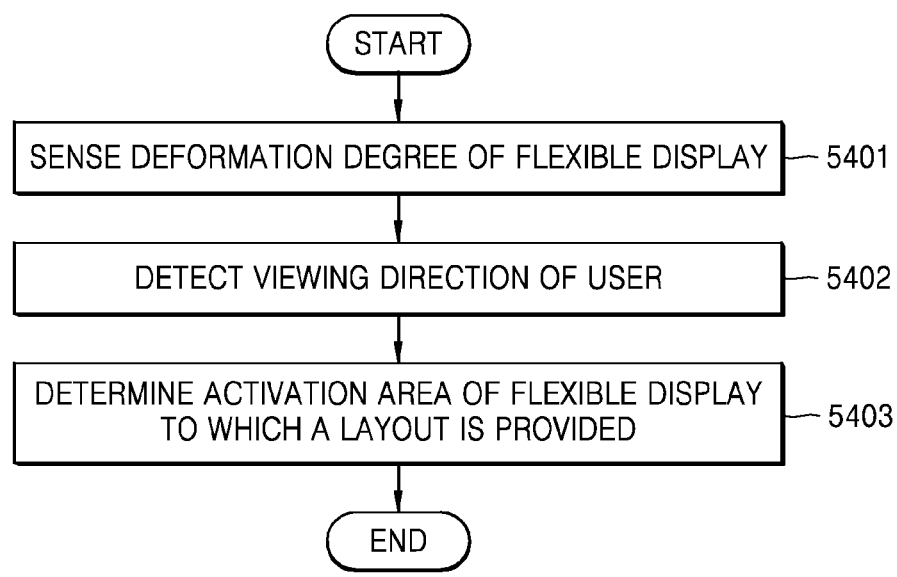
FIG. 54 is a flowchart illustrating a method of determining an activation area of a flexible display according to an exemplary embodiment.

FIG. 54 is a flowchart illustrating a method of determining an activation area of a flexible display according to an exemplary embodiment. Referring to FIG. 54, since the method of determining an activation area is a set of processes that are time-serially processed in the foldable device 11 of FIG. 2 or the flexible device 10 of FIG. 3, the descriptions presented with reference to other drawings, though they may be omitted in the following descriptions, may be applied to the method of determining an activation area of FIG. 54.

In Operation 5401, the sensor 120 may sense a degree of deformation of the flexible display 110. The deformation degree may include the unfolding angle, the bending curvature, etc.

In Operation 5402, the eye tracker 370 detects a viewing direction of a user viewing the flexible display 110. The eye tracker 370 may measure an interval between the flexible display 110 and the user.

In Operation 5403, the controller 130 may determine an activation area of the flexible display 110 to which a layout is provided, based on at least one of a sensed deformation degree and the detected viewing direction.

FIGS. 55A and 55B are diagrams illustrating a method of determining an activation area of a flexible display depending on a user's viewing direction according to an exemplary embodiment.

Referring to FIG. 55A, the eye tracker 370 may be embodied by a camera 5510 that may detect a direction of user's eyes, a direction toward the front side of the face of a user, etc. Although the camera 5510 may be located at the left side of the flexible display 110, embodiments are not limited thereto and the camera 5510 may be provided at various different positions such as an upper portion, a lower portion, a right side, etc. of the flexible display 110.

Referring to FIG. 55A, when the user views the flexible display 110 from the left side of the flexible display 110, the eye tracker 370 detects that the viewing direction of a user is directed to the right side of the flexible display 110. Accordingly, the controller 130 determines an activation area 5512 in a right display area with respect to a folding axis 5501 to be larger than an activation area 5511 in a left display area. The sizes of the activation areas 5511 and 5512 may also be dependent on the deformation degree of the flexible display 110.

Referring to FIG. 55B, when the user views the flexible display 110 from the right side of the flexible display 110, the eye tracker 370 detects that the viewing direction of a user is directed to the left side of the flexible display 110. Accordingly, the controller 130 determines an activation area 5513 in the left display area with respect to the folding axis 5501 to be larger than an activation area 5514 in the right display area. The sizes of the activation areas 5513 and 5514 may be dependent on the deformation degree of the flexible display 110.

Furthermore, since the eye tracker 370 may measure an interval between the flexible display 110 and the user, the controller 130 may determine the sizes of the activation areas 5511 to 5514 taking a measured interval with the viewing direction and the deformation degree into consideration.

Figure 56:
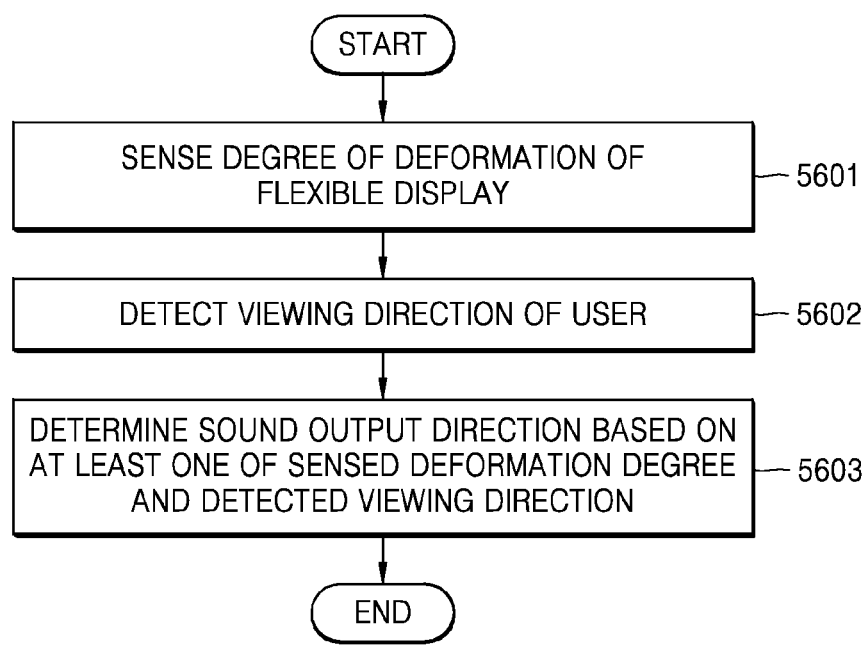
FIG. 56 is a flowchart illustrating a method of determining a sound output direction of a flexible device according to an exemplary embodiment.

FIG. 56 is a flowchart illustrating a method of determining a sound output direction of a flexible device according to an exemplary embodiment. Referring to FIG. 56, since the method of determining a sound output direction is a set of processes that are time-serially processed in the foldable device 11 of FIG. 2 or the flexible device 10 of FIG. 3, the descriptions with reference to the other drawings, though they may be omitted in the following descriptions, may be applied to the method of determining a sound output direction of FIG. 56.

In Operation 5601, the sensor 120 senses a deformation degree of the flexible display 110. The deformation degree may include the unfolding angle, the bending curvature, etc.

In Operation 5602, the eye tracker 370 detects a viewing direction of a user who views the flexible display 110.

In Operation 5603, the controller 130 determines a sound output direction based on at least one of a sensed deformation degree and a detected viewing direction.

Figure 57:
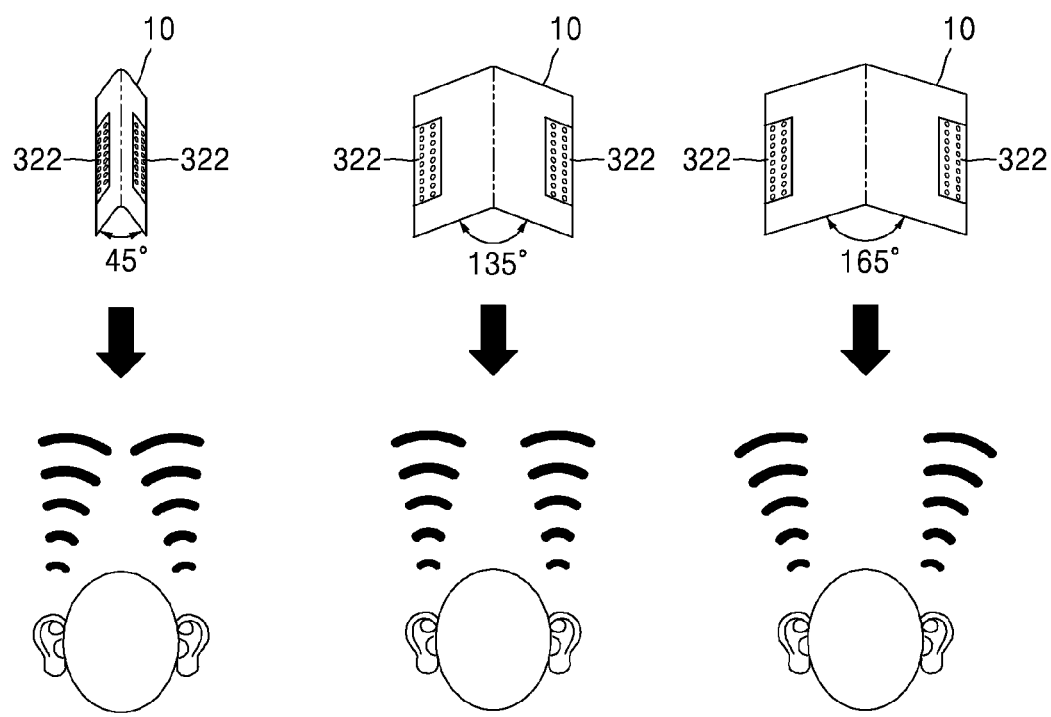
FIG. 57 is a diagram illustrating that the sound output direction of a flexible device dynamically varies according to a degree of a flexible device employing a foldable display according to an exemplary embodiment.

FIG. 57 is a diagram illustrating that the sound output direction of a flexible device dynamically varies according to a deformation degree of a flexible device employing a foldable display according to an exemplary embodiment.

Referring to FIG. 57, sound output directions for the cases in which the unfolding angles of the flexible device 10 is "45°", "135°", and "160°" are illustrated. A sound output module 322 is assumed to be a pair of speakers located at both sides of the flexible device 10.

When the unfolding angle of the flexible device 10 is "45°", the sound output module 322 may output sound in a direction spreading to the outside to deliver the sound to both ears of a user in a straight direction. When the unfolding angle of the flexible device 10 is "135°", the sound output module 322 may output sound in a parallel direction so that the sound is delivered in a straight line to both ears of the user. When the unfolding angle of the flexible device 10 is "160°", the sound output module 322 may output sound in a converging direction so that the sound is delivered in a straight line to both ears of the user.

In other words, the sound output module 322 of the flexible device 10 may provide a clear sense of sound to the user by dynamically varying the sound output direction according to the deformation degree of the flexible device 10.

FIGS. 58A and 58B are diagrams illustrating that the sound output direction of a flexible device dynamically varies according to a user's viewing direction according to an exemplary embodiment.

Referring to FIG. 58A, when the viewing direction of the user is directed to the left side of the flexible device 10, the sound output module 322 may output sound to converge at the user located at the left side of the flexible device 10.

Referring to FIG. 58B, when the viewing direction of the user is directed to the right side of the flexible device 10, the sound output module 322 may output sound to converge at the user located at the right side of the flexible device 10.

Figure 59:
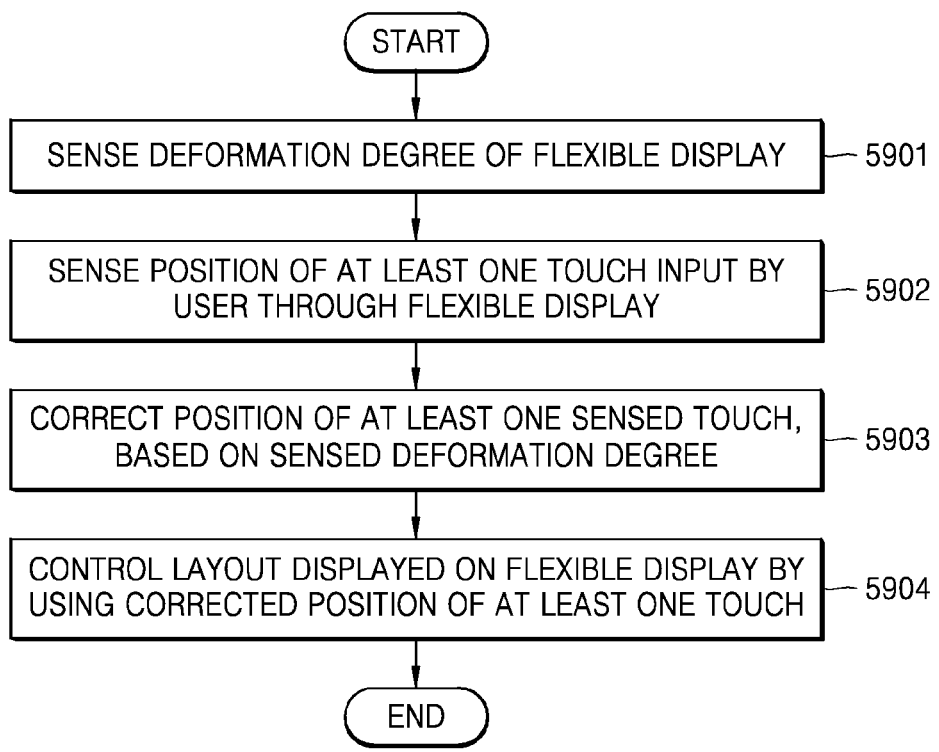
FIG. 59 is a flowchart illustrating a method of performing input interfacing with a user in a flexible device according to an exemplary embodiment.

FIG. 59 is a flowchart illustrating a method of performing input interfacing with a user in a flexible device according to an exemplary embodiment. Referring to FIG. 59, since the method of performing input interfacing is a set of processes that are time-serially processed in the flexible device 10 of FIG. 3, the descriptions with reference to FIG. 3, though they may be omitted in the following descriptions, may be applied to the method of performing input interfacing of FIG. 59.

In Operation 5901, the sensor 340 senses a deformation degree of the flexible display 110.

In Operation 5902, the touch sensing module 311 senses a position of at least one touch input by the user through the flexible display 110.

In Operation 5903, the controller 360 corrects the position of at least one sensed touch, based on a sensed deformation degree.

In Operation 5904, the controller 360 controls a graphical user interface screen displayed on the flexible display 110 by using a corrected position of the at least one touch.

Figure 60A:
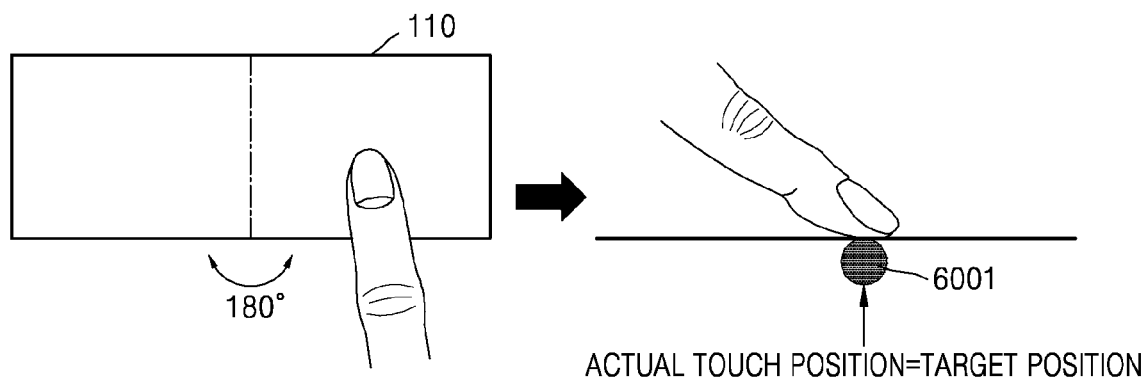
FIGS. 60A and 60B are diagrams illustrating an error that may be generated during touch input by a user according to deformation of a flexible display according to an exemplary embodiment.
Figure 60B:
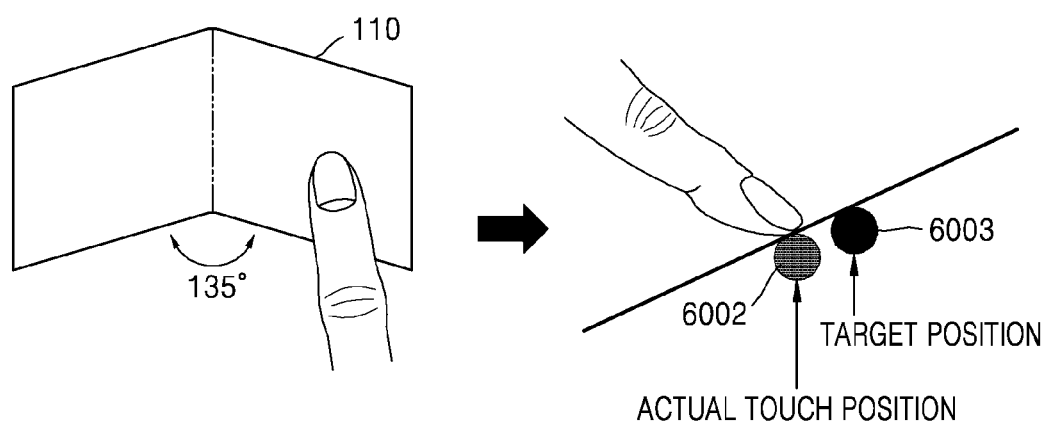

FIGS. 60A and 60B are diagrams illustrating an error that may be generated during touch input by a user according to deformation of a flexible display according to an exemplary embodiment.

Referring to FIG. 60A, when the flexible display 110 is completely unfolded or unbent, a user's actual touch position 6001 is highly likely to be the same as a target position that the user wants to touch.

However, referring to FIG. 60B, when the flexible display 110 is folded or bent, a user's actual touch position 6002 is not highly likely to be the same as a target position 6003 that the user wants to touch. This is because, unlike a case in which a flat surface is placed in a flat state, when a flat surface in an inclined state is to be touched, it may be difficult to accurately recognize a position touched by a user due to the shape or thickness of a finger used for touching.

Figure 61:
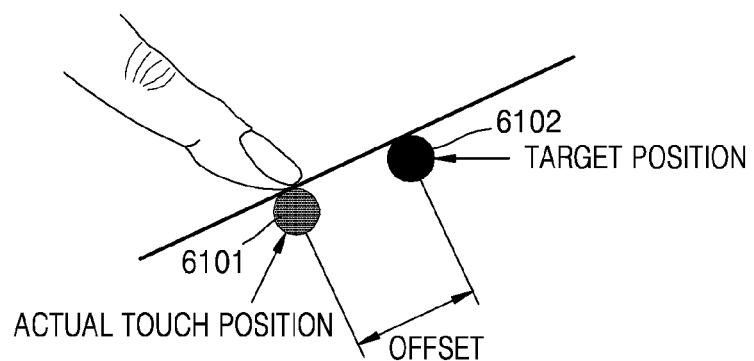
FIG. 61 is a diagram illustrating correction of an error that may be generated during touch input in a flexible display according to an exemplary embodiment.

FIG. 61 is a diagram illustrating correction of an error that may be generated during touch input in a flexible display according to an exemplary embodiment.

Referring to FIG. 61, as described above with reference to FIG. 60B, when the flexible display 110 is in a folding state or bending state in which the surface of the flexible display 110 is inclined, a user's actual touch position 6101 is not highly likely to be the same as a target position 6102 that the user wants to touch.

Accordingly, when an offset is applied to the user's actual touch position 6101 to have the user's actual touch position 6101 correspond to the target position 6102, an error in the touch input may be corrected.

Figure 62:
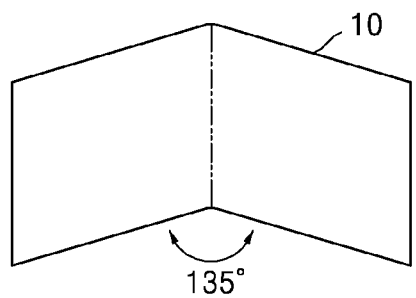
FIG. 62 is a diagram illustrating a first offset corresponding to a degree of deformation of a flexible device or a flexible display according to an exemplary embodiment.

FIG. 62 is a diagram illustrating a first offset corresponding to a degree of deformation of a flexible device or a flexible display according to an exemplary embodiment.

Referring to FIG. 62, first offset values respectively corresponding to deformation degrees of the flexible device 10 or the flexible display 110 are defined in a lookup table 6201 regarding a first offset. For example, in FIG. 61, when the unfolding angle of the flexible display 110 is "135°", the controller 360 corrects an error in the touch input to be close to the target position 6102 by applying a value "$a_{135}$" with respect to the actual touch position 6101.

Figure 63:
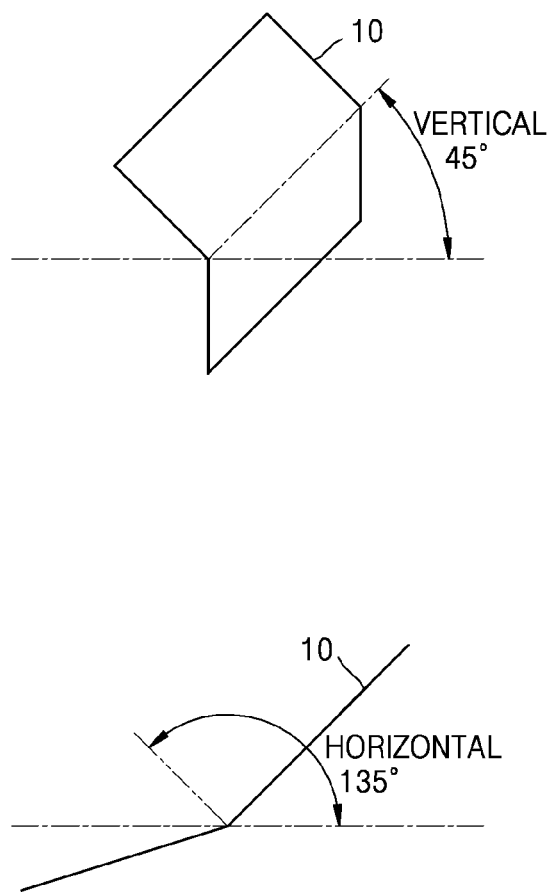
FIG. 63 is a diagram illustrating a second offset corresponding to an inclination of a flexible device or a flexible display according to an exemplary embodiment.

FIG. 63 is a diagram illustrating a second offset corresponding to an inclination of a flexible device or a flexible display according to an exemplary embodiment.

As described with reference to FIG. 3, the motion sensing module 312 may measure an inclination of the flexible device 10.

Referring to FIG. 63, second offset values respectively corresponding to deformation degrees of the flexible device 10 or the flexible display 110 are defined in a lookup table 6301 regarding a second offset. For example, when a vertical inclination of the flexible display 110 is "45°", the controller 360 corrects an error in the touch input to be close to the target position 6102 by applying a value "$b_{V45}$" with respect to the actual touch position 6101. Also, when a vertical inclination of the flexible display 110 is "135°", the controller 360 corrects an error in the touch input to be close to the target position 6102 by applying a value "$b_{V135}$" with respect to the actual touch position 6101.

Figure 64:
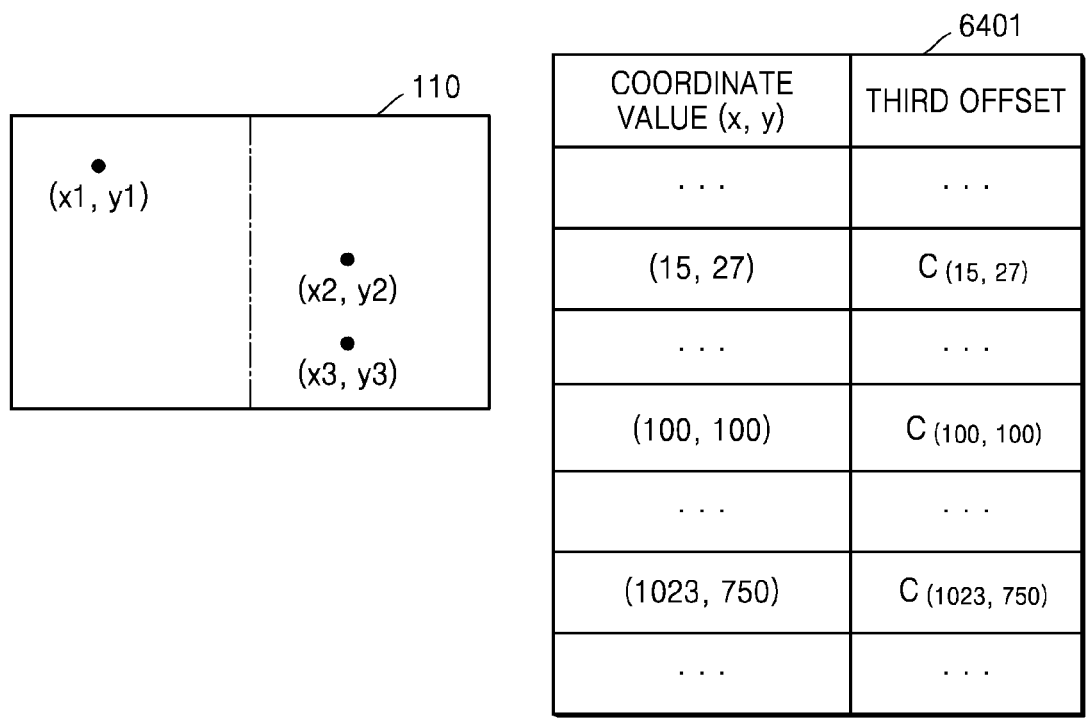
FIG. 64 is a diagram illustrating a third offset corresponding to a coordinate value of a touch input on a flexible display according to an exemplary embodiment.

FIG. 64 is a diagram illustrating a third offset corresponding to a coordinate value of a touch input on a flexible display according to an exemplary embodiment.

The touch sensing module 311 of FIG. 3 may recognize user's touch input by transforming a position touched by the user on the flexible display 110 to a coordinate value.

Referring to FIG. 64, third offset values respectively corresponding to deformation degrees of the flexible device 10 or the flexible display 110 are defined in a lookup table 6401 regarding a third offset. For example, in FIG. 61, when a coordinate value of the actual touch position 6101 is "(100, 100)", the controller 360 corrects an error in the touch input to be close to the target position 6102 by applying a third offset value "$C_{(100,\ 100)}$" with respect to the actual touch position 6101.

Figure 65:
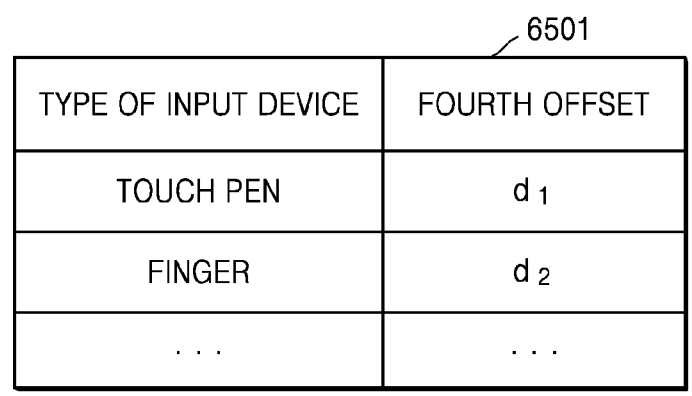
FIG. 65 is a table illustrating a fourth offset corresponding to a type of an input device touching a flexible display according to an exemplary embodiment.

FIG. 65 is a table illustrating a fourth offset corresponding to a type of an input device touching a flexible display according to an exemplary embodiment.

When a touch input is sensed by the touch sensing module 311 of FIG. 3, the controller 360 may determine the type of an input device used for touch input.

Referring to FIG. 65, fourth offset values respectively corresponding to the types of the input devices are defined in a lookup table 6501 regarding a fourth offset. For example, since an input device used for touch input is a finger in FIG. 61, the controller 360 corrects an error in the touch input to be close to the target position 6102 by applying a fourth offset value "$d_2$" with respect to the actual touch position 6101.

Referring to FIGS. 61 to 65, the controller 360 corrects the actual touch position 6101 by using at least one of the first offset, the second offset, the third offset, and the fourth offset so that the actual touch position 6101 corresponds to the target position 6102. For example, the controller 360 may determine a coordinate value corresponding to the actual touch position 6101 on the flexible display 110 to be (x, y). The controller 360 may determine the first offset value to be ($a_{45\_x}$, $a_{45\_y}$), the second offset value to be ($b_{v45\_x}$, $b_{v45\_y}$), the third offset value to be ($C_x$, $C_y$), and the fourth offset value to be ($d_{2\_x}$, $d_{2\_y}$). Finally, the controller 360 may correct a coordinate value (x, y) corresponding to the actual touch position 6101 into (x+$a_{45\_x}$+$b_{v45\_x}$+$C_x$+$d_{2\_x}$, y+$a_{45\_y}$+$b_{v45\_y}$+$C_y$+$d_{2\_y}$), by using the first to fourth offset values, and may determine that the value "(x+$a_{45\_c}$+$b_{v45\_x}$+$C_x$+$d_{2\_x}$, y+$a_{45\_y}$+$b_{V45\_y}$+$C_y$+$d_{2\_y}$)" corresponds to the coordinate value of the target position 6102.

Alternatively, the controller 360 executes a command on a user graphical interface screen corresponding to a corrected position of at least one touch. Also, the controller 360 may execute a command corresponding to a menu or shortcut that is the closest to a peak point of input intensity on a surface contacting the flexible display 110 at a sensed touch position.

The touch sensing module 311 may sense a proximity touch position or hovering position input by the user as described above. The controller 360 may correct a hovering position sensed by using the above-described types of offsets. The flexible display 110 may display a hovering pointer at a corrected hovering position.

Embodiments can be written as computer programs and can be implemented in general-use digital computers that execute the programs using a computer-readable medium. Examples of a computer-readable medium include magnetic storage media (e.g., ROM, floppy disks, hard disks, etc.), optical recording media (e.g., CD-ROMs, or DVDs), storage media, etc.

According to one or more exemplary embodiments, since a layout in which a visible representation dynamically changes in the interaction with an unfolding motion or a bending motion of a flexible display is provided, a user may be provided with a better user experience UX. Also, since a layout is provided in which display distortion that may occur due to an unfolding motion or a bending motion of a flexible display is corrected, readability of the user with respect to the layout may be improved regardless of deformation of a flexible display. Furthermore, since an error according to a touch input by the user is corrected, the user may be provided with a more accurate layout operating environment.

It should be understood that exemplary embodiments described herein should be considered in a descriptive sense only and not for purposes of limitation. Descriptions of features or aspects within one or more exemplary embodiments should typically be considered as available for other similar features or aspects in other exemplary embodiments.

While one or more exemplary embodiments have been described with reference to the figures, it should be understood by those of ordinary skill in the art that various changes in form and details may be made therein without departing from the spirit and scope as defined by the following claims.

What is claimed is:

1. A foldable device comprising:
   a flexible display;
   a hinge for folding or unfolding the foldable device, wherein the flexible display is divided into a first part and a second part by a folding line corresponding to the hinge;
   a sensor configured to sense a folding angle between the first part of the flexible display and the second part of the flexible display while the foldable device is being unfolded; and
   a processor configured to execute instructions to at least:
      in response to identifying the folding angle between the first part of the flexible display and the second part of the flexible display being greater than a first threshold while the foldable device is being unfolded, control to provide content on the flexible display; and
      in response to identifying an increase in the folding angle between the first part of the flexible display and the second part of the flexible display as the foldable device is being further unfolded in a state where the content is provided on the flexible display, control to change the content with reference to the folding line according to the folding angle.

2. The foldable device of claim 1, wherein the sensor is configured to sense the folding angle while the foldable device is being unfolded by sensing an unfolding angle of the foldable device or by sensing an unfolding curvature of the foldable device.

3. The foldable device of claim 2, wherein the processor is further configured to:
   determine a variable component of content provided on the flexible display corresponding to the unfolding angle or the unfolding curvature, and
   control the flexible display dynamically vary the content provided on the flexible display according to the variable component.

4. The foldable device of claim 2, wherein the processor is further configured to:
   dynamically vary the content provided on the flexible display by adjusting an arrangement of pixels allotted to an activation area corresponding to the unfolding angle or the unfolding curvature, and
   control the flexible display to display the content provided on the flexible display resulting from the adjusting the arrangement of pixels in the activation area.

5. The foldable device of claim 1, wherein the processor is further configured to:
   dynamically vary the content provided on the flexible display corresponding to each of unfolding angles or each of unfolding curvatures of the foldable device, and control the flexible display to sequentially vary the content provided on the flexible display corresponding to each of the unfolding angles or each of the unfolding curvatures.

6. The foldable device of claim 1, wherein the processor is further configured to control the flexible display to start displaying the content provided on the flexible display in at least one of a folding axis of a screen of the flexible display, an edge of the screen of the flexible display, and a position on the screen of the flexible display.

7. The foldable device of claim 1, wherein the content corresponds to a shortcut to execute at least one of an application installed on the foldable device, content stored in the foldable device, and a menu of the application.

8. The foldable device of claim 1, wherein the processor is further configured to control the flexible display to display the content provided on the flexible display in which at least one of an arrangement of the content provided on the flexible display, an appearance of the content provided on the flexible display, and a number of the content provided on the flexible display, dynamically varies corresponding to the folding angle while the foldable device is being unfolded.

9. The foldable device of claim 8, wherein the content comprises a plurality of objects, and
wherein the processor is further configured to control the flexible display such that at least one of an arrangement of the plurality of objects, an appearance of the plurality of objects, and a number of the plurality of objects, dynamically varies for each of a plurality of unfolding angles sensed by the sensor or for each of a plurality of unfolding curvatures sensed by the sensor.

10. The foldable device of claim 8, wherein the content comprises only one object, and
wherein the processor is further configured to control the display of the one object such that an appearance of the one object dynamically varies for each of a plurality of unfolding angles sensed by the sensor or for each of a plurality of unfolding curvatures sensed by the sensor.

11. The foldable device of claim 1, wherein the processor is configured to control the flexible display to increases a size of the content symmetrically with reference to the folding line according to the folding angle.

* * * * *